(12) United States Patent
Nagumo et al.

(10) Patent No.: US 11,272,180 B2
(45) Date of Patent: Mar. 8, 2022

(54) IMAGE PROCESSING APPARATUS AND METHOD

(71) Applicant: SONY CORPORATION, Tokyo (JP)

(72) Inventors: Takefumi Nagumo, Kanagawa (JP); Hironari Sakurai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/312,823

(22) PCT Filed: Jun. 20, 2017

(86) PCT No.: PCT/JP2017/022676
§ 371 (c)(1),
(2) Date: Dec. 21, 2018

(87) PCT Pub. No.: WO2018/008387
PCT Pub. Date: Jan. 11, 2018

(65) Prior Publication Data
US 2019/0268597 A1    Aug. 29, 2019

(30) Foreign Application Priority Data

Jul. 4, 2016 (JP) .............................. JP2016-132246
Feb. 20, 2017 (JP) .............................. JP2017-029341

(51) Int. Cl.
*H04N 19/126* (2014.01)
*H04N 19/14* (2014.01)
(Continued)

(52) U.S. Cl.
CPC .......... *H04N 19/126* (2014.11); *H04N 19/14* (2014.11); *H04N 19/157* (2014.11);
(Continued)

(58) Field of Classification Search
CPC .... H04N 19/126; H04N 19/14; H04N 19/157; H04N 19/159; H04N 19/176; H04N 19/46
See application file for complete search history.

(56) References Cited

U.S. PATENT DOCUMENTS

2003/0147463 A1    8/2003    Sato et al.
2005/0008075 A1    1/2005    Chang
(Continued)

FOREIGN PATENT DOCUMENTS

AU    2011339856 A1    6/2013
AU    2013227608 A1    8/2014
(Continued)

OTHER PUBLICATIONS

H.265 series H: audiovisual and multimedia systems infrastructure of audiovisual services—coding of moving video 04/13 (Year: 2013).*

(Continued)

*Primary Examiner* — Hesham K Abouzahra
(74) *Attorney, Agent, or Firm* — Chip Law Group

(57) ABSTRACT

The present disclosure relates to an image processing apparatus and method that can keep reduction in coding efficiency to a minimum. A scaling list is set that has values appropriate to a current block size for the current block to be quantized in an image to be coded, quantization is performed using the set scaling list, and coded data is generated by coding an acquired quantization coefficient. The present disclosure is applicable, for example, to an image processing apparatus, an image coding apparatus, an image decoding apparatus, and so on.

17 Claims, 50 Drawing Sheets

(51) Int. Cl.
*H04N 19/159* (2014.01)
*H04N 19/176* (2014.01)
*H04N 19/46* (2014.01)
*H04N 19/157* (2014.01)

(52) U.S. Cl.
CPC ......... *H04N 19/159* (2014.11); *H04N 19/176* (2014.11); *H04N 19/46* (2014.11)

(56) References Cited

U.S. PATENT DOCUMENTS

| | | | |
|---|---|---|---|
| 2006/0165163 A1* | 7/2006 | Burazerovic | H04N 19/96 375/240.03 |
| 2007/0286501 A1 | 12/2007 | Sato et al. | |
| 2009/0010559 A1 | 1/2009 | Inagaki | |
| 2010/0061450 A1 | 3/2010 | Sato et al. | |
| 2010/0061644 A1 | 3/2010 | Sato et al. | |
| 2010/0316119 A1* | 12/2010 | Mathew | H04N 19/149 375/240.03 |
| 2012/0140817 A1 | 6/2012 | Sato et al. | |
| 2012/0140818 A1 | 6/2012 | Sato et al. | |
| 2012/0141024 A1 | 6/2012 | Sato et al. | |
| 2012/0141025 A1 | 6/2012 | Sato et al. | |
| 2012/0287991 A1 | 11/2012 | Sato et al. | |
| 2012/0287992 A1 | 11/2012 | Sato et al. | |
| 2013/0094573 A1 | 4/2013 | Sato et al. | |
| 2013/0094574 A1 | 4/2013 | Sato et al. | |
| 2013/0094575 A1 | 4/2013 | Sato et al. | |
| 2013/0094576 A1 | 4/2013 | Sato et al. | |
| 2013/0094577 A1 | 4/2013 | Sato et al. | |
| 2013/0094578 A1 | 4/2013 | Sato et al. | |
| 2013/0094579 A1 | 4/2013 | Sato et al. | |
| 2013/0216149 A1* | 8/2013 | Sato | H04N 19/61 382/233 |
| 2013/0330015 A1 | 12/2013 | Shimauchi et al. | |
| 2013/0343451 A1 | 12/2013 | Sato | |
| 2014/0064362 A1 | 3/2014 | Sato | |
| 2014/0072037 A1 | 3/2014 | Sato | |
| 2014/0086311 A1* | 3/2014 | Lou | H04N 19/157 375/240.03 |
| 2014/0105281 A1 | 4/2014 | Sato et al. | |
| 2014/0177728 A1 | 6/2014 | Zhang et al. | |
| 2014/0226714 A1 | 8/2014 | Sato et al. | |
| 2014/0369619 A1 | 12/2014 | Sato | |
| 2014/0369620 A1 | 12/2014 | Sato | |
| 2015/0010075 A1 | 1/2015 | Tanaka et al. | |
| 2015/0043637 A1 | 2/2015 | Morigami et al. | |
| 2015/0110176 A1 | 4/2015 | Sato et al. | |
| 2015/0358619 A1 | 12/2015 | Sato et al. | |
| 2016/0021370 A1 | 1/2016 | Sato | |
| 2016/0021371 A1 | 1/2016 | Sato | |
| 2017/0085876 A1 | 3/2017 | Sato | |
| 2017/0324954 A1 | 11/2017 | Sato | |
| 2018/0070085 A1 | 3/2018 | Sato | |

FOREIGN PATENT DOCUMENTS

| | | | |
|---|---|---|---|
| BR | 112013013513 A2 | 9/2016 | |
| CA | 2815985 A1 | 6/2012 | |
| CA | 2997244 A1 | 6/2012 | |
| CA | 2836161 A1 | 3/2013 | |
| CA | 2862282 A1 | 9/2013 | |
| CN | 1757237 A | 4/2006 | |
| CN | 101107862 A | 1/2008 | |
| CN | 103238328 A | 8/2013 | |
| CN | 103327319 A | 9/2013 | |
| CN | 103765788 A | 4/2014 | |
| CN | 104126306 A | 10/2014 | |
| CN | 104301724 A | 1/2015 | |
| CN | 105282549 A | 1/2016 | |
| CN | 105282551 A | 1/2016 | |
| CN | 105282552 A | 1/2016 | |
| CN | 105791842 A | 7/2016 | |
| CN | 105791843 A | 7/2016 | |
| CN | 105791844 A | 7/2016 | |
| CN | 105915908 A | 8/2016 | |
| CO | 6710956 A2 | 7/2013 | |
| EP | 1602239 A1 | 12/2005 | |
| EP | 1860886 A1 | 11/2007 | |
| EP | 2748934 A1 | 7/2014 | |
| EP | 2822275 A1 | 1/2015 | |
| EP | 2651134 B1 | 10/2016 | |
| EP | 2955921 B1 | 11/2016 | |
| EP | 2955922 B1 | 11/2016 | |
| EP | 2955923 B1 | 11/2016 | |
| EP | 3113493 A1 | 1/2017 | |
| ES | 2599453 T3 | 2/2017 | |
| ES | 2607822 T3 | 4/2017 | |
| ES | 2607823 T3 | 4/2017 | |
| ES | 2607882 T3 | 4/2017 | |
| GB | 2516422 A * | 1/2015 | ............ H04N 19/61 |
| HK | 1219012 A1 | 3/2017 | |
| HK | 1219598 A1 | 4/2017 | |
| HK | 1219599 A1 | 4/2017 | |
| HK | 1187179 A1 | 8/2017 | |
| HU | E029831 T2 | 4/2017 | |
| HU | E030180 T2 | 4/2017 | |
| HU | E030953 T2 | 6/2017 | |
| HU | E031255 T2 | 7/2017 | |
| JP | 2006-519565 A | 8/2006 | |
| JP | 2013-146038 A | 7/2013 | |
| JP | 2014-519766 A | 8/2014 | |
| JP | 5741076 B2 | 7/2015 | |
| KR | 10-2005-0105268 A | 11/2005 | |
| KR | 10-2007-0110517 A | 11/2007 | |
| KR | 10-2013-0137645 A | 12/2013 | |
| KR | 10-2014-0143138 A | 12/2014 | |
| KR | 10-2016-0108577 A | 9/2016 | |
| KR | 10-2016-0108578 A | 9/2016 | |
| KR | 10-2016-0108579 A | 9/2016 | |
| KR | 10-2018-0026576 A | 3/2018 | |
| KR | 10-2019-0002734 A | 1/2019 | |
| KR | 10-2019-0016614 A | 2/2019 | |
| MX | 2014010113 A | 10/2014 | |
| MX | 336658 B | 1/2016 | |
| MY | 165377 A | 3/2018 | |
| PH | 12015501376 A1 | 9/2015 | |
| PH | 12015501379 A1 | 9/2015 | |
| PH | 12015501383 A1 | 9/2015 | |
| RU | 2013125499 A | 12/2014 | |
| RU | 2014134533 A | 3/2016 | |
| RU | 2016122534 A | 11/2018 | |
| RU | 2016122546 A | 11/2018 | |
| RU | 2016122548 A | 11/2018 | |
| SG | 196851 A1 | 2/2014 | |
| SG | 196853 A1 | 2/2014 | |
| SG | 196854 A1 | 2/2014 | |
| TW | 201336315 A | 9/2013 | |
| WO | 2004/080081 A1 | 9/2004 | |
| WO | 2006/098226 A1 | 9/2006 | |
| WO | 2012/077408 A1 | 6/2012 | |
| WO | 2013/032794 A1 | 3/2013 | |
| WO | 2013/089264 A1 | 6/2013 | |
| WO | WO-2013089264 A1 * | 6/2013 | ........... H04N 19/463 |
| WO | 2013/129203 A1 | 9/2013 | |
| WO | 2013/154028 A1 | 10/2013 | |
| ZA | 201304007 B | 2/2014 | |

OTHER PUBLICATIONS

International Search Report and Written Opinion of PCT Application No. PCT/JP2017/022676, dated Sep. 5, 2017, 11 pages of ISRWO.

Extended European Search Report of EP Patent Application No. 17823994.3, dated Apr. 8, 2019, 12 pages.

"High Efficiency Video Coding", Series H: Audiovisual and Multimedia Systems, Infrastructure of Audiovisual Services—Coding of Moving Video, Telecommunication Standardization Sector of ITU, H.265, Apr. 2013, pp. 1-317.

"High Efficiency Video Coding", Series H: Audiovisual and Multimedia Systems, Infrastructure of audiovisual services—Coding of moving video, Telecommunication Standardization Sector of ITU, H.265, Apr. 2013, 09 pages.

(56) References Cited

OTHER PUBLICATIONS

"High Efficiency Video Coding", Series H: Audiovisual and Multimedia Systems, Infrastructure of audiovisual services—Coding of moving video, Telecommunication Standardization Sector of ITU, H.265, Apr. 2015, 634 pages.

Office Action for EP Patent Application No. 17823994.3, dated Mar. 20, 2020, 06 pages.

"Series H: Audiovisual and Multimedia Systems: Infrastructure of audiovisual services—Coding of moving video", High Efficiency video coding, Telecommunication Standardization sector of ITU, H.265, Apr. 2013, 09 pages.

Office Action for JP Patent Application No. 2018-526007, dated Apr. 13, 2021, 06 pages of English Translation and 06 pages of Office Action.

"High efficiency video coding—Series H: Audiovisual And Multimedia Systems Infrastructure of audiovisual services—Coding of moving video", International Telecommunication Union, Recommendation ITU-T Telecommunication Standardization sector of ITU H.265, Apr. 30, 2013, 317 pages.

Office Action for CN Patent Application No. 201780040828.1, dated Nov. 27, 2020, 09 pages of Office Action and 11 pages of English Translation.

Office Action for KR Patent Application No. 10-2018-7036834 dated Jul. 2, 2021, 6 pages of Office Action and 06 pages of English Translation.

"Series H: Audiovisual and Multimedia Systems Infrastructure of audiovisual services—Coding of moving video", ITU-T H.265 Telecommunication Standardization Sector of ITU, Apr. 2013, 317 pages.

\* cited by examiner

FIG. 6

| | HIGH RATE | MEDIUM RATE | LOW RATE |
|---|---|---|---|
| 4×4 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 8×8 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 16×16 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 32×32 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: MEDIUM<br>HIGH FREQUENCY: MEDIUM | LOW FREQUENCY: SMALL<br>MEDIUM FREQUENCY: MEDIUM<br>HIGH FREQUENCY: MEDIUM |

CHANGE SCALING LIST IN ACCORDANCE WITH RATE

CREATE SAME PICTURES REGARDLESS OF TU SIZE

| HIGH RATE | | | | | | | |
|---|---|---|---|---|---|---|---|
| 16 | 17 | 18 | 19 | 20 | 21 | 22 | 23 |
| 17 | 18 | 19 | 20 | 21 | 22 | 23 | 24 |
| 18 | 19 | 20 | 21 | 22 | 23 | 24 | 25 |
| 19 | 20 | 21 | 22 | 23 | 24 | 25 | 26 |
| 20 | 21 | 22 | 23 | 24 | 25 | 26 | 27 |
| 21 | 22 | 23 | 24 | 25 | 26 | 27 | 28 |
| 22 | 23 | 24 | 25 | 26 | 27 | 28 | 29 |
| 23 | 24 | 25 | 26 | 27 | 28 | 29 | 30 |

FIG. 7A

| LOW RATE | | | | | | | |
|---|---|---|---|---|---|---|---|
| 16 | 18 | 20 | 22 | 24 | 28 | 32 | 36 |
| 18 | 20 | 22 | 24 | 28 | 32 | 36 | 40 |
| 20 | 22 | 24 | 28 | 32 | 36 | 40 | 44 |
| 22 | 24 | 28 | 32 | 36 | 40 | 44 | 48 |
| 24 | 28 | 32 | 36 | 40 | 44 | 48 | 52 |
| 28 | 32 | 36 | 40 | 44 | 48 | 52 | 56 |
| 32 | 36 | 40 | 44 | 48 | 52 | 56 | 60 |
| 36 | 40 | 44 | 48 | 52 | 56 | 60 | 64 |

CHANGE SCALING LIST IN ACCORDANCE WITH RATE →

| | HIGH RATE | MEDIUM RATE | LOW RATE |
|---|---|---|---|
| 4×4 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 8×8 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 16×16 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: LARGE |
| 32×32 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: LARGE |

CHANGE SCALING LIST IN ACCORDANCE WITH TU SIZE →

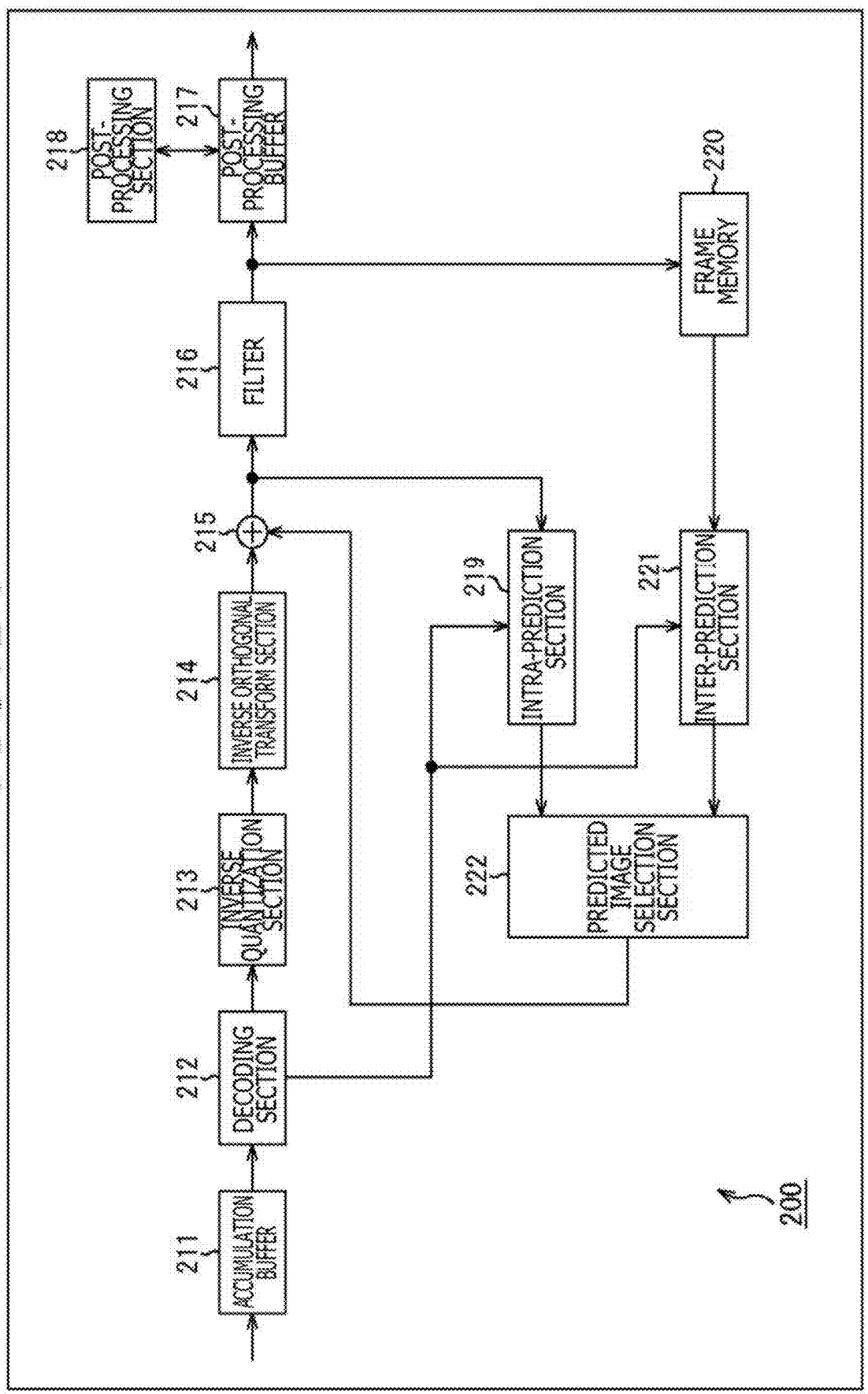

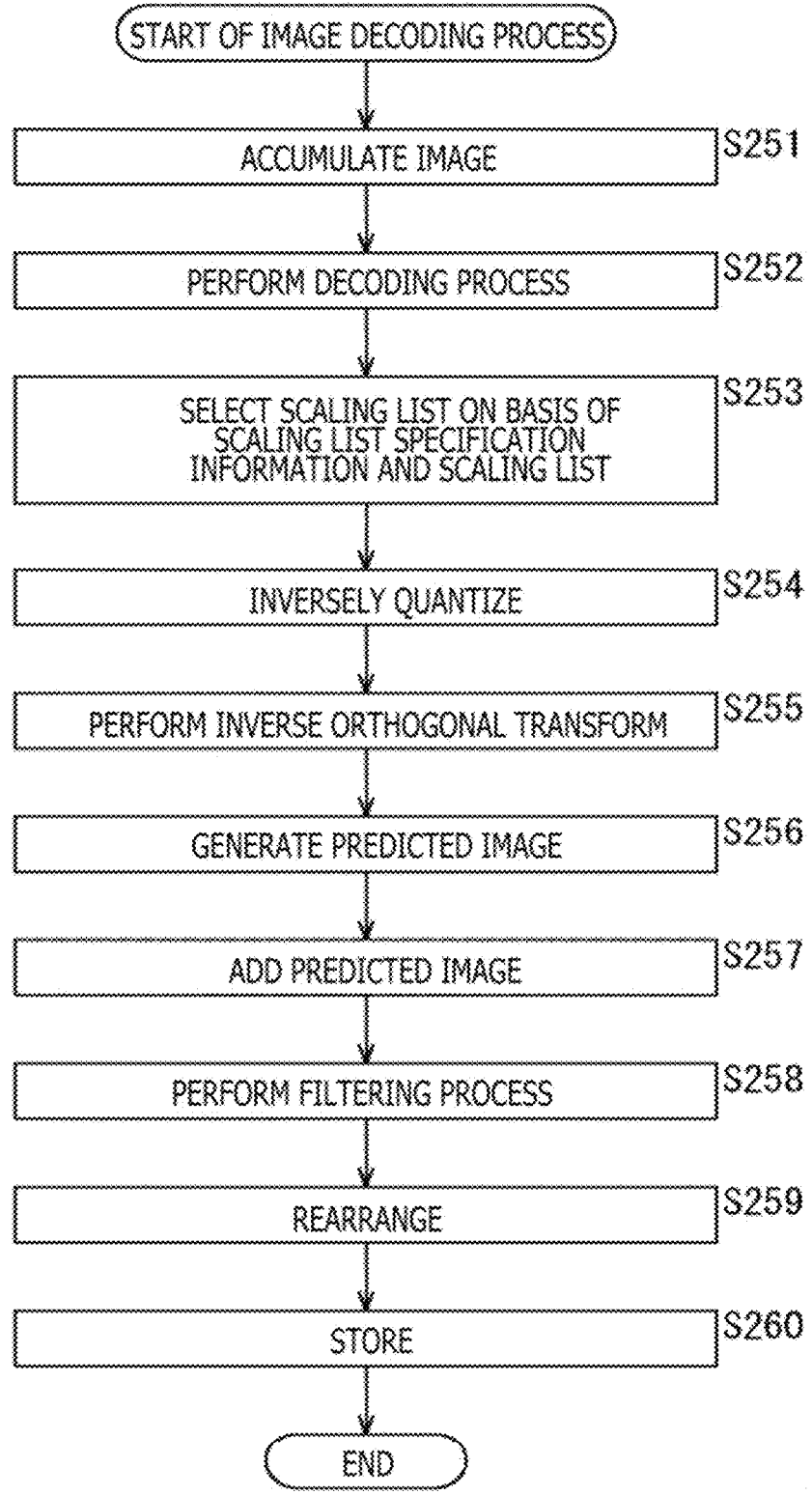

FIG. 29

CHANGE SCALING LIST IN ACCORDANCE WITH RATE →

| | HIGH RATE | MEDIUM RATE | LOW RATE |
|---|---|---|---|
| 4×4 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 8×8 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 16×16 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: LARGE |
| 32×32 | LOW FREQUENCY: VERY SMALL<br>MEDIUM FREQUENCY: VERY SMALL<br>HIGH FREQUENCY: SMALL | LOW FREQUENCY: VERY SMALL<br>MEDIUM FREQUENCY: VERY SMALL<br>HIGH FREQUENCY: MEDIUM | LOW FREQUENCY: VERY SMALL<br>MEDIUM FREQUENCY: VERY SMALL<br>HIGH FREQUENCY: LARGE |

CHANGE SCALING LIST IN ACCORDANCE WITH TU size →

FIG. 31

CHANGE SCALING LIST IN ACCORDANCE WITH RATE →

| | HIGH RATE | MEDIUM RATE | LOW RATE |
|---|---|---|---|
| 4×4 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 8×8 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 16×16 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: LARGE |
| 32×32 | LOW FREQUENCY: VERY SMALL (H)<br>MEDIUM FREQUENCY: VERY SMALL (H)<br>HIGH FREQUENCY: SMALL | LOW FREQUENCY: VERY SMALL (M)<br>MEDIUM FREQUENCY: VERY SMALL (M)<br>HIGH FREQUENCY: MEDIUM | LOW FREQUENCY: VERY SMALL (L)<br>MEDIUM FREQUENCY: VERY SMALL (L)<br>HIGH FREQUENCY: LARGE |

CHANGE SCALING LIST IN ACCORDANCE WITH TU size →

FIG. 38

HIGH RATE

| 16 | 17 | 18 | 19 | 20 | 21 | 22 | 23 |
|----|----|----|----|----|----|----|----|
| 17 | 18 | 19 | 20 | 21 | 22 | 23 | 24 |
| 18 | 19 | 20 | 21 | 22 | 23 | 24 | 25 |
| 19 | 20 | 21 | 22 | 23 | 24 | 25 | 26 |
| 20 | 21 | 22 | 23 | 24 | 25 | 26 | 27 |
| 21 | 22 | 23 | 24 | 25 | 26 | 27 | 28 |
| 22 | 23 | 24 | 25 | 26 | 27 | 28 | 29 |
| 23 | 24 | 25 | 26 | 27 | 28 | 29 | 30 |

LOW RATE

| 16 | 18 | 20 | 22 | 24 | 28 | 32 | 36 |
|----|----|----|----|----|----|----|----|
| 18 | 20 | 22 | 24 | 28 | 32 | 36 | 40 |
| 20 | 22 | 24 | 28 | 32 | 36 | 40 | 44 |
| 22 | 24 | 28 | 32 | 36 | 40 | 44 | 48 |
| 24 | 28 | 32 | 36 | 40 | 44 | 48 | 52 |
| 28 | 32 | 36 | 40 | 44 | 48 | 52 | 56 |
| 32 | 36 | 40 | 44 | 48 | 52 | 56 | 60 |
| 36 | 40 | 44 | 48 | 52 | 56 | 60 | 64 |

HIGH RATE 8×4

| 16 | 18 | 20 | 22 |
|----|----|----|----|
| 17 | 19 | 21 | 23 |
| 18 | 20 | 22 | 24 |
| 19 | 21 | 23 | 25 |
| 20 | 22 | 24 | 26 |
| 21 | 23 | 25 | 27 |
| 22 | 24 | 26 | 28 |
| 23 | 25 | 27 | 29 |

LOW RATE 8×4

| 16 | 20 | 24 | 32 |
|----|----|----|----|
| 20 | 24 | 28 | 36 |
| 22 | 28 | 32 | 40 |
| 24 | 32 | 40 | 48 |
| 28 | 36 | 44 | 52 |
| 32 | 40 | 48 | 56 |
| 36 | 44 | 52 | 60 |

FIG. 39

CHANGE SCALING LIST IN ACCORDANCE WITH RATE

| | HIGH RATE | MEDIUM RATE | LOW RATE |
|---|---|---|---|
| 4×4 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 8×8<br>8×8<br>(4×8) | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 16×16<br>16×8<br>16×4<br>(8×16)<br>(4×16) | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 32×32<br>32×16<br>32×8<br>32×4<br>(16×32)<br>(8×32)<br>(4×32) | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |

CHANGE SCALING LIST IN ACCORDANCE WITH TU size

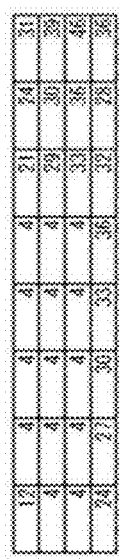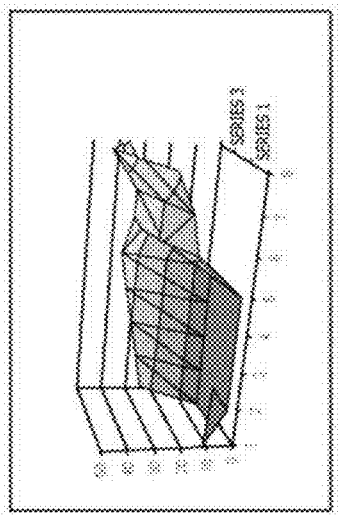
FIG. 40C
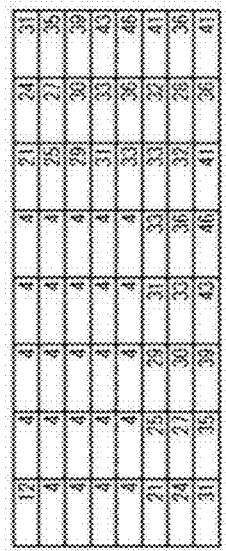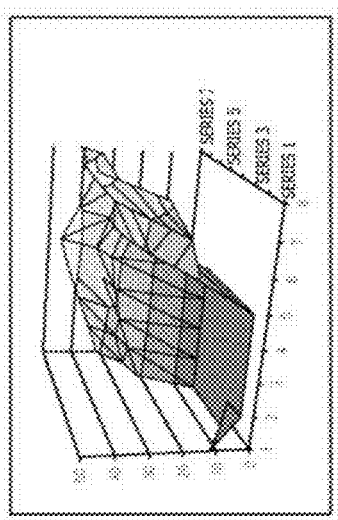
FIG. 40B
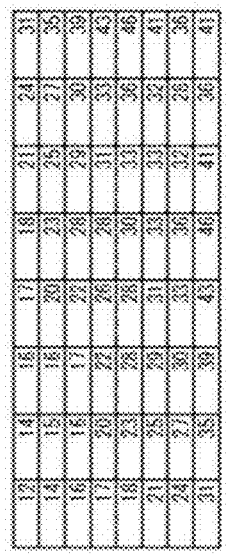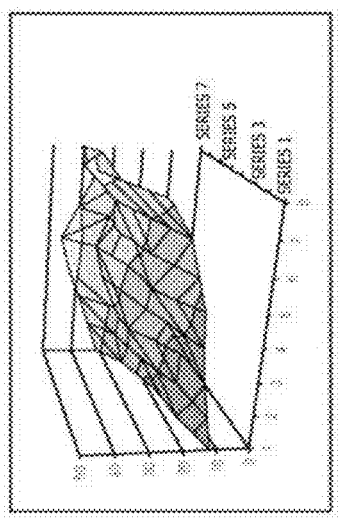
FIG. 40A

FIG. 41

CHANGE SCALING LIST IN ACCORDANCE WITH RATE →

| | HIGH RATE | MEDIUM RATE | LOW RATE |
|---|---|---|---|
| 4×4 | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 8×8<br>8×8<br>(4×8) | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: MEDIUM |
| 16×16<br>16×8<br>16×4<br>(8×16)<br>(4×16) | LOW FREQUENCY: SMALL<br>MEDIUM FREQUENCY: SMALL<br>HIGH FREQUENCY: SMALL | LOW FREQUENCY: SMALL<br>MEDIUM FREQUENCY: SMALL<br>HIGH FREQUENCY: MEDIUM | LOW FREQUENCY: SMALL<br>MEDIUM FREQUENCY: MEDIUM<br>HIGH FREQUENCY: LARGE |
| 32×32<br>32×16<br>32×8<br>32×4<br>(16×32)<br>(8×32)<br>(4×32) | LOW FREQUENCY: VERY SMALL<br>MEDIUM FREQUENCY: VERY SMALL<br>HIGH FREQUENCY: SMALL | LOW FREQUENCY: VERY SMALL<br>MEDIUM FREQUENCY: VERY SMALL<br>HIGH FREQUENCY: MEDIUM | LOW FREQUENCY: VERY SMALL<br>MEDIUM FREQUENCY: VERY SMALL<br>HIGH FREQUENCY: LARGE |

CHANGE SCALING LIST IN ACCORDANCE WITH TU SIZE →

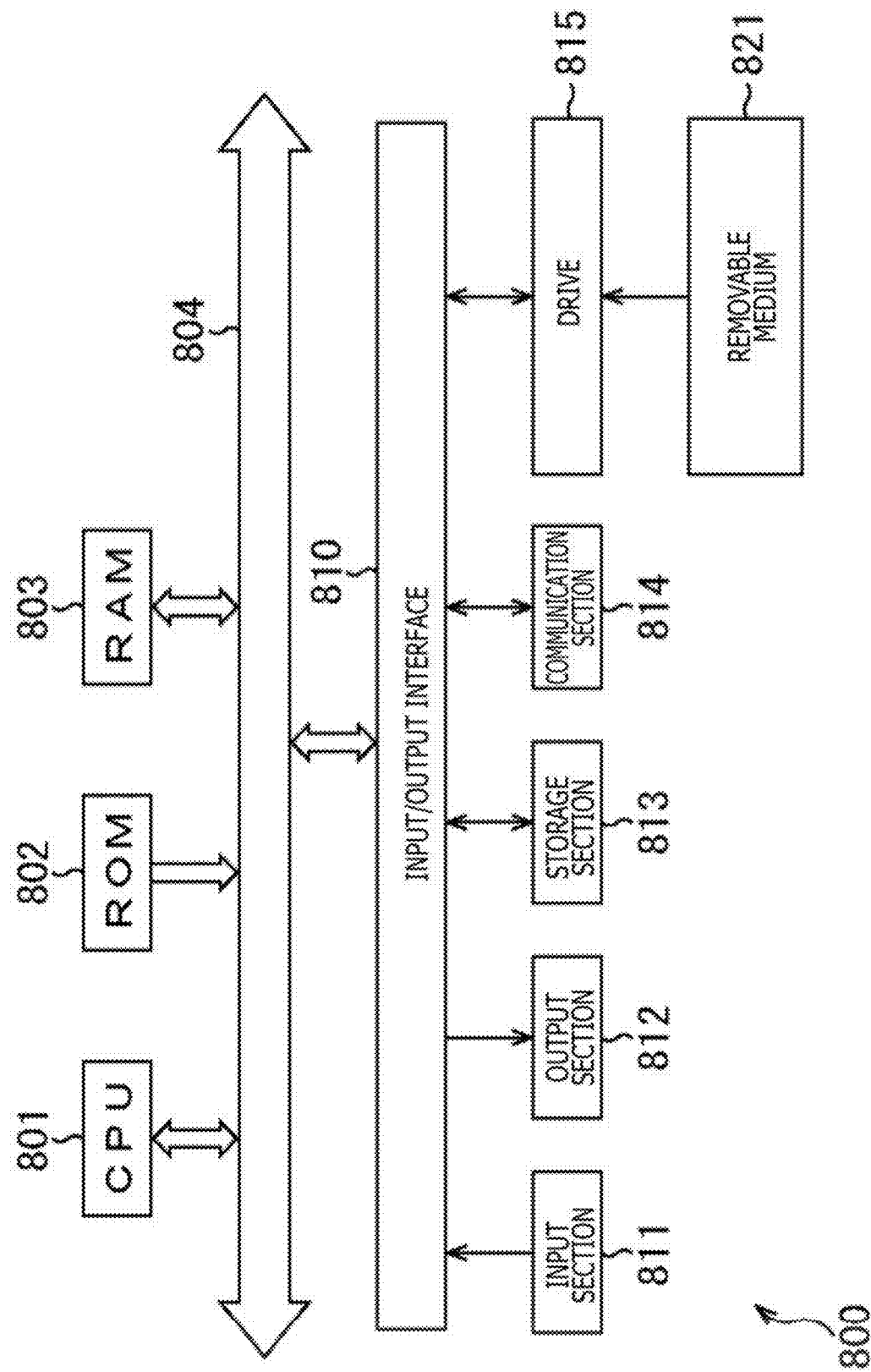

IMAGE PROCESSING APPARATUS AND METHOD

CROSS REFERENCE TO RELATED APPLICATIONS

This application is a U.S. National Phase of International Patent Application No. PCT/JP2017/022676 filed on Jun. 20, 2017, which claims priority benefit of Japanese Patent Application No. JP 2016-132246 filed in the Japan Patent Office on Jul. 4, 2016 and also claims priority benefit of Japanese Patent Application No. JP 2017-029341 filed in the Japan Patent Office on Feb. 20, 2017. Each of the above-referenced applications is hereby incorporated herein by reference in its entirety.

TECHNICAL FIELD

The present disclosure relates to an image processing apparatus and method and, more particularly, to an image processing apparatus and method that can keep reduction in coding efficiency to a minimum.

BACKGROUND ART

Recent years have seen efforts underway to standardize a coding scheme referred to as HEVC (High Efficiency Video Coding) by JCTVC (Joint Collaboration Team-Video Coding), a joint standardization organization formed by ITU-T (International Telecommunication Union Telecommunication Standardization Sector) and ISO/IEC (International Organization for Standardization/International Electrotechnical Commission) with an aim of further improving coding efficiency beyond that with MPEG-4 Part10 (Advanced Video Coding; hereinafter denoted as AVC) (refer, for example, to NPL 1).

In HEVC, a TU (Transform Unit) can be set to a size from 4×4 pixels T032×32 pixels as a processing unit of an orthogonal transform process.

CITATION LIST

Non-Patent Literature

[NPL 1]
ITU-T, "SERIES H: AUDIOVISUAL AND MULTIMEDIA SYSTEMS Infrastructure of audiovisual services. Coding of moving video High efficiency video coding," ITU-T H.265 (V3), 2015-04-29

SUMMARY

Technical Problem

In HEVC quantization, however, a uniform scaling list independent of TU size was applied. For this reason, scaling lists having values similar to those for small-size TUs were applied to large-size TUs, resulting in transmission of information having only a small impact on a subjective image quality and possibly reducing coding efficiency.

The present disclosure has been devised in light of such circumstances, and it is an object of the present disclosure to keep reduction in coding efficiency to a minimum.

Solution to Problem

An image processing apparatus according to an aspect of the present technology includes a scaling list setting section, a quantization section, and a coding section. The scaling list setting section sets, for a current block to be quantized in an image to be coded, a scaling list having values appropriate to a size of the current block. The quantization section performs quantization using the scaling list set by the scaling list setting section. The coding section generates coded data by coding a quantization coefficient acquired by the quantization section.

The larger the current block size, the larger the values of the scaling list that can be set by the scaling list setting section.

The scaling list setting section can set, for the current block having a 16×16 size, a scaling list some of whose values on a higher frequency component side are larger than in the scaling list corresponding to the case of an 8×8 size or smaller.

The scaling list setting section can set, for the current block having a 32×32 size, a scaling list all of whose values are larger than in the scaling list corresponding to the case of an 8×8 size or smaller.

The scaling list setting section can set, for the current block, a scaling list having values appropriate to the current block size and a target bitrate for coding.

In the case where the target bitrate is low, the scaling list setting section can set, for the current block, a scaling list having values appropriate to the current block size.

The scaling list setting section can determine, on the basis of a specification of the target bitrate supplied from outside the image processing apparatus, whether or not the target bitrate is low and set, for the current block, a scaling list having values appropriate to the current block size in the case where the target bitrate is low.

The image processing apparatus further includes a flatness detection section and a block setting section. The flatness detection section detects a flat portion included in the image to be coded. The block setting section sets a large size block in the flat portion detected by the flatness detection section. The scaling list setting section can be configured to set, for the large size block set by the block setting section, a scaling list having values appropriate to the block size.

The flatness detection section can detect the flat portion in the case where the target bitrate is low.

The flatness detection section can detect the flat portion in a region other than a region of interest of the image, and the block setting section can inhibit the setting of a large size block in the region of interest.

The scaling list setting section can select, from among a plurality of scaling lists made available in advance, a scaling list having values appropriate to the current block size, and the coding section can code identification information indicating the scaling list selected by the scaling list setting section and store the information in the coded data.

The coding section can code the plurality of scaling lists and store the lists in the coded data.

The scaling list setting section can, in the case where the current block size is equal to or larger than a given size, set a scaling list some of whose values on a lower frequency component side are smaller than in the case of a block smaller than the given size.

The given size can be 32×32.

The scaling list setting section can, in the case where a dynamic range of the image is larger than a given range, and where the current block size is equal to or larger than the given size, set a scaling list some of whose values on the lower frequency component side are smaller than in the case of a block that is smaller than the given size.

The given range can be 10 bits.

The scaling list setting section can set, in the case where the current block size is equal to or larger than the given size, a scaling list some of whose values on the lower frequency component side are smaller than in the case of a block smaller than the given size and are appropriate to the target bit rate.

The scaling list setting section can set, in the case where a current picture includes a flat portion with a small change in brightness, a scaling list some of whose values on the lower frequency component side are smaller than in the case where the flat portion is not included.

The scaling list setting section can set a scaling list for some of coefficients on the lower frequency component side of the current block.

An image processing method of an aspect of the present technology is an image processing method that sets, for a current block to be quantized in an image to be coded, a scaling list having values appropriate to the size of the current block, performs quantization using the scaling list that has been set, and generates coded data by coding an acquired quantization coefficient.

In the image processing apparatus and method of an aspect of the present technology, a scaling list is set for the current block to be quantized in an image to be coded, with the scaling list having values appropriate to the size of the current block, quantization is performed using the scaling list that has been set, and coded data is generated by coding an acquired quantization coefficient.

Advantageous Effect of Invention

According to the present disclosure, it is possible to process images. In particular, it is possible to keep reduction in subjective image quality to a minimum.

BRIEF DESCRIPTION OF DRAWINGS

FIG. 6 is a diagram illustrating an example of a manner in which a scaling list is selected.

FIGS. 7A and 7B are diagrams illustrating examples of scaling lists.

FIG. 8 is a diagram illustrating an example of a manner in which a scaling list is selected.

FIG. 24 is a block diagram illustrating a main configuration example of an image decoding apparatus.

FIG. 25 is a flowchart describing an example of a flow of an image decoding process.

FIG. 29 is a diagram illustrating a manner in which a scaling list is selected.

FIG. 31 is a diagram illustrating a manner in which a scaling list is selected.

FIG. 38 is a diagram illustrating an example of a scaling list.

FIG. 39 is a diagram illustrating an example of a manner in which a scaling list is selected.

FIGS. 40A, 40B, and 40C are diagrams illustrating examples of scaling lists.

FIG. 41 is a diagram illustrating an example of a manner in which a scaling list is selected.

FIG. 42 is a block diagram illustrating a main configuration example of a computer.

DESCRIPTION OF EMBODIMENTS

A description will be given below of modes for carrying out the present disclosure (hereinafter referred to as embodiments). It should be noted that the description will be given in the following order:
1. First embodiment (image coding apparatus)
2. Second embodiment (pre-processing section)
3. Third embodiment (pre-processing section)
4. Fourth embodiment (pre-processing section)
5. Fifth embodiment (image coding apparatus and image decoding apparatus)
6. Sixth embodiment (banding noise)
7. Seventh embodiment (selection of scaling list)
8. Eighth embodiment (flatness detection)
9. Ninth embodiment (QTBT)
10. Tenth embodiment (others)

1. First Embodiment

<Block Partitioning>

Recent years have seen efforts underway to standardize a coding scheme referred to as HEVC (High Efficiency Video Coding) by JCTVC (Joint Collaboration Team-Video Coding), a joint standardization organization formed by ITU-T (International Telecommunication Union Telecommunication Standardization Sector) and ISO/IEC (International Organization for Standardization/International Electrotechnical Commission) with an aim of further improving coding efficiency beyond that with MPEG-4 Part10 (Advanced Video Coding; hereinafter denoted as AVC).

In image coding schemes in the past such as MPEG2 (Moving Picture Experts Group 2 (ISO/IEC 13818-2)) and AVC, a coding process is performed in processing units called macro blocks. A macro block is a block having a uniform size of 16×16 pixels. In contrast, in HEVC, a coding process is performed in processing units (coding units) called CUs (Coding Units). CUs are blocks having a variable size formed by recursively partitioning an LCU (Largest Coding Unit), the largest coding unit. The largest selectable CU size is 64×64 pixels. The smallest selectable CU size is 8×8 pixels. The smallest CU size is called an SCU (Smallest Coding Unit).

Thus, because CUs having a variable size are used, HEVC permits adaptive adjustment of image quality and coding efficiency appropriate to the nature of the image. A prediction process for predictive coding is performed in processing units (prediction units) called PUs (Prediction Units). PUs are formed by partitioning a CU in one of a plurality of partitioning patterns. Also, a PU includes processing units (prediction blocks) called PBs (Prediction Blocks) for each brightness (Y) and color difference (Cb, Cr). Further, an orthogonal transform process is performed in processing units (transform units) called TUs (Transform Units). TUs are formed by partitioning a CU or a PU to a certain depth. Also, a TU includes processing units (transform blocks) called TBs (Transform Blocks) for each brightness (Y) and color difference (Cb, Cr).

<Recursive Block Partitioning>

Figure 1:
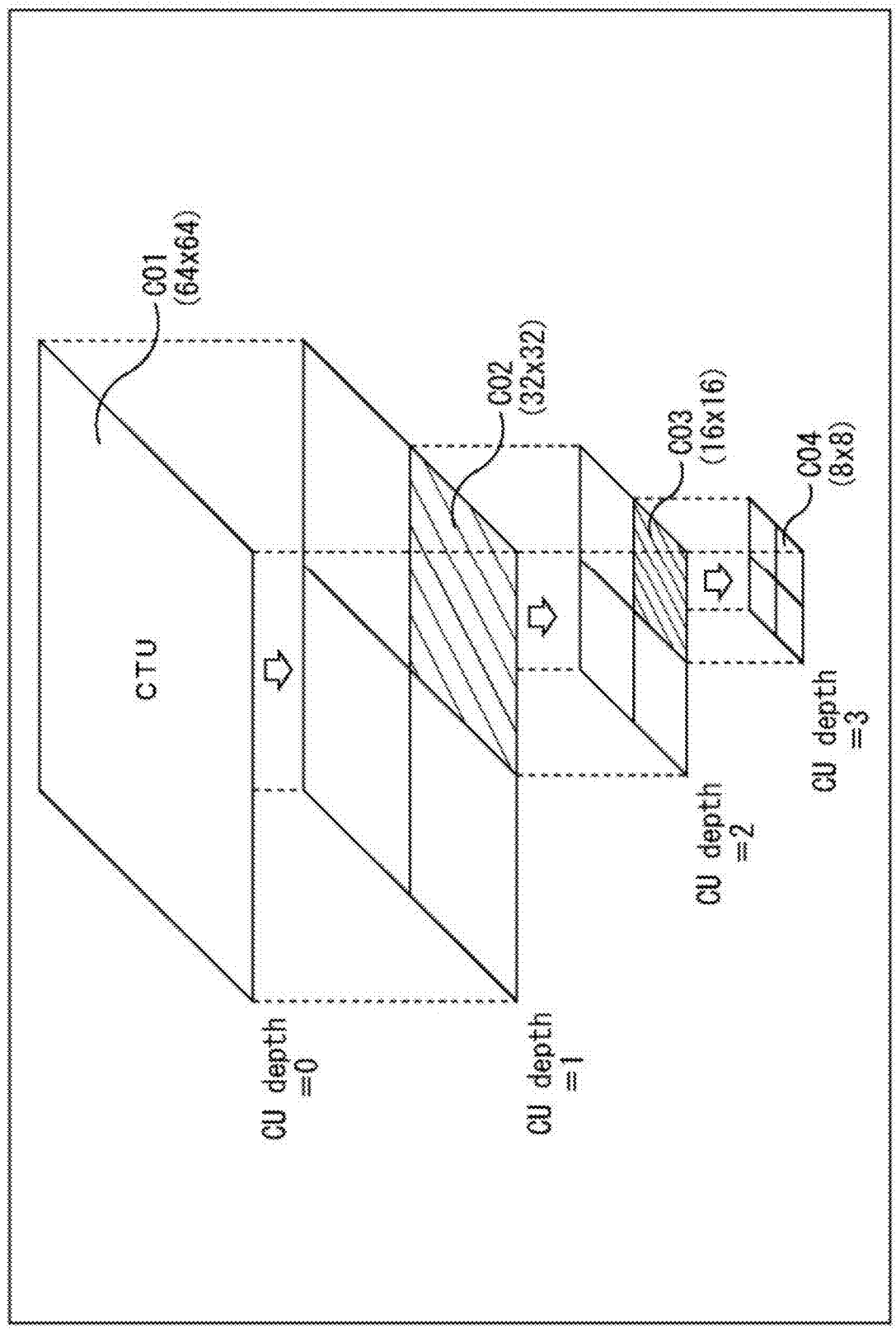
FIG. 1 is an explanatory diagram for describing the outline of recursive partitioning of a CU into blocks.

FIG. 1 is an explanatory diagram for describing the outline of recursive partitioning of a CU into blocks in HEVC. CU block partitioning is conducted by recursively repeating the partitioning of one block into four (=2×2) blocks. As a result, a tree structure in a quad-tree shape is formed. The whole of one quad-tree is called a CTB (Coding Tree Block), and a logical unit corresponding to a CTB is called a CTU (Coding Tree Unit).

C01, a CU having a 64×64 pixel size, is illustrated at the top in FIG. 1 as an example. The depth of C01 partitioning is equal to zero. This means that C01 is a CTU's route and equivalent to an LCU. The LCU size can be specified by a parameter that is coded by a SPS (Sequence Parameter Set) or a PPS (Picture Parameter Set). C02, a CU, is one of four CUs partitioned from C01 and has a 32×32 pixel size. The depth of C02 partitioning is equal to 1. C03, a CU, is one of four CUs partitioned from C02 and has a 16×16 pixel size. The depth of C03 partitioning is equal to 2. C04, a CU, is one of four CUs partitioned from C03 and has an 8×8 pixel size. The depth of C04 partitioning is equal to 3. Thus, CUs are formed by recursively partitioning a coded image. The partitioning depth is variable. For example, CUs having a larger size (i.e., a minute depth) can be set in a flat image region such as blue sky. On the other hand, CUs having a smaller size (i.e., a great depth) can be set in a steep image region having a number of edges. Then, each of the CUs that have been set are used as a processing unit of a coding process.

<Setting Up PUs into the CU>

Figure 2:
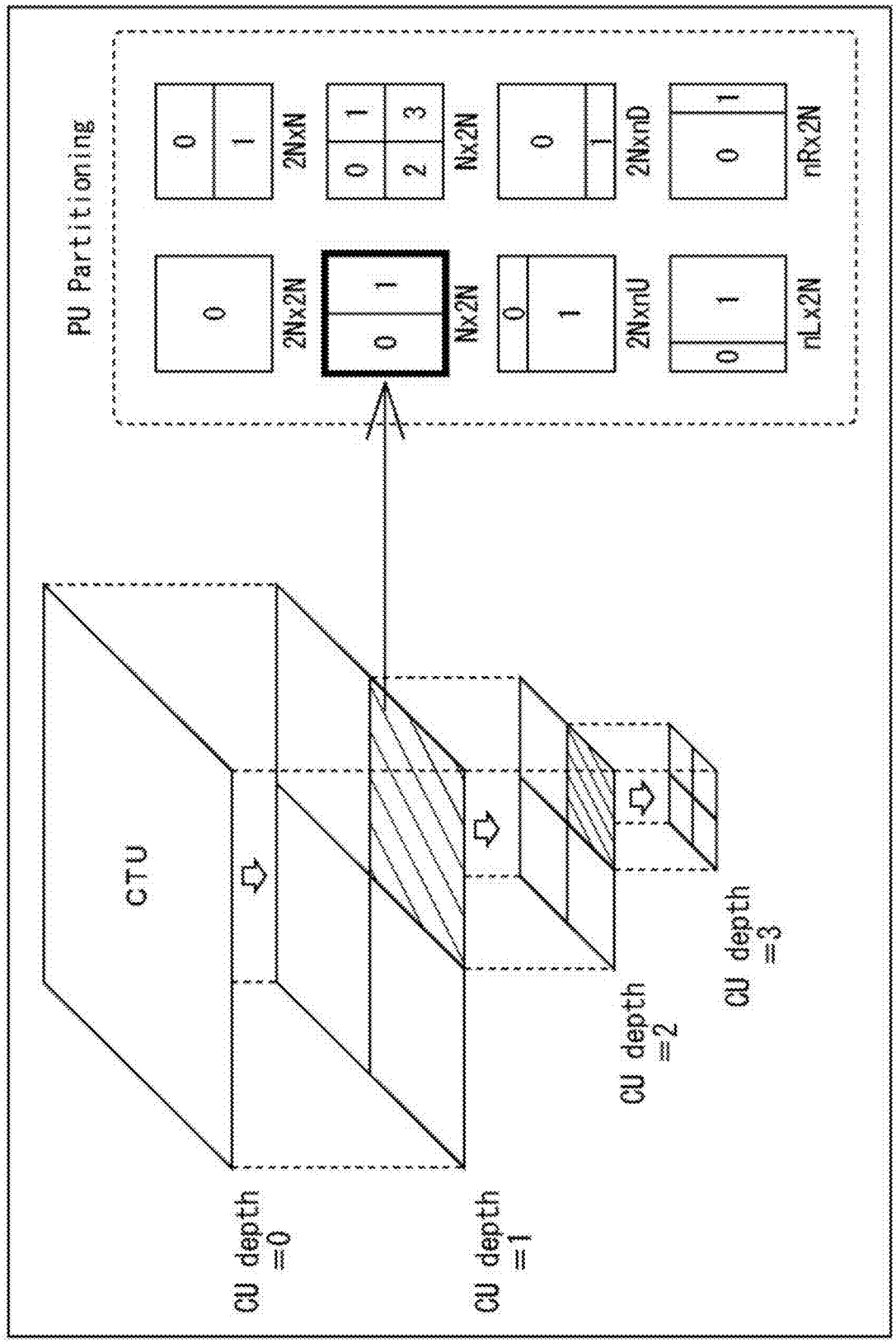
FIG. 2 is an explanatory diagram for describing setting of PUs into the CU illustrated in FIG. 1.

PUs are processing units for prediction process including intra-prediction and inter-prediction. PUs are formed by partitioning a CU in one of a plurality of partitioning patterns. FIG. 2 is an explanatory diagram for describing setting of PUs into the CU illustrated in FIG. 1. Eight types of partitioning patterns, namely, 2N×2N, 2N×N, N×2N, N×N, 2N×nU, 2N×nD, nL×2N, and nR×2N are illustrated at right in FIG. 2. Of these patterns, two types or 2N×2N and N×N can be selected in intra-prediction (N×N can be selected only in SCU). In contrast, all the eight partitioning patterns can be selected in inter-prediction in the case where asymmetric motion partitioning is enabled.

<Setting Up TUs into the CU>

Figure 3:
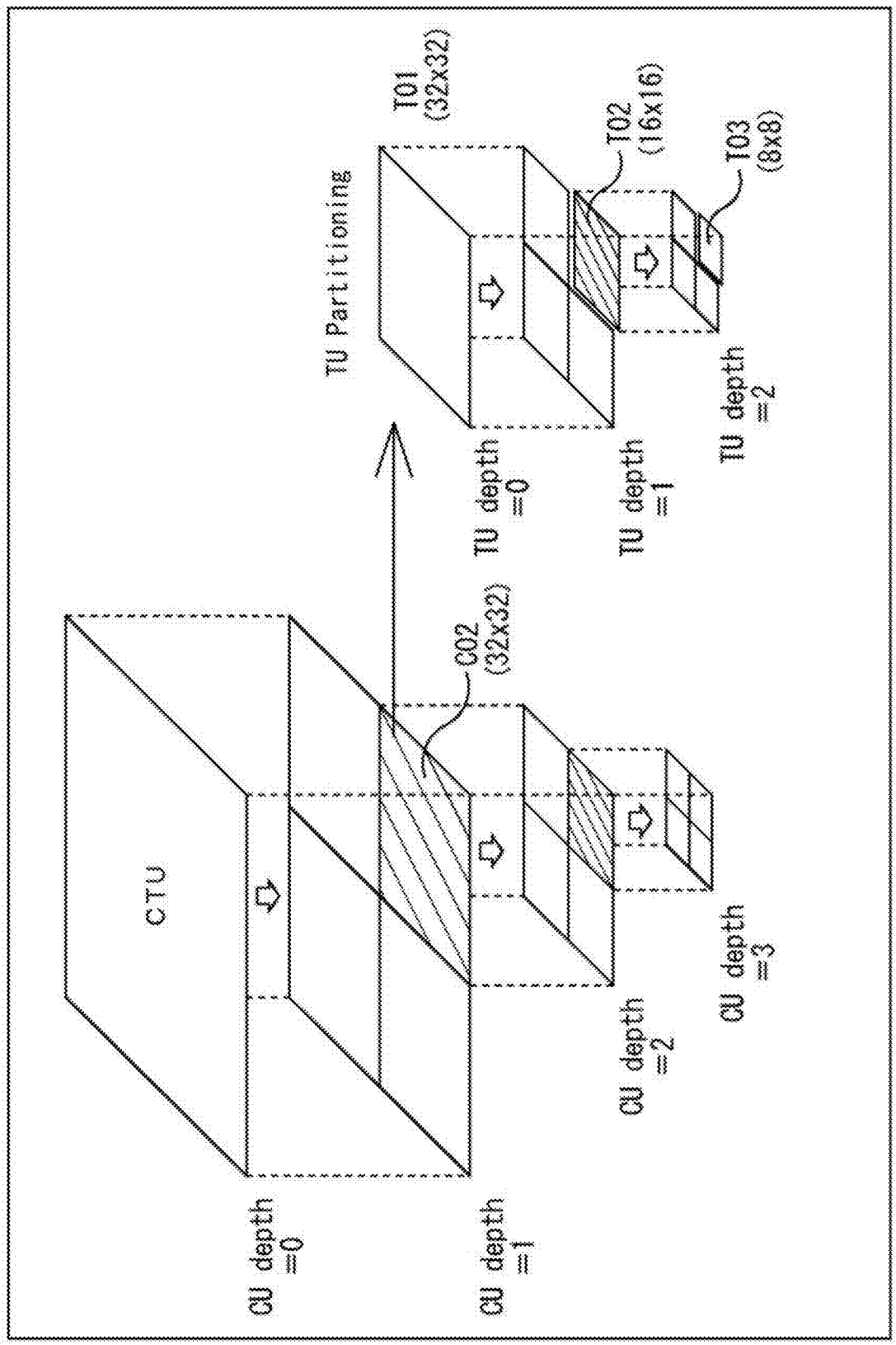
FIG. 3 is an explanatory diagram for describing setting of TUs into the CU illustrated in FIG. 1.

TUs are processing units for an orthogonal transform process. TUs are formed by partitioning a CU (or each PU in a CU regarding the intra CU) to a certain depth. FIG. 3 is an explanatory diagram for describing setting of TUs into the CU illustrated in FIG. 2. One or more TUs that can be set in C02 are illustrated at right in FIG. 3. For example, T01, a TU, has a 32×32 pixel size, and the depth of TU partitioning is equal to zero. T02, a TU, has a 16×16 pixel size, and the depth of TU partitioning is equal T01. T03, a TU, has an 8×8 pixel size, and the depth of TU partitioning is equal T02.

How blocks such as CUs, PUs, and TUs described above are partitioned to set the blocks in an image is typically determined on the basis of comparison of costs that affect coding efficiency. An encoder compares costs, for example, between one CU having 2M×2M pixels and four CUs each having M×M pixels and decides on the partitioning of the CU having 2M×2M pixels into four CUs each having M×M pixels if setting up four CUs, each having M×M pixels, offers higher coding efficiency.

<Scanning Orders of CUs and PUs>

Figure 4:
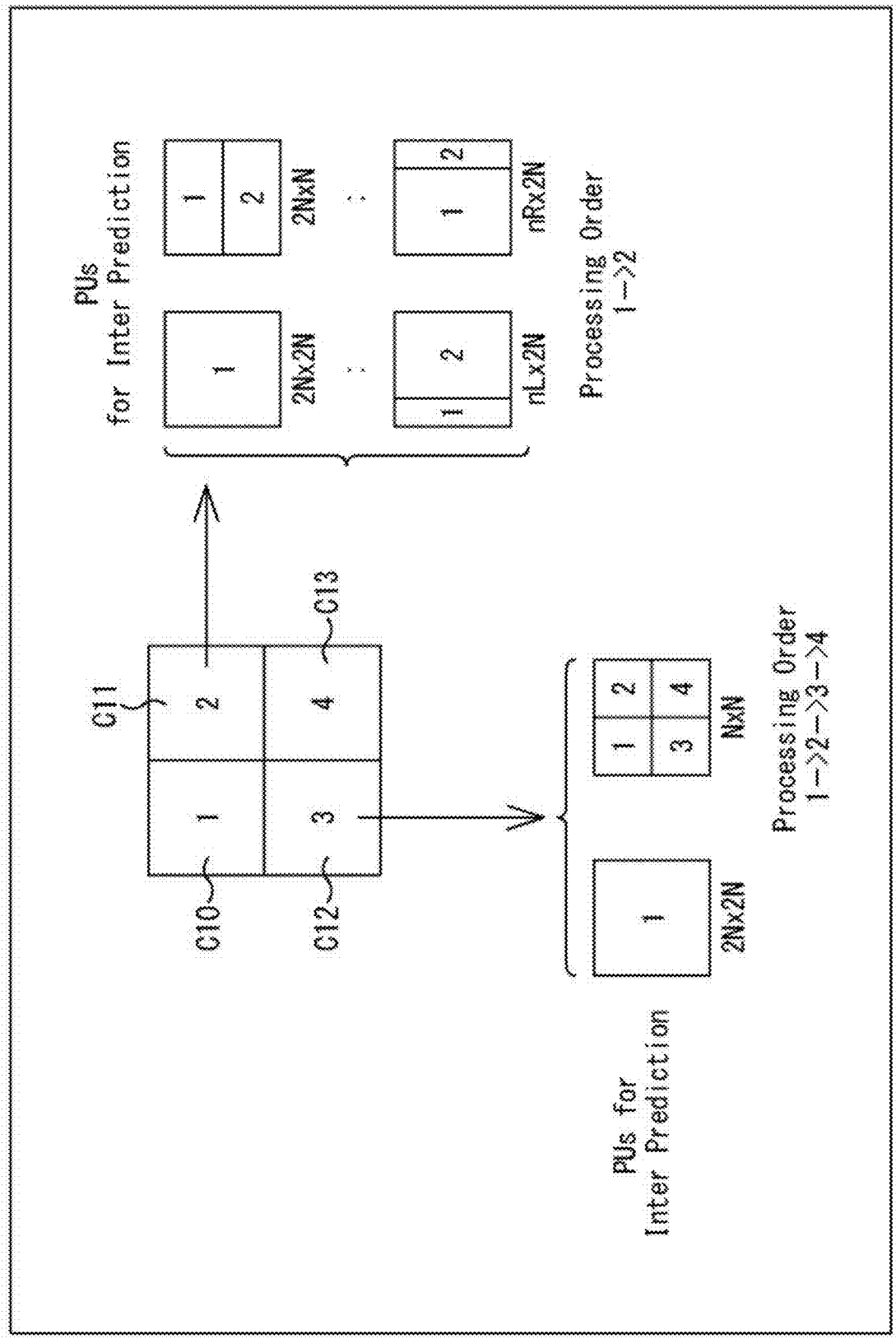
FIG. 4 is an explanatory diagram for describing orders of scanning CUs and PUs.

When an image is coded, CTBs (or LCUs) set in a grid form in the image (or a slice or a tile) are scanned in a raster scan order. In one CTB, CUs are scanned in such a manner as to trace a quad-tree from left to right and top to bottom. When the current block is processed, information regarding the upper and left adjacent blocks is used as input information. FIG. 4 is an explanatory diagram for describing orders of scanning CUs and PUs. C10, C11, C12, and C13, four CUs included in one CTB, are illustrated at top left in FIG.

4. The number within the frame of each CU represents the processing order. The coding process is carried out in the order of C10, the top left CU, C11, the top right CU, C12, the bottom left CU, and C13, the bottom right CU. One or more PUs for inter-prediction that can be set in C11, a CU, are illustrated at right in FIG. 4. One or more PUs for intra-prediction that can be set in C12, a CU, are illustrated at the bottom in FIG. 4. As indicated by the numbers in these PUs, the PUs are also scanned from left to right and top to bottom.

In the description given below, there are cases in which a description is given by using the term "block" as a partial region of an image (picture) or a processing unit (not a block of a processing section). In this case, the term "block" represents a partial region in a picture, and the size, shape, and characteristics thereof are not restricted. That is, we assume that the term "block" in this case includes, for example, an arbitrary partial region (processing unit) such as TB, TU, PB, PU, SCU, CU, LCU (CTB), subblock, macroblock, tile, or slice.

<Selection of the TU Size>

The TU size is selected on the basis of a cost function. For example, the cost is calculated as illustrated in formula (1) given below by experimentally performing coding and using a coding error (Distortion) and a coding rate (Rate) thereof.

$$\text{Cost} = \text{Distortion} + \lambda \cdot \text{Rate} \qquad (1)$$

The cost is found for each TU size, and the TU size that provides the lowest cost is selected. In general, the value of a variable $\lambda$ varies on the basis of a quantization parameter Qp that is used during coding, and in the case where a quantization count is large, the value of the variable $\lambda$ becomes large. For this reason, during low rate coding, priority tends to be given to reducing the coding bitrate rather than image coding noise.

Figure 5B:
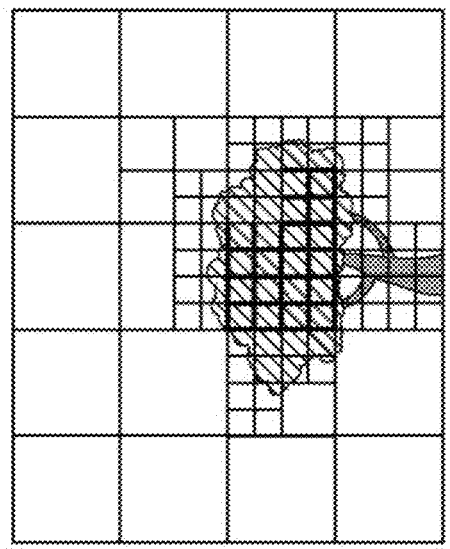
FIGS. 5A and 5B are diagrams illustrating partitioning into TUs.
Figure 5A:
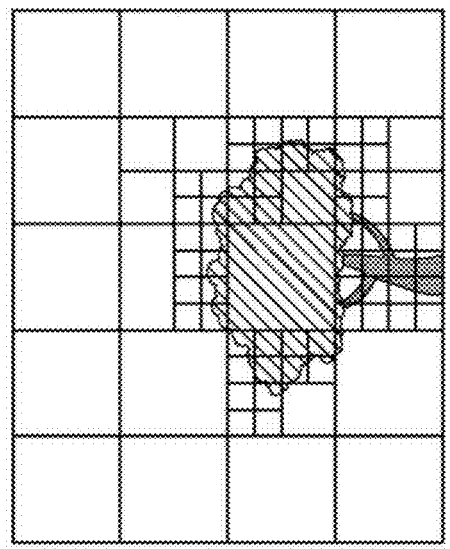

In general, in the case where the target bitrate is high, there is a tendency to tolerate a TU size that outputs a number of orthogonal transform coefficients because of a property of the cost function. For this reason, large-size TUs (Large TUs) are set for regions having a uniform texture distribution. For example, in the case where an image of a tree as illustrated in FIGS. 5A and 5B is coded, and when the target bitrate is high, large-size TUs (Large TUs) are set for flat portions with small variations in pixel value and given texture portions such as leaves as illustrated in FIG. 5A.

In contrast, in the case where the target bitrate is low, small-size CUs (Small CUs) and TUs (Small TUs) are set for uniform texture portions to minimize the transmission cost of orthogonal transform coefficients, and images are often created using only predicted images. That is, in this case, large-size TUs (Large TUs) are set only for flat portions with small variations in pixel value as illustrated in FIG. 5B.

Incidentally, in the case of HEVC, quantization is performed on orthogonal transform coefficients using a scaling list. However, a uniform scaling list independent of TU size was applied in HEVC quantization. FIG. 6 illustrates an example of a manner in which a scaling list is selected in the case of HEVC. As illustrated in FIG. 6, the applied scaling list was changed in proportion to the target bitrate. We assume, for example, that the target bitrate is classified into three rates, namely, high, medium, and low rates, and that scaling list values are classified into three, namely, small, medium, and large. In the case where the target bitrate is high, a scaling list is selected that has small values for orthogonal transform coefficients for all the frequency bands (low, medium, and high frequencies). Also, in the case where the target bitrate is medium, a scaling list is selected that has small values for low- and medium-frequency orthogonal transform coefficients and has a medium value for high-frequency orthogonal transform coefficient. Then, in the case where the target bitrate is low, a scaling list is selected that has small values for a low-frequency orthogonal transform coefficient and has medium values for medium- and high-frequency orthogonal transform coefficients.

More specifically, for example, in the case where the target bitrate is high, a scaling list is selected that has values from 16 T030 as illustrated in FIG. 7A. In contrast, in the case where the target bitrate is low, a scaling list is selected that has values from 16 to 64 as illustrated in FIG. 7B.

That is, the scaling list appropriate to the target bitrate is selected to ensure that the compression ratio appropriate to the target bitrate is acquired.

However, scaling lists are independent of the TU size. That is, it is common that scaling lists having values similar to those for small-size TUs are applied to large-size TUs to create similar pictures. For example, scaling lists having similar values are selected for all TUs having 4×4, 8×8, 16×16, and 32×32 pixels as illustrated in FIG. 6.

Incidentally, as described above, it is highly likely that large-size TUs (Large TUs) are used for flat portions with relatively small variations in pixel value. Also, variations in pixel value are information that does not significantly affect the subjective image quality in such flat portions. In other words, it is highly likely that reduction in such variations through coding and decoding will not reduce the subjective image quality significantly.

Therefore, by significantly reducing the amount of information in flat portions (large-size TUs), it is possible to expect to improve coding efficiency while at the same time keeping reduction in subjective image quality to a minimum. In the case of HEVC, however, there has been a likelihood, as described above, that coding efficiency may decline because scaling lists having values similar to those for small-size TUs, i.e., scaling lists having small or medium values for medium- and high-frequency orthogonal transform coefficients, may be applied to such flat portions (large-size TUs).

<Selection of Scaling List Appropriate to TU Size>

For this reason, a scaling list is set that has values appropriate to a current block size for the current block to be quantized in an image to be coded.

For example, the larger the size of the TU to be processed (current block), the larger the values of the scaling list to be set. For example, as the TU size increases, the values of the scaling list for orthogonal transform coefficients are increased successively starting with high-frequency orthogonal transform coefficient.

For example, in the case of FIG. 8, shaded areas are different from the example illustrated in FIG. 6. That is, in the case of the example illustrated in FIG. 8, when the current block is 8×8 pixels or less, a scaling list may be selected that has a small value for a low-frequency orthogonal transform coefficient and medium values for medium- and high-frequency orthogonal transform coefficients, and when the current block is 16×16 pixels or less, a scaling list may be selected that has a small value for a low-frequency orthogonal transform coefficient, a medium value for a medium-frequency orthogonal transform coefficient, and a large value for a high-frequency orthogonal transform coefficient. Further, when the current block is 32×32 pixels or less, a scaling list may be selected that has a small value for a low-frequency orthogonal transform coefficient and large values for medium- and high-frequency orthogonal transform coefficients.

This ensures reduction in amount of codes in areas with large-size current blocks (flat portions) (Large TU), keeping reduction in coding efficiency to a minimum while at the same time minimizing reduction in subjective image quality.

It should be noted that a scaling list having values appropriate to the target coding bitrate may be set for a current block. That is, as in the example illustrated in FIG. 8, a scaling list having values appropriate to the size of a current block and the target coding bitrate may be set for the current block. This ensures that priority is given to the reduction in amount of codes with change in target bitrate, thereby keeping impact on the subjective image quality to a minimum.

For example, as in the example illustrated in FIG. 8, a scaling list having values appropriate to the size of a current block may be set for the current block only in the case where the target bitrate is low. The higher the target bitrate, the more easily the changes in flat portions stand out, and the lower the target bitrate, the less easily the changes in flat portions stand out. This keeps reduction in coding efficiency to a minimum while at the same time suppressing reduction in subjective image quality.

It should be noted that a scaling list having values appropriate to the size of a current block may also be set in the case where the target bitrate is medium or high. In that case, the scaling list values may be changed for each rate.

It should be noted that in the case where a scaling list is set for a current block (TU), that scaling list may be generated. For example, the scaling list may be generated from scratch or generated by thinning out numbers in a scaling list having a given size made available in advance or by copying such numbers and changing the size. Further, a scaling list appropriate to the target bitrate or the current block size may be selected from among a plurality of candidates made available in advance.

<Image Coding Apparatus>

Figure 9:
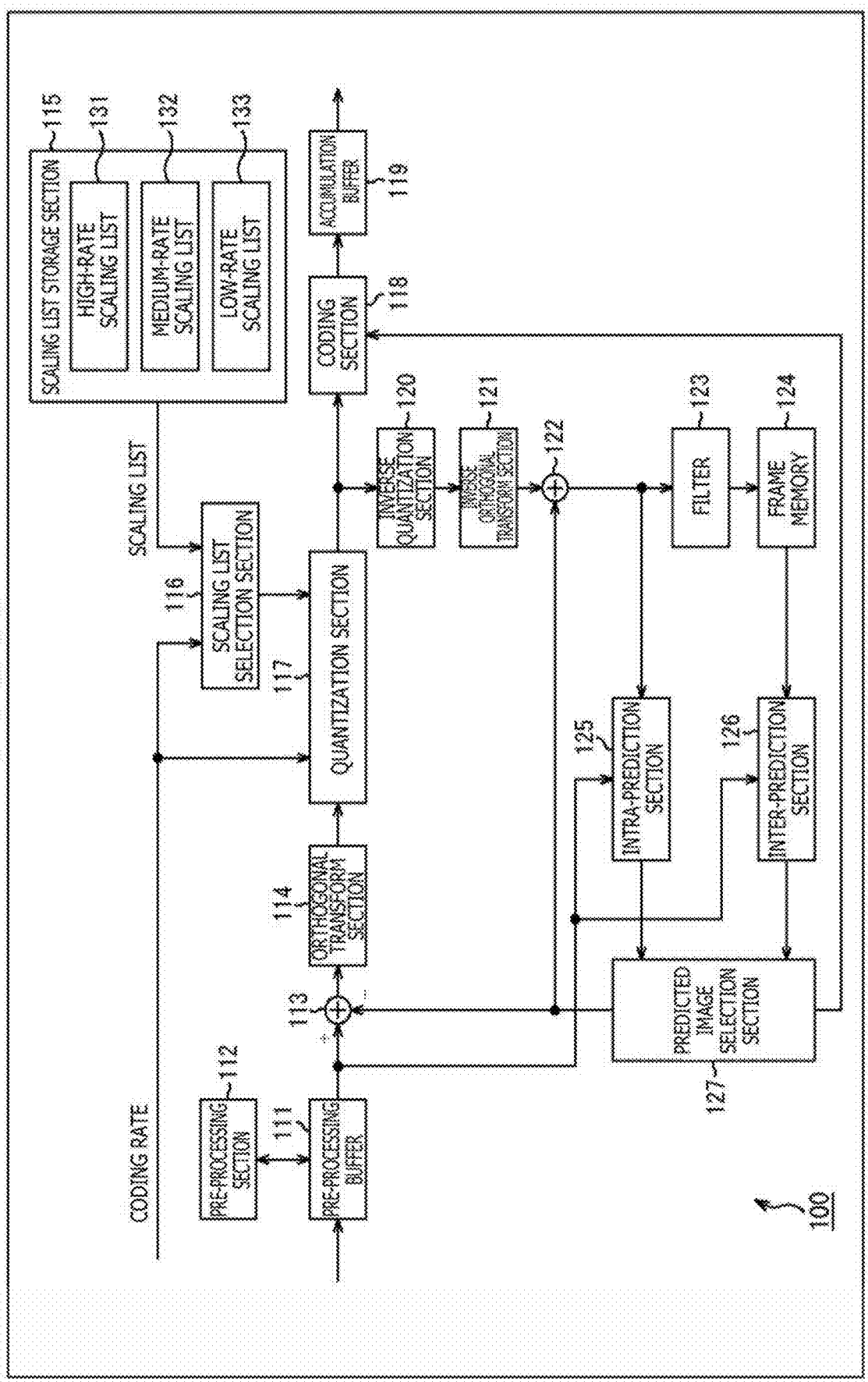
FIG. 9 is a block diagram illustrating a main configuration example of an image coding apparatus.

FIG. 9 is a block diagram illustrating a main configuration example of an image coding apparatus as a mode of an image processing apparatus to which the present technology is applied. An image coding apparatus 100 illustrated in FIG. 9 is an apparatus for coding image data of movie by a method compliant with HEVC (ITU-T H.265|ISO/IEC 23008-2 High Efficiency Video Coding). It should be noted that FIG. 9 depicts main processing sections, main data flows, and so on and that not all elements are illustrated in FIG. 9. That is, processing sections not depicted as blocks in FIG. 9 may exist in the image coding apparatus 100, and processes and data flows not depicted as arrows and so on in FIG. 9 may exist.

As illustrated in FIG. 9, the image coding apparatus 100 includes a pre-processing buffer 111, a pre-processing section 112, a calculation section 113, an orthogonal transform section 114, a scaling list storage section 115, a scaling list selection section 116, a quantization section 117, a coding section 118, and an accumulation buffer 119. The image coding apparatus 100 also includes an inverse quantization section 120, an inverse orthogonal transform section 121, a calculation section 122, a filter 123, a frame memory 124, an intra-prediction section 125, an inter-prediction section 126, and a predicted image selection section 127.

An image input to the image coding apparatus 100 (input image) is supplied to the pre-processing buffer 111. The pre-processing buffer 111 stores each of frames of the input image in the order of display. The pre-processing section 112 performs processes on the input image stored in the pre-processing buffer 111 such as rearranging the frames, generating metadata, and setting up blocks. When pre-processing is complete, the preprocessed input image and various pieces of information regarding coding are supplied to each processing section. For example, the input image is supplied to the calculation section 113, the intra-prediction section 125, the inter-prediction section 126, and so on. Also, metadata and other information is supplied to the coding section 118 and so on.

The calculation section 113 subtracts a predicted image, supplied from the intra-prediction section 125 or the inter-prediction section 126 via the predicted image selection section 127, from the input image read from the pre-processing buffer 111, thereby acquiring residual information (also referred to as residual data). For example, in the case of an image to be intra-coded, the calculation section 113 subtracts the predicted image, supplied from the intra-prediction section 125, from the input image read from the pre-processing buffer 111. Also, for example, in the case of an image to be inter-coded, the calculation section 113 subtracts the predicted image, supplied from the inter-prediction section 126, from the input image read from the pre-processing buffer 111. The calculation section 113 supplies the acquired residual data to the orthogonal transform section 114.

The orthogonal transform section 114 orthogonally transforms the residual data, supplied from the calculation section 113, by a given method. The orthogonal transform section 114 supplies the orthogonally transformed residual data (also referred to as orthogonal transform coefficients) to the quantization section 117.

The scaling list storage section 115 stores scaling list candidates that will be used for quantization by the quantization section 117. The scaling list storage section 115 supplies, of the stored candidates, those candidates (scaling list) requested by the scaling list selection section 116 to the scaling list selection section 116.

The scaling list selection section 116 performs processes related to the setting of scaling lists that will be used for quantization performed by the quantization section 117. The scaling list selection section 116 acquires a coding rate to be achieved (target bitrate). Also, the scaling list selection section 116 acquires, from the quantization section 117, information indicating the size of the TU to be processed (current block). The scaling list selection section 116 sets a scaling list corresponding to the target bitrate and the current block size (TU size) using the scaling list candidates stored in the scaling list storage section 115 and supplies the scaling list to the quantization section 117.

For example, the scaling list storage section 115 stores scaling lists for each bitrate group such as a high-rate scaling list 131, a medium-rate scaling list 132, and a low-rate scaling list 133. The values of the scaling lists differ at least partially from each other. Then, the scaling list selection section 116 selects, from among these scaling lists, a scaling list that corresponds to the target bitrate and acquires the scaling list. Then, the scaling list selection section 116 generates a scaling list of the current block size using the acquired scaling list. That is, the scaling list selection section 116 realizes the setting of a scaling list having values appropriate to the target bitrate and the current block size as in the example illustrated in FIG. 8.

For example, the larger the current block size, the larger the values of the scaling list set by the scaling list selection section 116. For example, the scaling list selection section 116 generates, for a current block having a 16×16 pixel size, a scaling list some of whose values on the high frequency component side are larger than in the scaling list corresponding to the case of an 8×8 pixel size or smaller. Also, for example, the scaling list selection section 116 generates, for a current block having a 32×32 pixel size, a scaling list all of whose values are larger than in the scaling list corresponding to the case of an 8×8 pixel size or smaller.

At this time, the scaling list selection section 116 generates a scaling list having values appropriate to the current block size by an arbitrary method such as replacing at least some of the values of the scaling list, adding values together or subtracting one value from another, or adding a given value or subtracting it.

It should be noted that such generation of a scaling list having values appropriate to the current block size may be performed only for some bitrate groups. For example, a scaling list having values appropriate to the current block size may be generated only in the case where the target bitrate is low. For example, the scaling list selection section 116 may determine whether or not the coding rate supplied from outside the image coding apparatus 100 (specification of a target bitrate) is low and set, for a current block, a scaling list having values appropriate to the current block size in the case where it is determined that the target bitrate is low. In this case, when the target bitrate is other rate, it is only necessary to generate a scaling list for the current block size by thinning out numbers or performing interpolation (e.g., nearest neighbor interpolation).

Also, grouping of bitrates is arbitrary. For example, a threshold for each of the above high, medium, and low rates may be any value. Also, the number of these bitrate groups (number of partitions of the bitrate) may be two or four or more. Also, the supply source of the coding rate is arbitrary. For example, the supply source may be external to the image coding apparatus 100 such as user or other apparatus or may be an arbitrary processing section in the image coding apparatus 100. Also, supplied information may be information of any kind (specification) so long as it indicates the coding rate.

Also, a scaling list stored in the scaling list storage section 115 may be of any size, and the size may be 4×4 pixels or 32×32 pixels. The scaling list storage section 115 may store a plurality of types of scaling lists.

It should be noted that the scaling list storage section 115 may store a scaling list for each bitrate group and for each TU size, and the scaling list selection section 116 may read a scaling list corresponding to the target bitrate and the current block size from the scaling list storage section 115 and supply the scaling list to the quantization section 117. In that case, each of the scaling lists stored in the scaling list storage section 115 has values appropriate to the bitrate group and the TU size. That is, the scaling list selection section 116 can set a scaling list having values corresponding to the target bitrate and the current block size by selecting the scaling list stored in the scaling list storage section 115.

Also, the scaling list storage section 115 may be omitted so that the scaling list selection section 116 generates, as necessary, a scaling list having values corresponding to the target bitrate and the current block size. The generation method is arbitrary.

The quantization section 117 performs processes related to an orthogonal transform coefficient supplied from the orthogonal transform section 114. For example, the quantization section 117 sets a quantization parameter in accordance with the target bitrate (coding rate) supplied from outside the image coding apparatus 100 and performs quantization of the orthogonal transform coefficient supplied from the orthogonal transform section 114 using the scaling list set by the scaling list selection section 116. The quantization section 117 supplies the quantization coefficient acquired from the quantization to the coding section 118 and the inverse quantization section 120.

The coding section 118 codes the quantization coefficient supplied from the quantization section 117. Also, the coding section 118 acquires information regarding an optimal prediction mode from the predicted image selection section 127. Further, the coding section 118 can acquire arbitrary information from an arbitrary processing section. The coding section 118 codes these various pieces of information. Thus, the coding section 118 generates coded data by coding information regarding the image. The coding section 118 supplies the acquired coded data to the accumulation buffer 119 for storage.

The accumulation buffer 119 temporarily holds coded data supplied from the coding section 118. The accumulation buffer 119 outputs the held coded data outside of the image coding apparatus 100, for example, as a bit stream at a given timing. For example, this coded data is transmitted to a decoding side via an arbitrary recording medium, an arbitrary transmission medium, an arbitrary information processing apparatus, and so on. That is, the accumulation buffer 119 is also a transmission section for transmitting coded data.

The inverse quantization section 120 inversely quantizes the quantized data by a method corresponding to the quantization performed by the quantization section 117. The inverse quantization section 120 supplies the inversely quantized quantization data (also referred to as an orthogonal transform coefficient) to the inverse orthogonal transform section 121.

The inverse orthogonal transform section 121 inversely orthogonally transforms the orthogonal transform coefficient by a method corresponding to the orthogonal transform process performed by the orthogonal transform section 114. The inverse orthogonal transform section 121 supplies the inversely orthogonally transformed orthogonal transform coefficient (also referred to as recovered residual data) to the calculation section 122.

The calculation section 122 adds a predicted image, supplied from the intra-prediction section 125 or the inter-prediction section 126 via the predicted image selection section 127, to the recovered residual data, thereby acquiring a locally reconfigured image (also referred to as a reconfigured image). For example, in the case of an image to be intra-coded, the calculation section 122 adds a predicted image, supplied from the intra-prediction section 125, to the recovered residual data. Also, for example, in the case of an image to be inter-coded, the calculation section 122 adds a predicted image, supplied from the inter-prediction section 126, to the recovered residual data. The calculation section 122 supplies the acquired reconfigured image to the filter 123 and the intra-prediction section 125.

The filter 123 performs a filtering process such as deblocking filtering on the reconfigured image as appropriate. The filter 123 supplies the filtering process result (referred to as a decoded image) to the frame memory 124.

The frame memory 124 stores the decoded image in its own storage region. Also, the frame memory 124 supplies the stored decoded image to the inter-prediction section 126 at a given timing as a reference image.

The intra-prediction section 125 performs intra-prediction that generates a predicted image using pixel values in a picture to be processed, a reconfigured image supplied from the calculation section 122 as a reference image. For example, the intra-prediction section 125 performs this intra-prediction in a plurality of intra-prediction modes (e.g., DC (Direct Current) prediction, horizontal direction prediction, vertical direction prediction) made available in advance. The intra-prediction section 125 generates a predicted image in each of all the candidate intra-prediction modes and selects an optimal mode. When the optimal intra-prediction mode is selected, the intra-prediction section 125 supplies, to the predicted image selection section 127, a predicted image generated in the optimal intra-prediction mode and intra-prediction mode information, etc., information regarding intra-prediction such as index indicating the optimal intra-prediction mode as information regarding prediction results.

The inter-prediction section 126 performs an inter-prediction process (motion prediction process and compensation process) using the input image supplied from the pre-processing buffer 111 and the reference image supplied from the frame memory 124. More specifically, the inter-prediction section 126 generates a predicted image (inter-predicted image information) by performing motion prediction as an inter-prediction process and performing a motion compensation process in accordance with a detected motion vector. For example, the inter-prediction section 126 performs such inter-prediction in a plurality of inter-prediction modes made available in advance. The inter-prediction section 126 generates a predicted image in each of all the candidate inter-prediction modes and selects an optimal mode. When the optimal inter-prediction mode is selected, the inter-prediction section 126 supplies, to the predicted image selection section 127, a predicted image generated in the optimal inter-prediction mode and inter-prediction mode information, etc., information regarding inter-prediction such as index indicating the optimal inter-prediction mode and motion information as information regarding prediction results.

The predicted image selection section 127 acquires information regarding the above prediction results from the intra-prediction section 125 and the inter-prediction section 126. The predicted image selection section 127 selects one from these, thereby selecting a prediction mode in the region. That is, the predicted image selection section 127 selects either the (optimal) intra-prediction mode and the (optimal) inter-prediction mode as an optimal prediction mode. The predicted image selection section 127 supplies the predicted image in the selected mode to the calculation section 113 and the calculation section 122. Also, the predicted image selection section 127 supplies some or all of the information regarding the selected prediction results to the coding section 118 as information regarding the optimal prediction mode, causing the coding section 118 to store the information in the coded data.

Thus, the image coding apparatus 100 can keep reduction in coding efficiency to a minimum because the scaling list selection section 116 sets a scaling list having values appropriate to the target bitrate and the current block size (TU size) as a scaling list that will be used for quantization performed by the quantization section 117.

<Pre-Processing Section>

Figure 10:
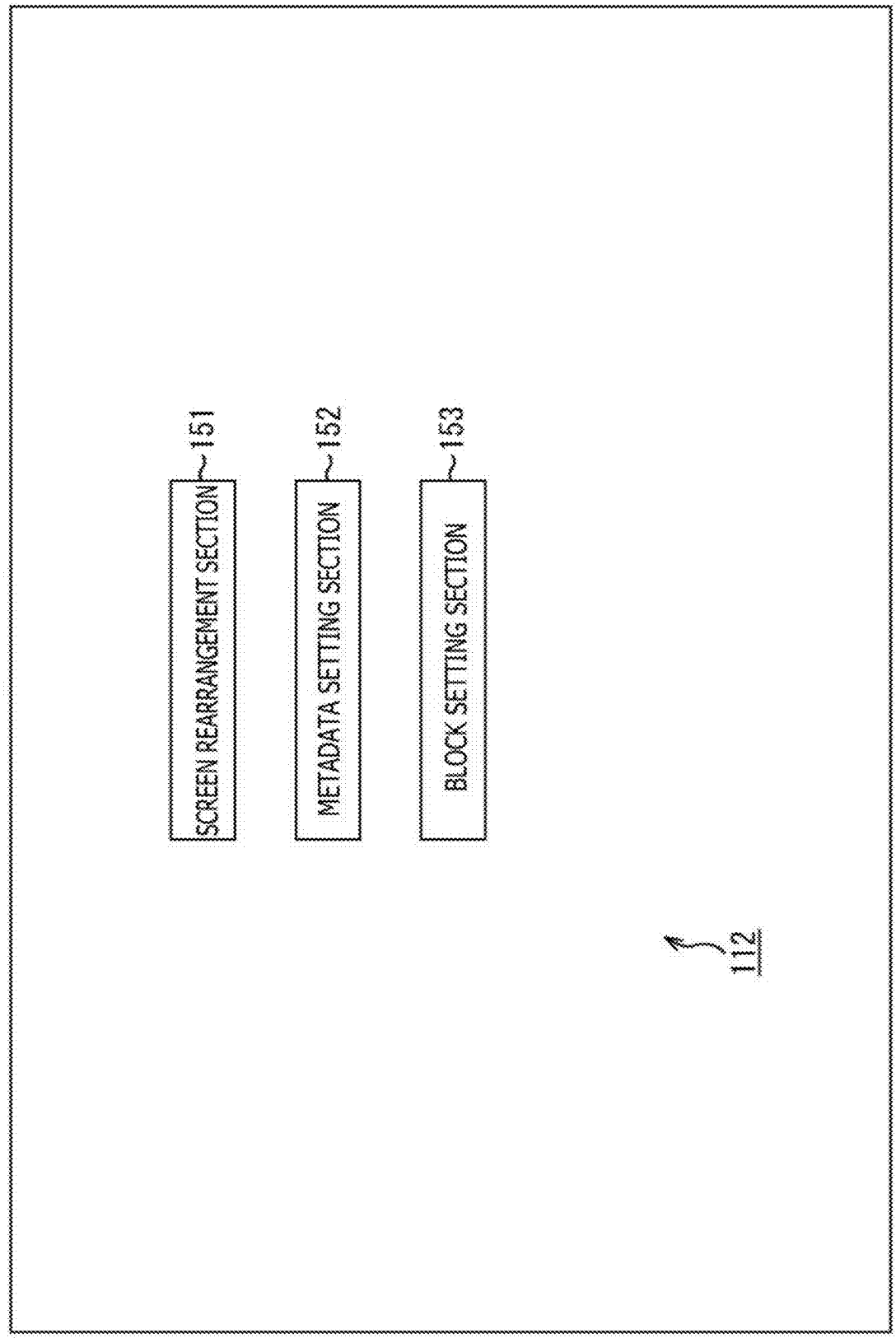
FIG. 10 is a block diagram illustrating a main configuration example of a pre-processing section.

FIG. 10 is a block diagram illustrating a main configuration example of the pre-processing section 112. As illustrated in FIG. 10, the pre-processing section 112 has a screen rearrangement section 151, a metadata setting section 152, and a block setting section 153.

The screen rearrangement section 151 rearranges the order of image data frames stored in the pre-processing buffer 111 from the order of display to the order of coding in accordance with a GOP (Group Of Picture). The metadata setting section 152 generates, for example, metadata such as video parameter set (VS), sequence parameter set (SPS), picture parameter set (PPS), and slice header. It should be noted that metadata set by the metadata setting section 152 is arbitrary and is not limited to these examples. The metadata setting section 152 supplies the metadata that has been set to an arbitrary processing section such as the coding section 118.

The block setting section 153 sets various blocks for the current picture, image data of the input image to be processed that is stored in the pre-processing buffer 111. For example, the block setting section 153 sets TUs. For example, the block setting section 153 sets TUs, for example, as illustrated in FIGS. 5A and 5B on the basis of the cost function of formula (1) described above. The block setting section 153 causes the current frame of the input image stored in the pre-processing buffer 111 to be supplied to the calculation section 113 for each of the set blocks. It should be noted that the block setting section 153 supplies information regarding the set blocks to an arbitrary processing section of the image coding apparatus 100 such as the coding section 118.

<Flow of the Image Coding Process>

A description will be given next of the processes performed by the image coding apparatus 100. The flow of the image coding process performed by the image coding apparatus 100 during coding of an input image will be described first with reference to the flowchart illustrated in FIG. 11.

When the image coding process begins, the pre-processing section 112 performs, in step S101, pre-processing on image data of an artificial image input to the image coding apparatus 100 and stored in the pre-processing buffer 111.

In step S102, the intra-prediction section 125, the inter-prediction section 126, and the predicted image selection section 127 generate predicted images in optimal prediction modes and so on by performing a prediction process. That is, in this prediction process, the intra-prediction section 125 performs intra-prediction and generates a predicted image in the optimal intra-prediction mode and so on, and the inter-prediction section 126 performs inter-prediction and generates a predicted image in the optimal inter-prediction mode and so on, and the predicted image selection section 127 selects the optimal mode from these prediction modes.

In step S103, the calculation section 113 calculates the difference between the artificial image, an input image, and the predicted image in the optimal mode selected by the prediction process in step S102. That is, the calculation section 113 generates residual data between the input image and the predicted image. Residual data acquired in this manner is smaller in amount of data than its original image data. Therefore, the amount of data can be reduced more than in the case where the image is coded in an 'as-is' manner.

In step S104, the orthogonal transform section 114 orthogonally transforms the residual data generated by the process in step S103.

In step S105, the scaling list selection section 116 selects, on the basis of a target coding rate (target bitrate) and a current block size (TU size), a scaling list having values appropriate to the target bitrate and the TU size.

In step S106, the quantization section 117 quantizes the orthogonal transform coefficient acquired by the process in step S104 by using the quantization parameter appropriate to the target coding rate and the scaling list acquired by the process in step S105 or by other means.

In step S107, the inverse quantization section 120 inversely quantizes the quantization coefficient generated by the process in step S106 using the characteristic corresponding to the quantization characteristic of step S106.

In step S108, the inverse orthogonal transform section 121 inversely orthogonally transforms the orthogonal transform coefficient acquired by the process in step S107 by a method corresponding to the orthogonal transform in step S104.

In step S109, the calculation section 122 generates image data of a reconfigured image by adding the predicted image acquired by the prediction process in step S102 to the residual data recovered by the process in step S108.

In step S110, the filter 123 performs a filtering process such as deblocking filtering on the image data of the reconfigured image generated by the process in step S109.

In step S111, the frame memory 124 stores a decoded image that is locally decoded and acquired by the process in step S110.

In step S112, the coding section 118 codes the quantized residual data acquired by the process in step S106. For example, the coding section 118 generates coded data by performing CABAC (Context-based Adaptive Binary Arithmetic Code) on the quantized residual data. Also, the coding section 118 codes the metadata generated by the process in step S101 and adds the metadata to the coded data. Further, the coding section 118 codes information regarding quantization and prediction and so on and adds the information to the coded data.

In step S113, the accumulation buffer 119 accumulates coded data and so on acquired by the process in step S112. The coded data and so on accumulated by the accumulation buffer 119 is read, for example, as a bit stream as appropriate and transmitted to the decoding side via a transport channel or recording medium.

When the process in step S113 ends, the image coding process ends.

It should be noted that the processing units of each of these processes are arbitrary and may not be the same. Therefore, the process in each step can be performed, as appropriate, in parallel with the process in other step and so on or in a switched order.

<Pre-Processing Flow>

A description will be given next of an example of a pre-processing flow performed in step S101 in FIG. 11 with reference to the flowchart illustrated in FIG. 12. When the pre-processing begins, the screen rearrangement section 151 rearranges, in step S131, the image data frames stored in the pre-processing buffer 111 from the order that they are displayed to the order that they are coded.

In step S132, the metadata setting section 152 sets various pieces of metadata.

In step S133, the block setting section 153 performs block partitioning that sets various types of blocks for the current frame to be processed by using, for example, a cost function or other means.

Figure 11:
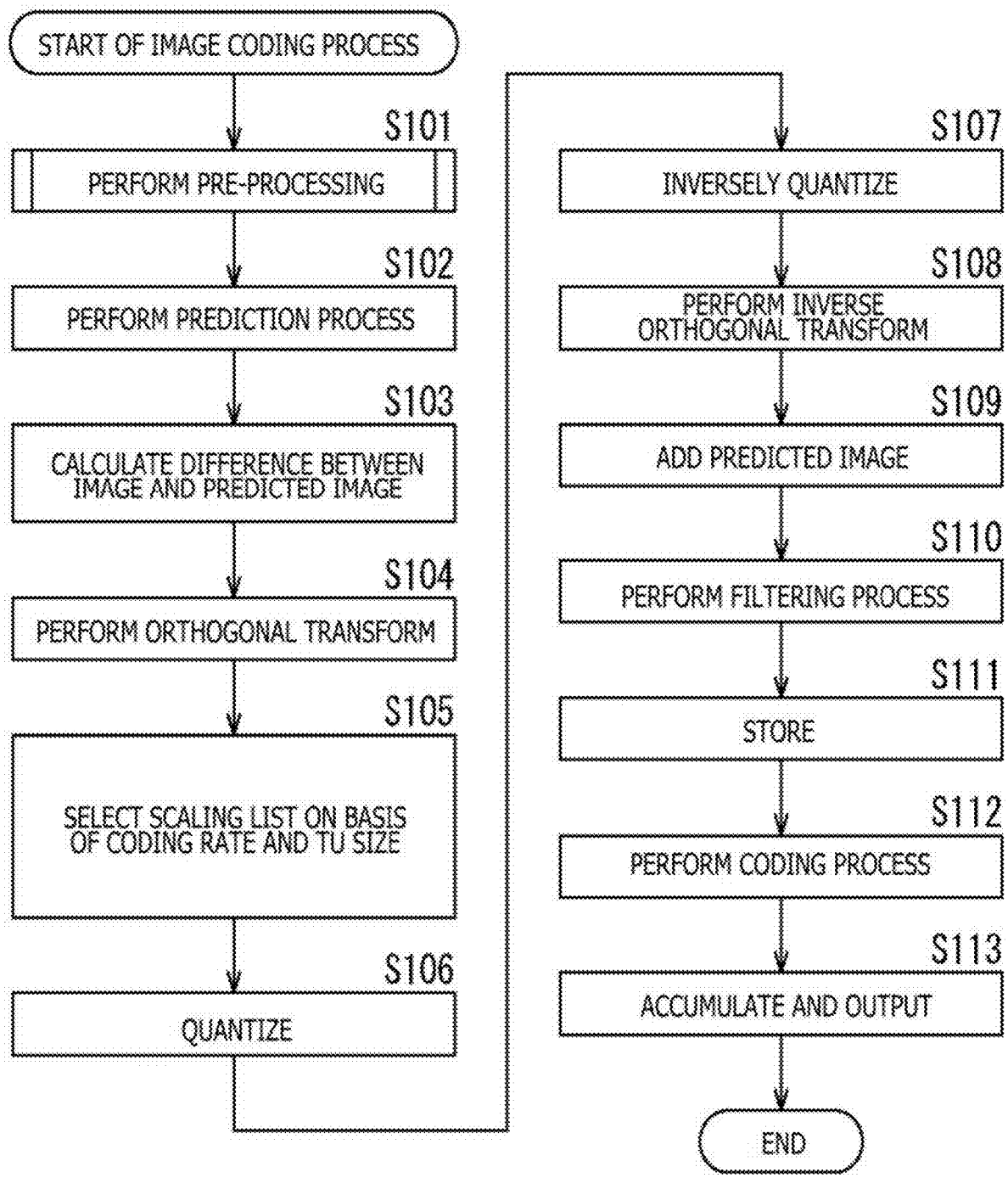
FIG. 11 is a flowchart describing an example of a flow of an image coding process.
Figure 12:
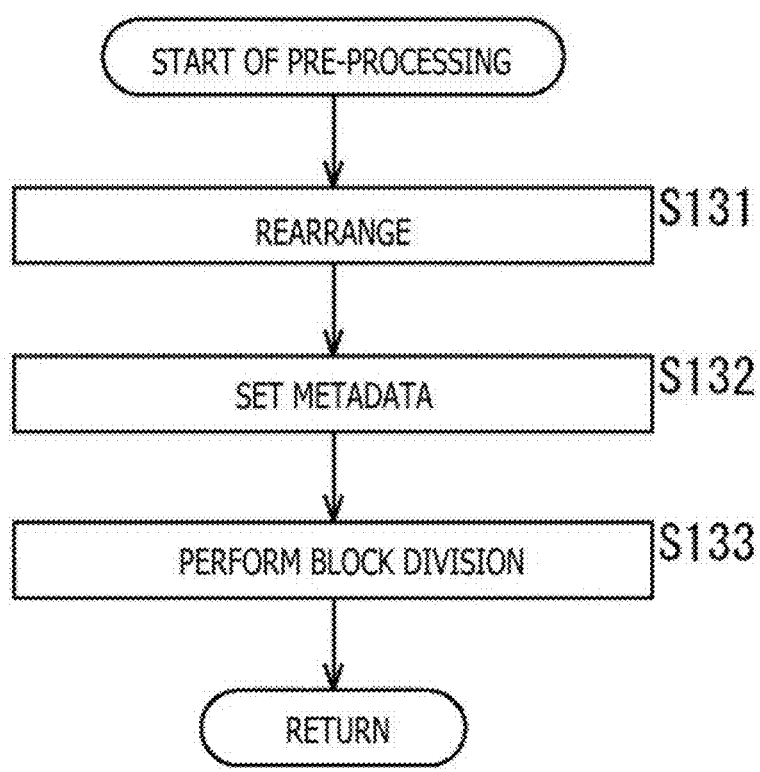
FIG. 12 is a flowchart describing an example of a pre-processing flow.

When the process in step S133 ends, the pre-processing ends, and the process returns to FIG. 11.

As a result of execution of each of the processes as described above, the image coding apparatus 100 can quantize the scaling list having values appropriate to the target bitrate and the current block size (TU size), thereby keeping reduction in coding efficiency to a minimum. For example, by setting a scaling list having larger values for higher frequency components for larger-size blocks, it is possible to keep, to a minimum, transmission of noise in flat portions having relatively small variations in pixel value so as to keep reduction in coding efficiency to a minimum. In particular, in the case where the target bitrate is low, it is highly likely that large-size TUs are set in flat portions. Therefore, it is possible to more reliably keep reduction in coding efficiency to a minimum by setting a scaling list as described above. Also, in general, the lower the target bitrate, the larger the relative efficacy of keeping noise in flat portions to a minimum on the overall amount of codes. Therefore, it is possible to further keep reduction in coding efficiency to a minimum by setting a scaling list as described above. Further, the lower the target bitrate, the less conspicuous pixel value changes become, thereby making it possible to minimize reduction in coding efficiency while at the same time keeping impact on the subjective image quality to a minimum.

2. Second Embodiment

<Detection of Flat Portions>

As described in the first embodiment, in HEVC, blocks are set using a cost function as depicted in formula (1). However, the method for setting blocks is not limited thereto. For example, blocks may be set such that flat portions with relatively small variations in pixel value are detected in an input image and that the block size for the flat portions is increased.

<Pre-Processing Section>

Figure 13:
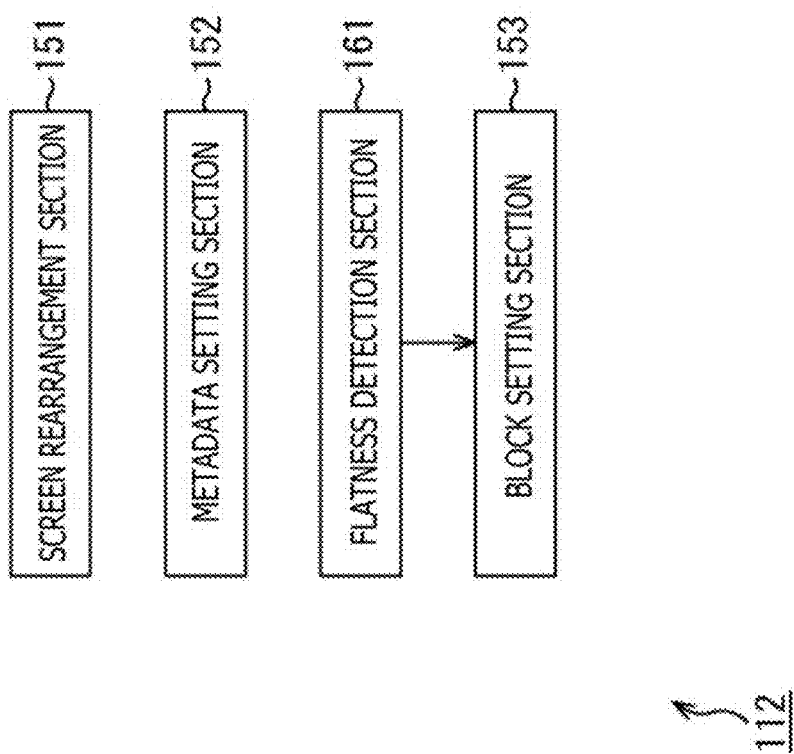
FIG. 13 is a block diagram illustrating a main configuration example of the pre-processing section.

In that case, the image coding apparatus 100 basically has a similar configuration to that of the first embodiment (FIG. 9). It should be noted, however, that a main configuration example of the pre-processing section 112 in this case is depicted in FIG. 13. In this case, the pre-processing section 112 has a flatness detection section 161 in addition to the screen rearrangement section 151, the metadata setting section 152, and the block setting section 153.

The flatness detection section 161 performs, in the current frame of the input image, processes related to detection of flat portions with small variations in pixel value. This detection method is arbitrary. For example, subjectively flat regions (flat portions) may be detected by using, for example, a variance, a TV norm (Total Variation Norm), or the difference between maximum and minimum intra-block pixel values (dynamic range).

For example, in the case of a TV norm, the TV norm of an image having a pixel value xi, j ($0 \leq i \leq n$, $0 \leq j \leq m$) can be found as depicted in the following formula (2):

$$\text{TVNorm} = \|\nabla x\|_1 = \Sigma_{j=0}^{m} \Sigma_{i=1}^{n} |x_{i,j} - x_{i-1,j}| + \Sigma_{j=1}^{m} \Sigma_{i=0}^{n} |x_{i,j-1} - x_{i,j}| \quad (2)$$

The block setting section 153 sets relatively large TUs (Large TUs) (e.g., 16×16 pixel or 32×32 pixel TUs) for flat portions detected by the flatness detection section 161.

<Pre-Processing Flow>

Figure 14:
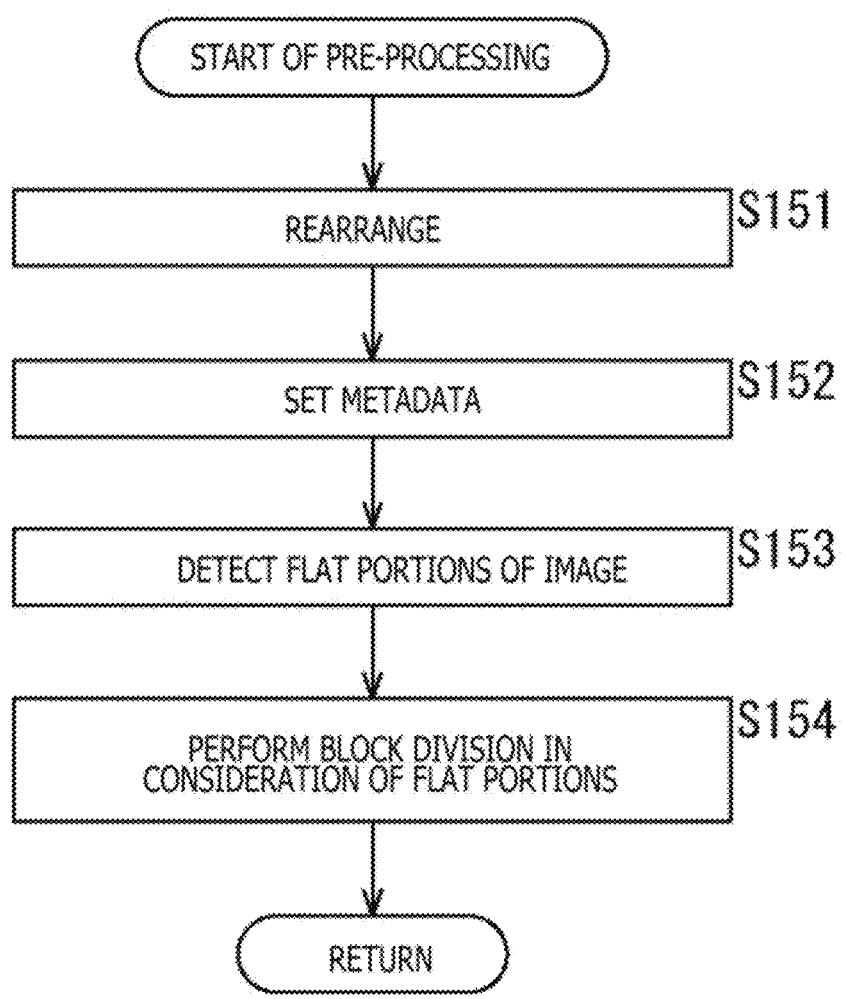
FIG. 14 is a flowchart describing an example of a pre-processing flow.

Also in this case, the image coding apparatus 100 performs an image coding process (FIG. 11) in a similar manner to the first embodiment. An example of the pre-processing flow performed in step S101 in FIG. 11 in this case will be described with reference to the flowchart illustrated in FIG. 14. When the pre-processing begins, the processes in steps S151 and S152 are performed in a similar manner to those in steps S131 and S132 in FIG. 12, respectively.

In step S153, the flatness detection section 161 performs detection of flat portions in the current frame of the input image.

In step S154, the block setting section 153 performs block partitioning in consideration of the flat portions detected in step S153. That is, the block setting section 153 sets relatively large blocks (Large TUs) for flat portions detected in step S153. It should be noted that blocks are set using the cost function based on formula (1) and so on for portions that are not flat.

When the process in step S154 ends, the pre-processing ends, and the process returns to FIG. 11.

As a result of execution of each of the processes as described above, the image coding apparatus 100 can detect flat portions and set relatively large blocks (Large TUs) for the detected flat portions without using the cost function. The image coding apparatus 100 allows more reliable reduction in amount of codes in flat portions, thereby keeping reduction in coding efficiency to a minimum.

3. Third Embodiment

<Determination Regarding Artificial Image Region>

It should be noted that the detection of flat portions described in the second embodiment may be performed only in the case where the target bitrate is low.

<Pre-Processing Section>

Figure 15:
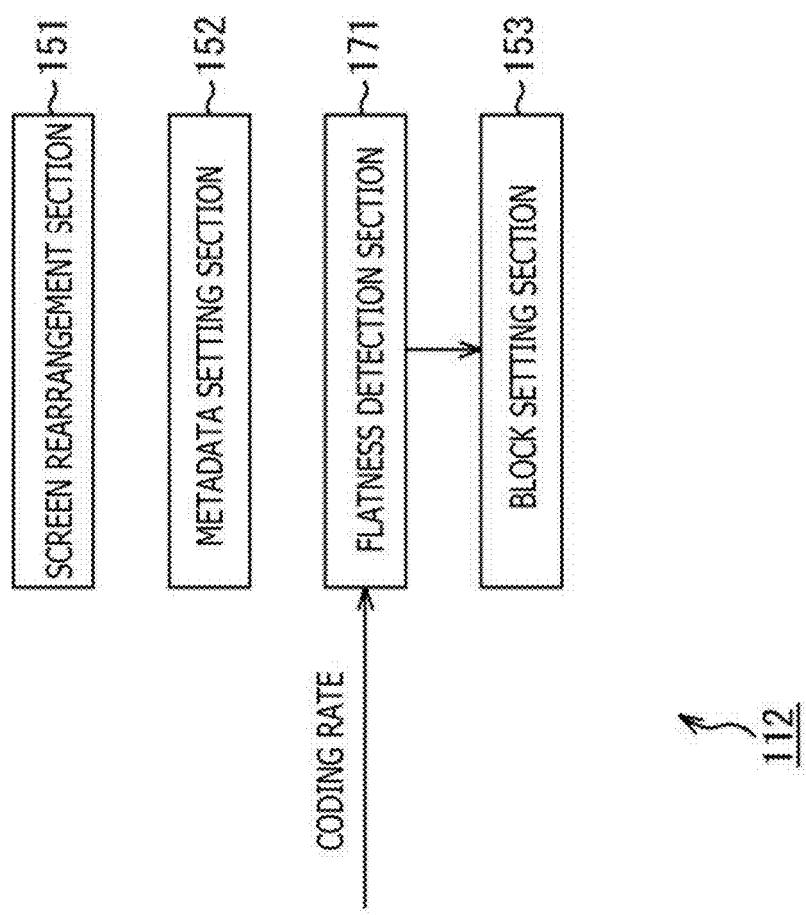
FIG. 15 is a block diagram illustrating a main configuration example of the pre-processing section.

In that case, the image coding apparatus 100 basically has a similar configuration to that of the first embodiment (FIG. 9). Also, the main configuration example of the pre-processing section 112 in this case is illustrated in FIG. 15. In this case, the pre-processing section 112 has a flatness detection section 171 in place of the flatness detection section 161 in the configuration (FIG. 13) described in the second embodiment.

The flatness detection section 171 acquires a target coding rate (target bitrate). Then, the flatness detection section 171 performs detection of flat portions in the case where the target bitrate belongs to a given group. For example, the flatness detection section 171 performs detection of flat portions in the case where the target bitrate is low. Then, the flatness detection section 171 supplies the detection result to the block setting section 153.

The block setting section 153 sets relatively large TUs (Large TUs) (e.g., 16×16 pixel or 32×32 pixel TUs) for flat portions detected by the flatness detection section 161. In the case where the flatness detection section 161 does not perform detection of flat portions, blocks are set using the cost function.

<Pre-Processing Flow>

Figure 16:
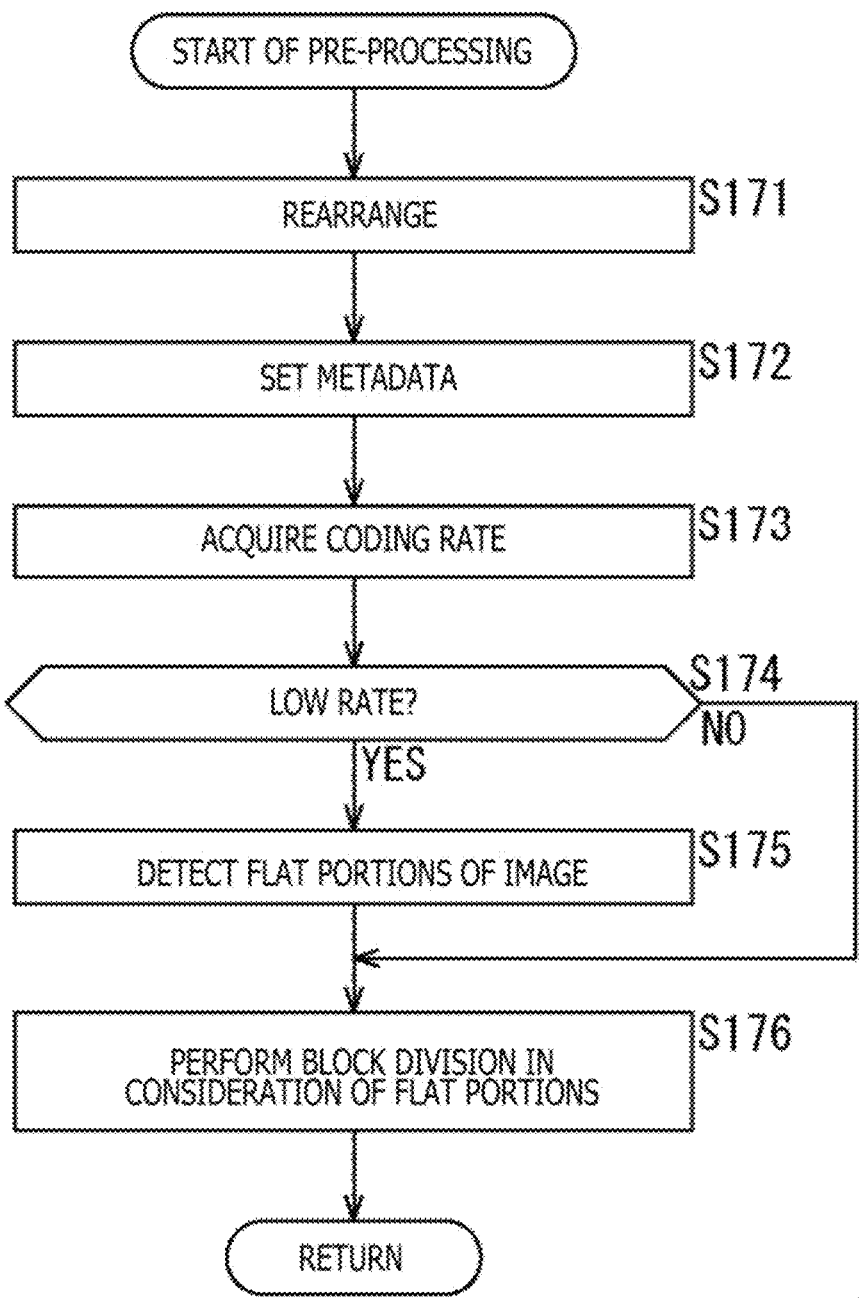
FIG. 16 is a flowchart describing an example of a pre-processing flow.

Also in this case, the image coding apparatus 100 performs an image coding process (FIG. 11) in a similar manner to the first embodiment. An example of the pre-processing flow performed in step S101 in FIG. 11 in this case will be described with reference to the flowchart illustrated in FIG. 16. When the pre-processing begins, the processes in steps S171 and S172 are performed in a similar manner to those in steps S131 and S132 in FIG. 12, respectively.

In step S173, the flatness detection section 171 acquires a target coding rate (target bitrate). In step S174, the flatness detection section 171 determines whether or not the target bitrate acquired in step S173 is low. For example, in the case where it is determined that the target bitrate is equal to or lower than a given bitrate (i.e., the target bitrate is low), the process proceeds to step S175.

In step S175, the flatness detection section 171 performs detection of flat portions in the current frame of the input image. When the process in step S175 ends, the process proceeds to step S176. Also, for example, in the case where it is determined that the target bitrate is higher than the given bitrate (i.e., the target bitrate is not low) in step S174, the process in step S175 is omitted, and the process proceeds to step S176.

In step S176, the block setting section 153 performs block partitioning in consideration of the flat portions detected in step S175. That is, the block setting section 153 sets relatively large blocks (Large TUs) for flat portions detected in step S175 and sets blocks using the cost function based on formula (1) and so on for other portions.

When the process in step S176 ends, the pre-processing ends, and the process returns to FIG. 11.

As a result of execution of each of the processes as described above, the image coding apparatus 100 can detect flat portions and set relatively large blocks (Large TUs) for the detected flat portions without using the cost function in the case where the target bitrate is low. Therefore, the scaling list selection section 116 sets a scaling list having larger values for large-size TUs as in the example illustrated in FIG. 8, allowing the image coding apparatus 100 to reduce the amount of codes in flat portions in the case of a low target bitrate and achieve the target bitrate. Therefore, it is possible to minimize reduction in coding efficiency while at the same time keeping impact on the subjective image quality to a minimum.

4. Fourth Embodiment

<Region of Interest>

For example, an ROI (Region Of Interest) may be set in a monitoring camera image or other image. This region of interest is a partial region of an image on which user's attention is focused. Therefore, the subjective image quality of this region of interest is important and should be preferentially maintained during coding and decoding. In other words, the subjective image quality of portions other than the region of interest is less important. Therefore, these areas can be coded with a higher compression ratio.

Figure 17:
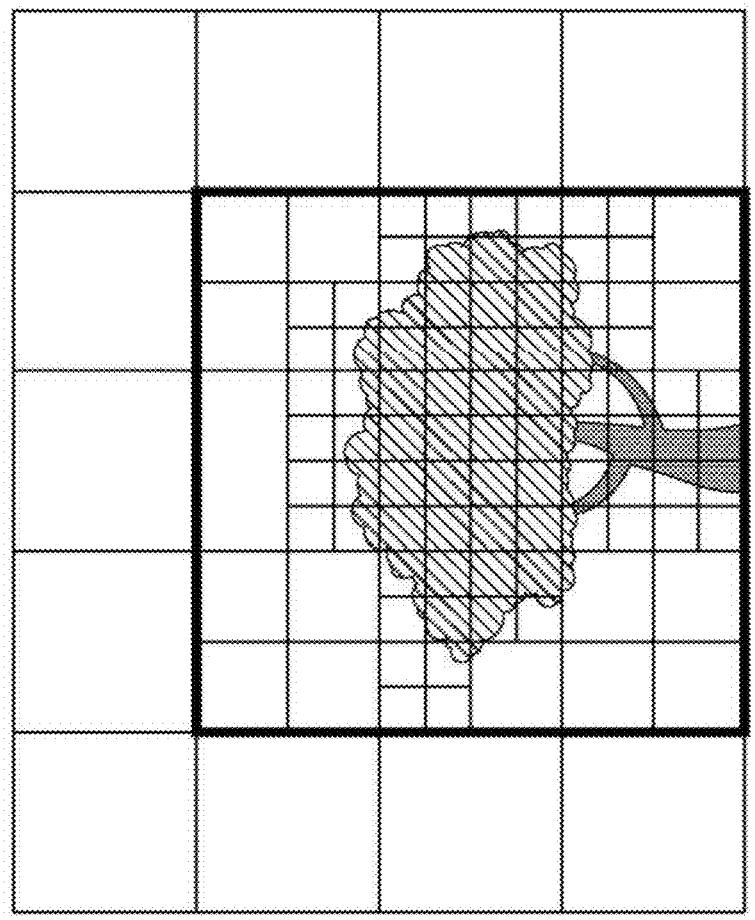
FIG. 17 is a diagram illustrating an example of a region of interest.

For example, the portion enclosed by a bold line in a monitoring camera image as illustrated in FIG. 17 is a region of interest. In the case of a monitoring camera, the background is not so important, and the subject that emerges in front of the background is often a target to be monitored. Then, clearly confirming (monitoring) the target to be monitored is often a main goal of using a monitoring camera image.

For this reason, detection of flat portions may not be performed to ensure that large-size TUs (Large TUs) are not set in the region of interest. In other words, detection of flat portions may be performed only in the region of interest. Further, setting of large-size blocks may be inhibited in the region of interest.

In that case, the image coding apparatus 100 basically has a similar configuration to that of the first embodiment (FIG. 9). It should be noted that, in this case, an image having such a region of interest set therein is input to the image coding apparatus 100.

Figure 18:
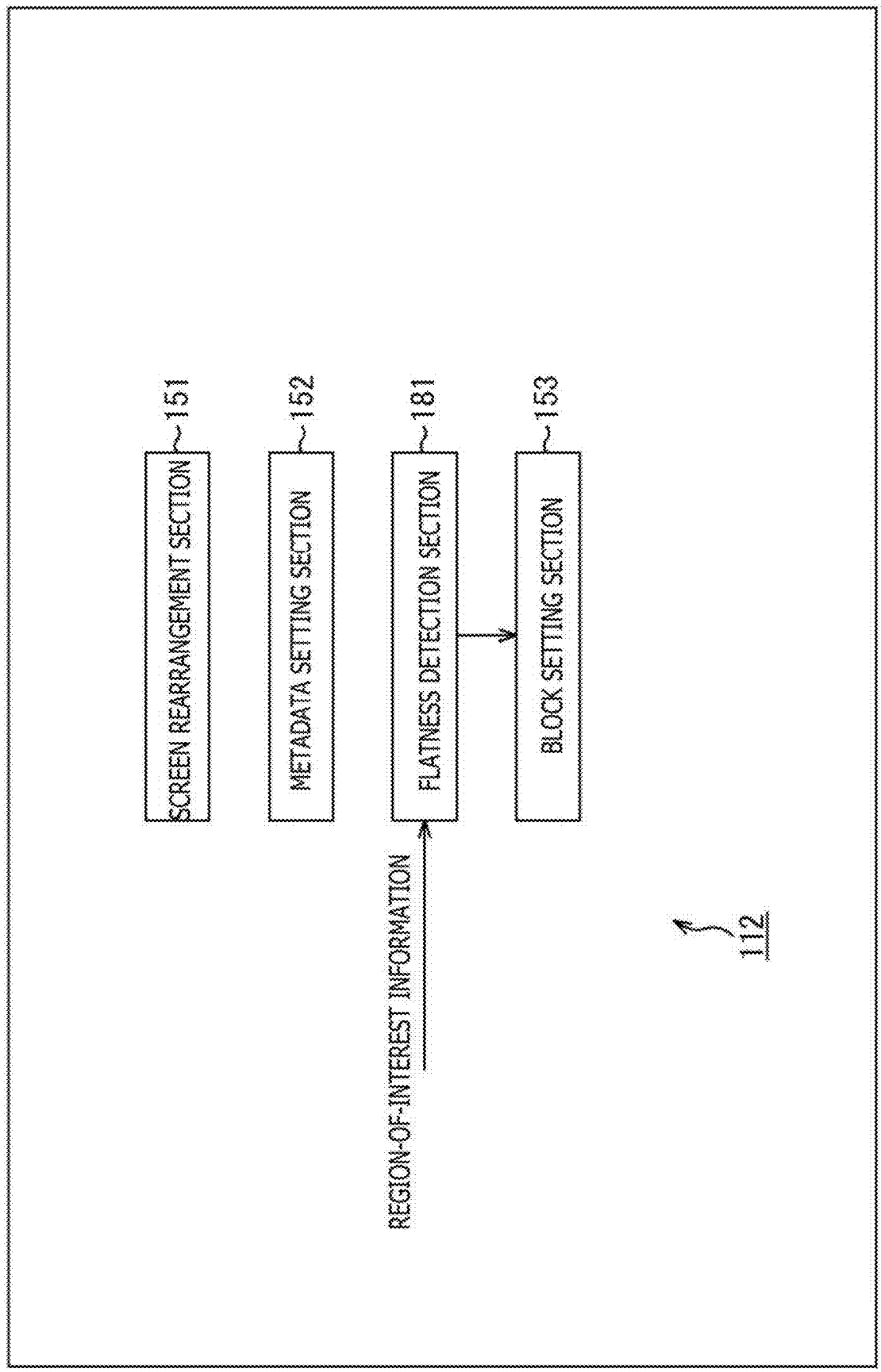
FIG. 18 is a block diagram illustrating a main configuration example of the pre-processing section.

FIG. 18 illustrates a main configuration example of the pre-processing section 112 in this case. In this case, the pre-processing section 112 has a flatness detection section 181 in place of the flatness detection section 161 in the configuration (FIG. 13) described in the second embodiment.

The flatness detection section 181 is supplied with region-of-interest information, information regarding the region of interest set in the input image. The flatness detection section 181 performs detection of flat portions outside the region of interest on the basis of the region-of-interest information. Then, the flatness detection section 171 supplies the detection result to the block setting section 153.

The block setting section 153 sets relatively large TUs (Large TUs) (e.g., 16×16 pixel or 32×32 pixel TUs) for flat portions detected by the flatness detection section 161. In the case where the flatness detection section 161 does not perform detection of flat portions, blocks are set using the cost function.

<Pre-Processing Flow>

Figure 19:
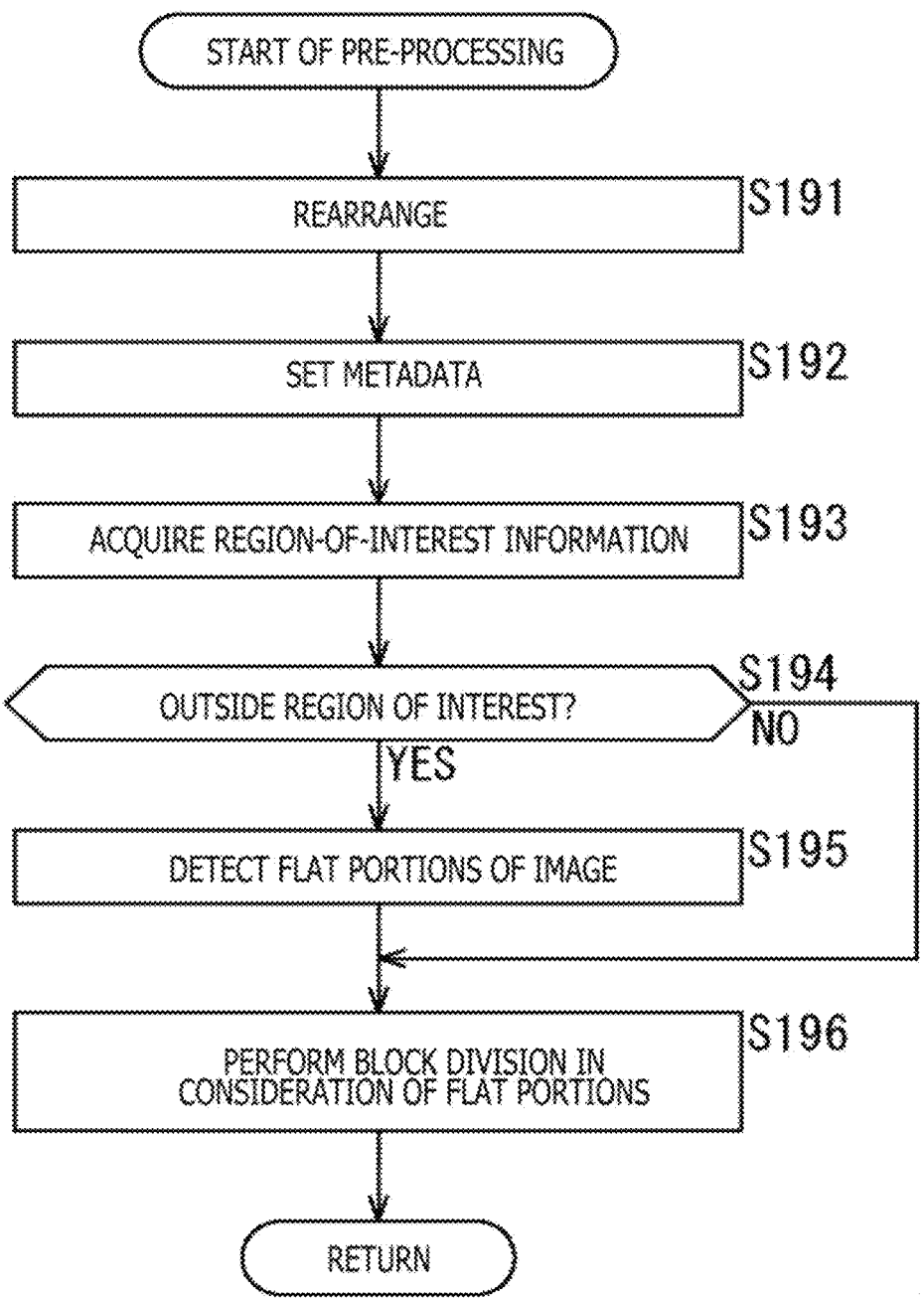
FIG. 19 is a flowchart describing an example of a pre-processing flow.

Also in this case, the image coding apparatus 100 performs an image coding process (FIG. 11) in a similar manner to the first embodiment. An example of the pre-processing flow performed in step S101 in FIG. 11 in this case will be described with reference to the flowchart illustrated in FIG. 19. When the pre-processing begins, the processes in steps S191 and S192 are performed in a similar manner to those in steps S131 and S132 in FIG. 12, respectively.

In step S193, the flatness detection section 181 acquires region-of-interest information. In step S194, the flatness detection section 181 determines whether or not the target to be processed is outside the region of interest on the basis of the region-of-interest information acquired in step S193. In the case where it is determined that the target to be processed is outside the region of interest, the process proceeds to step S195.

In step S195, the flatness detection section 181 performs detection of flat portions outside the region of interest in the current frame of the input image. When the process in step S195 ends, the process proceeds to step S196. Also, for example, in the case where it is determined, in step S194, that the target to be processed is inside the region of interest, the process in step S195 is omitted, and the process proceeds to step S196.

In step S196, the block setting section 153 performs block partitioning in consideration of the flat portions detected in step S195. That is, the block setting section 153 sets relatively large blocks (Large TUs) for flat portions outside the region of interest detected in step S175 and sets blocks using the cost function based on formula (1) and so on for other portions.

When the process in step S196 ends, the pre-processing ends, and the process returns to FIG. 11.

As a result of execution of each of the processes as described above, the image coding apparatus 100 can detect flat portions outside the region of interest and set relatively large blocks (Large TUs) for the detected flat portions without using the cost function. Therefore, the scaling list selection section 116 sets a scaling list having larger values for large-size TUs as in the example illustrated in FIG. 8, allowing the image coding apparatus 100 to minimize reduction in coding efficiency while at the same time keeping decline in subjective image quality to a minimum.

5. Fifth Embodiment

<Transmission of a Plurality of Scaling Lists>

HEVC and other coding schemes permit change in scaling list for each picture parameter set (PPS). In other words, only one scaling list can be used within a picture. Therefore, in order to realize the present technology described in the first to fourth embodiments as a method compliant with HEVC, it is necessary to ensure that the scaling list set for each TU can be generated from a single scaling list set for the picture.

It should be noted, however, that the present technology need not be compliant with HEVC. For example, a plurality of scaling lists may be transmitted in a sequence parameter set (SPS) or a picture parameter set (PPS). This allows for selection of a scaling list in the picture (e.g., for each TU). Therefore, it is possible to select a more appropriate scaling list (scaling list more suitable for the TU to be processed), thereby keeping reduction in coding efficiency to a minimum.

Figure 20:
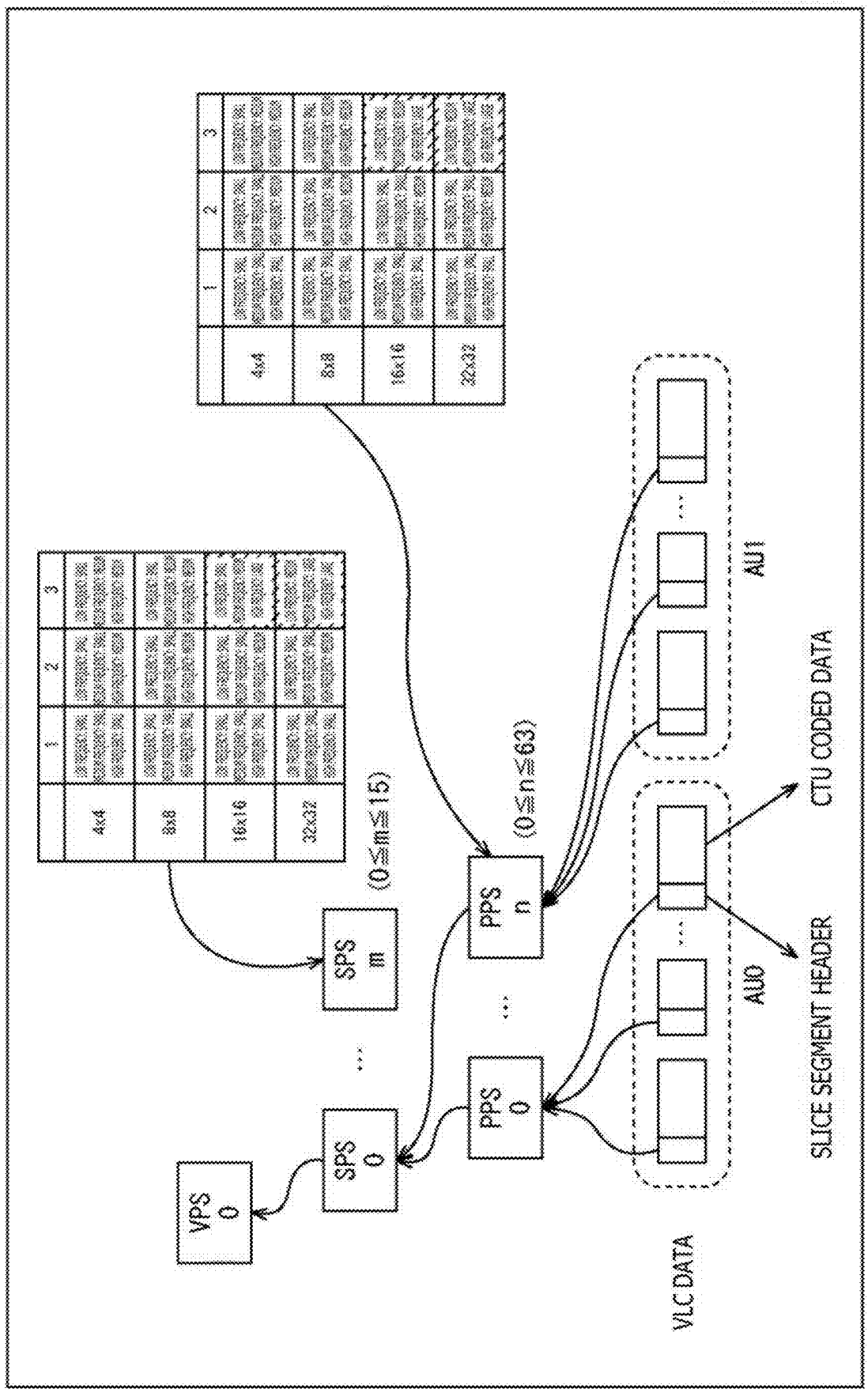
FIG. 20 is a diagram illustrating an example of a manner in which a scaling list is transmitted.

In that case, a list of a plurality of scaling lists in a table form may be stored in an SPS or PPS as illustrated in FIG. 20. Of course, the storage location of scaling lists is arbitrary, and scaling lists may be stored elsewhere other than in an SPS or PPS. Also, scaling lists may be transmitted in a plurality of layers such as an SPS and a PPS as illustrated in FIG. 20. This makes it possible to control scaling lists in a layered manner by preferentially setting, in the case where a scaling list is stored in a PPS, the scaling list in the PPS, and by setting, in the case where no scaling list is stored in any PPS, a scaling list in an SPS.

Figure 21:
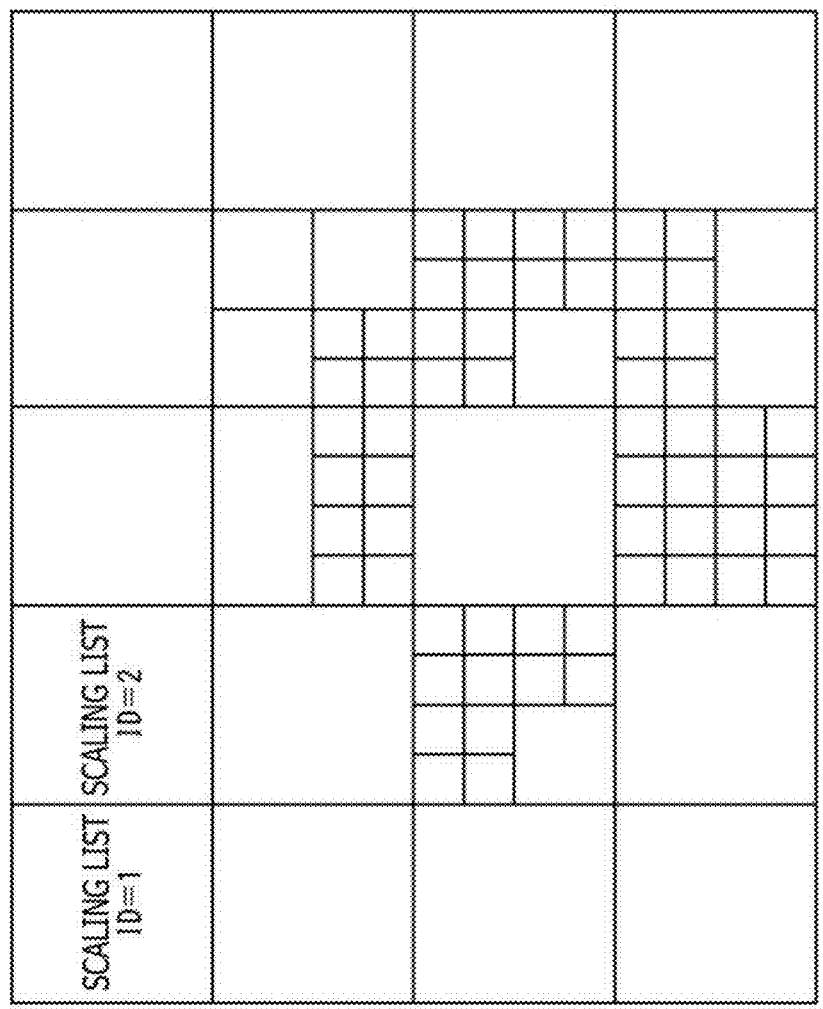
FIG. 21 is a diagram illustrating an example of a manner in which a scaling list is specified.

Also, for example, identification information (ID) may be set for each of the scaling lists transmitted as illustrated in FIG. 21 so that a scaling list is specified using the identification information. For example, a scaling list to be used for each TU may be set using identification information. By using identification information in this manner, it is possible to set scaling lists with more ease, thereby keeping reduction in coding efficiency to a minimum.

<Flow of the Image Coding Process>

A description will be given of an example of a flow of an image coding process in this case performed by the image coding apparatus 100 with reference to the flowchart illustrated in FIG. 22. When the image coding process begins, the processes from steps S201 to S211 are performed similarly to those from steps S101 to S111 in FIG. 11, respectively.

It should be noted, however, that, in the pre-processing in step S201, a plurality of scaling lists are stored in a sequence parameter set (SPS) or a picture parameter set (PPS), and that, in step S205, an optimal scaling list for the target coding rate and the TU size is selected from among the plurality of scaling lists transmitted.

In step S212, the coding section 118 generates coded data by performing a coding process. For example, the coding section 118 generates coded data by performing CABAC (Context-based Adaptive Binary Arithmetic Code) on the quantized residual data acquired by the process in step S206. Also, the coding section 118 codes metadata generated by the process in step S201 and adds the metadata to the coded data. That is, the coding section 118 codes a sequence parameter set (SPS) or a picture parameter set (PPS) that stores a plurality of scaling lists and stores the SPS or PPS in the coded data. Further, the coding section 118 codes scaling list specification information that specifies a scaling list to be used for quantization in each TU and stores the information in the coded data. Although details of this scaling list specification information are arbitrary, the information includes, for example, identification information regarding a scaling list to be used for quantization. Further, the coding section 118 codes, as appropriate, other information regarding quantization, information regarding prediction, and so on and adds the information to the coded data.

In step S213, the accumulation buffer 119 accumulates the coded data acquired by the process in step S212 and so on. The coded data and so on accumulated in the accumulation buffer 119 is read, for example, as a bit stream as appropriate and transmitted to the decoding side via a transport channel or recording medium.

When the process in step S213 ends, the image coding process ends.

<Pre-Processing>

A description will be given next of an example of a pre-processing flow performed in step S201 in FIG. 22 with reference to the flowchart illustrated in FIG. 23. When the pre-processing begins, the processes in steps S231 and S232 are performed similarly to those in steps S131 and S132 in FIG. 12, respectively.

In step S233, the metadata setting section 152 registers a plurality of scaling lists, candidates, in a sequence parameter set (SPS) or a picture parameter set (PPS) or both thereof.

In step S234, the block setting section 153 performs block partitioning that sets various types of blocks for the current frame to be processed by using, for example, a cost function or other means.

Figure 22:
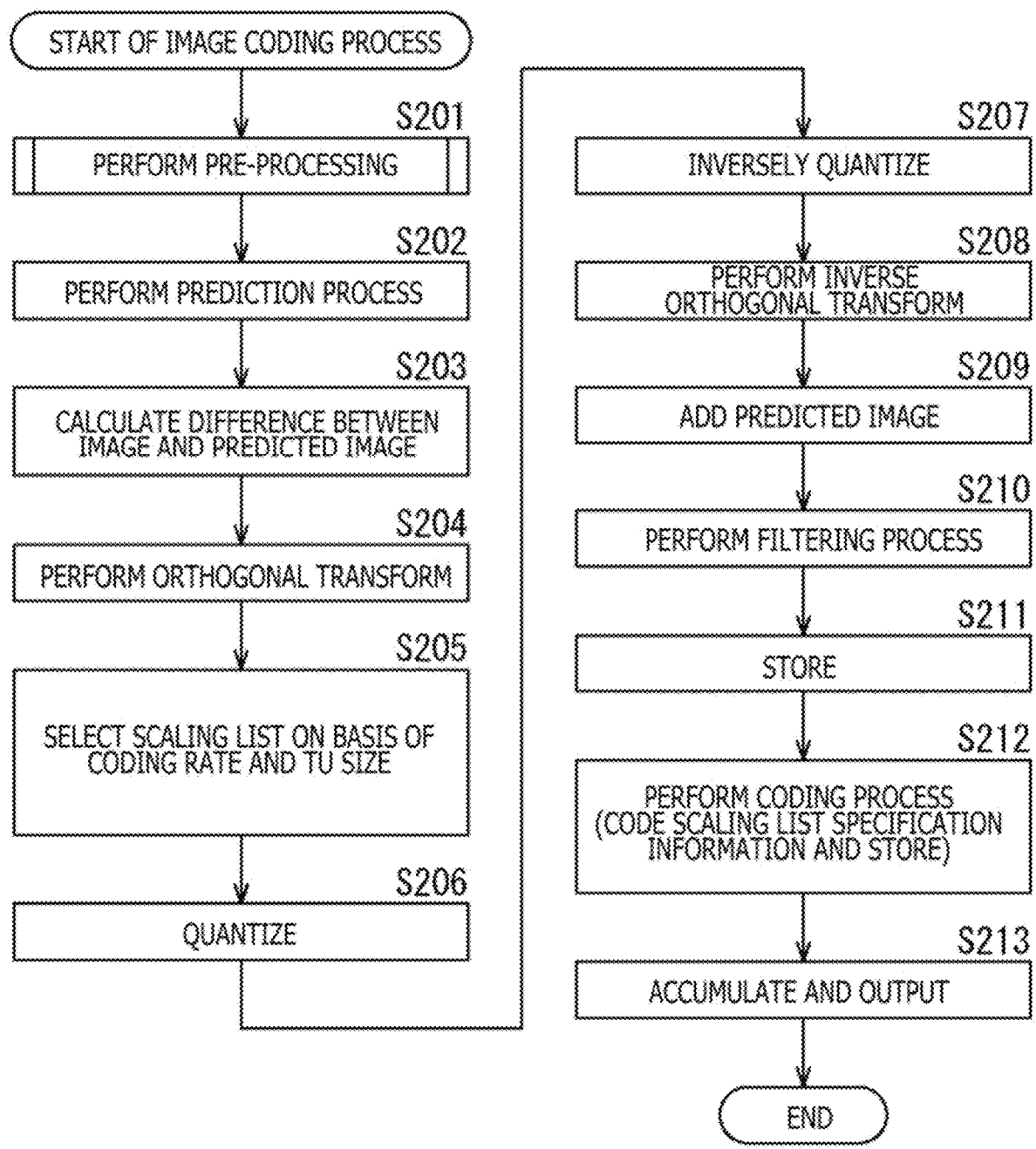
FIG. 22 is a flowchart describing an example of a flow of the image coding process.
Figure 23:
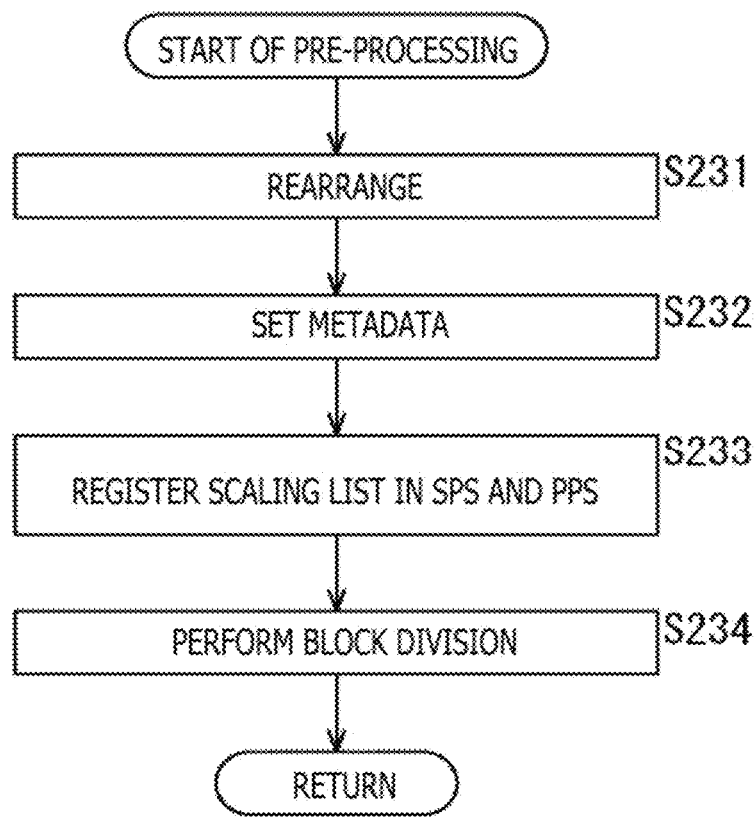
FIG. 23 is a flowchart describing an example of a pre-processing flow.

When the process in step S234 ends, the pre-processing ends, and the process returns to FIG. 22.

As a result of execution of each of the processes as described above, the image coding apparatus 100 keeps reduction in coding efficiency to a minimum.

<Image Decoding Apparatus>

A description will be given next of decoding of coded data coded as described above. FIG. 24 is a block diagram illustrating an example of an image decoding apparatus, an aspect of the image processing apparatus to which the present technology is applied. An image decoding apparatus 200 illustrated in FIG. 24 is an image decoding apparatus corresponding to the image coding apparatus 100 illustrated in FIG. 9 and decodes coded data, generated by the image coding apparatus 100, by a method corresponding to the coding method thereof. It should be noted that FIG. 24 depicts main processing sections, main data flows, and so on and that not all elements are illustrated in FIG. 24. That is, processing sections not depicted as blocks in FIG. 24 may exist in the image decoding apparatus 200, and processes and data flows not depicted as arrows and so on may exist in FIG. 24.

As illustrated in FIG. 24, the image decoding apparatus 200 includes an accumulation buffer 211, a decoding section 212, an inverse quantization section 213, an inverse orthogonal transform section 214, a calculation section 215, a filter 216, a post-processing buffer 217, and a post-processing section 218. The image decoding apparatus 200 also includes an intra-prediction section 219, a frame memory 220, an inter-prediction section 221, and a predicted image selection section 222.

The image decoding apparatus 200 is supplied, for example, with coded data generated by the image coding apparatus 100 and so on as a bit stream via a transmission medium, a recording medium, or other medium. The accumulation buffer 211 accumulates the coded data and supplies the coded data to the decoding section 212 at a given timing.

The decoding section 212 decodes the coded data, supplied from the accumulation buffer 211, by a scheme (operation mode) corresponding to the coding scheme of the coding section 118 illustrated in FIG. 9. When quantized data is acquired by decoding the coded data, the decoding section 212 supplies the quantized data to the inverse quantization section 213. Also, the decoding section 212 supplies information regarding the optimal prediction mode, acquired by decoding the coded data, to the intra-prediction section 219 or the inter-prediction section 221. For example, in the case where intra-prediction is performed, the decoding section 212 supplies, to the intra-prediction section 219, information regarding the prediction result in the optimal intra-prediction mode. Also, for example, in the case where inter-prediction is performed, the decoding section 212 supplies, to the inter-prediction section 221, information regarding the prediction result in the optimal inter-prediction mode. Similarly, the decoding section 212 can supply, as appropriate, various pieces of information acquired by decoding the coded data to various processing sections that need that information.

The inverse quantization section 213 inversely quantizes the quantized data supplied from the decoding section 212. That is, the inverse quantization section 213 performs inverse quantization by a scheme corresponding to the quantization scheme of the quantization section 117 illustrated in FIG. 9 (i.e., scheme similar to that of the inverse quantization section 120). The inverse quantization section 213 supplies an orthogonal transform coefficient, acquired by the inverse quantization, to the inverse orthogonal transform section 214.

The inverse orthogonal transform section 214 inversely orthogonally transforms the orthogonal transform coefficient supplied from the inverse quantization section 213. That is, the inverse orthogonal transform section 214 performs inverse orthogonal transform by a scheme corresponding to the orthogonal transform scheme of the orthogonal transform section 114 illustrated in FIG. 9 (i.e., scheme similar to that of the inverse orthogonal transform section 121). The inverse orthogonal transform section 214 supplies residual data, acquired by the inverse orthogonal transform process (recovered residual data), to the calculation section 215.

The calculation section 215 acquires a reconfigured image by adding the predicted image supplied from the predicted image selection section 222 to the recovered residual data supplied from the inverse orthogonal transform section 214. The calculation section 215 supplies the reconfigured image to the filter 216 and the intra-prediction section 219.

The filter 216 performs a similar filtering process to that of the filter 123 illustrated in FIG. 9 (e.g., deblocking filtering). The filter 216 supplies a decoded image, a filtering process result, to the post-processing buffer 217 and the frame memory 220.

The post-processing buffer 217 stores the supplied decoded image. The post-processing section 218 performs processes such as frame rearrangement on the input image stored in the post-processing buffer 217. The post-processing buffer 217 outputs the decoded image data, which has undergone post-processing, outside of the image decoding apparatus 200.

The intra-prediction section 219 generates a predicted image by performing intra-prediction using information regarding the prediction result in the optimal intra-prediction mode supplied from the decoding section 212 and the reconfigured image supplied from the calculation section 215. The intra-prediction section 219 supplies the generated predicted image to the predicted image selection section 222.

The frame memory 220 stores the supplied decoded image. Also, the frame memory 220 supplies the stored decoded image and so on to the inter-prediction section 221 at a given timing or on the basis of a request from the inter-prediction section 221 or other external request.

The inter-prediction section 221 generates a predicted image by performing inter-prediction using information regarding the prediction result in the optimal inter-prediction mode supplied from the decoding section 212 and the decoded image supplied from the frame memory 220. The inter-prediction section 221 supplies the generated predicted image to the predicted image selection section 222.

The predicted image selection section 222 supplies the predicted image supplied from the intra-prediction section 219 or the inter-prediction section 221 to the calculation section 215. For example, in the case where the block to be processed is a block that was subjected to intra-prediction during coding, a predicted image (intra-predicted image) is generated by the intra-prediction section 219 as a result of intra-prediction. Therefore, the predicted image selection section 222 supplies the intra-predicted image to the calculation section 215. Also, for example, in the case where the block to be processed is a block that was subjected to inter-prediction during coding, a predicted image (inter-predicted image) is generated by the inter-prediction section 221 as a result of inter-prediction. Therefore, the predicted image selection section 222 supplies the inter-predicted image to the calculation section 215.

<Flow of the Image Decoding Process>

A description will be given next of an example of a flow of the image decoding process performed by the image decoding apparatus 200 with reference to the flowchart illustrated in FIG. 25.

When the image decoding process begins, in step S251, the accumulation buffer 211 accumulates coded data supplied to the image decoding apparatus 200. In step S252, the decoding section 212 performs a decoding process. That is, the decoding section 212 acquires a quantization coefficient by acquiring the coded data accumulated in the accumulation buffer 211 by the process in step S251 and by decoding the data.

In step S253, the inverse quantization section 213 acquires the scaling lists stored in a sequence parameter set (SPS), a picture parameter set (PPS), or both thereof acquired from the coded data by the decoding section 212 and scaling list specification information for each TU and selects, on the basis of these, a scaling list for the TU to be processed.

In step S254, the inverse quantization section 213 acquires an orthogonal transform coefficient by inversely quantizing the quantized data acquired by the process in step S252 using the scaling list acquired by the process in step S253. In step S255, the inverse orthogonal transform section 214 acquires recovered residual data by inversely orthogonally transforming the orthogonal transform coefficient acquired by the process in step S254.

In step S256, the intra-prediction section 219, the inter-prediction section 221, and the predicted image selection section 222 generate predicted images by performing a prediction process in the prediction modes used during coding. For example, in the case where the block to be processed is a block that was subjected to intra-prediction during coding, the intra-prediction section 219 generates an intra-predicted image, and the predicted image selection section 222 selects that intra-predicted image as a predicted image. Also, for example, in the case where the block to be processed is a block that was subjected to inter-prediction during coding, the inter-prediction section 221 generates an inter-predicted image, and the predicted image selection section 222 selects that inter-predicted image as a predicted image.

In step S257, the calculation section 215 acquires a reconfigured image by adding the predicted image acquired by the process in step S256 to the recovered residual data acquired by the process in step S255.

In step S258, the filter 216 acquires a decoded image by performing a filtering process such as deblocking filtering on the reconfigured image acquired by the process in step S257.

In step S259, the post-processing buffer 217 stores the decoded image acquired by the process in step S258. The post-processing section 218 rearranges frames of the decoded image, rearranging the order of frames from the order of decoding back to the original order of display.

In step S260, the frame memory 220 stores the decoded image acquired by the process in step S258. This decoded image is used as a reference image during inter-prediction.

When the process in step S260 ends, the image decoding process ends.

It should be noted that the processing units of each of these processes are arbitrary and may not be the same. Therefore, the process in each step can be performed, as appropriate, in parallel with the process in other step and so on or in a switched order.

As a result of execution of each of the processes as described above, the image decoding apparatus 200 can set a scaling list for each TU using the plurality of scaling lists and the scaling list specification information. Therefore, the image decoding apparatus 200 contributes to an increased degree of freedom for a scaling list set for each TU, making it possible to set a scaling list more suitable for the target bitrate and the TU size. As a result, it is possible to keep reduction in coding efficiency to a minimum.

6. Sixth Embodiment

<Banding Noise>

Figure 26C:
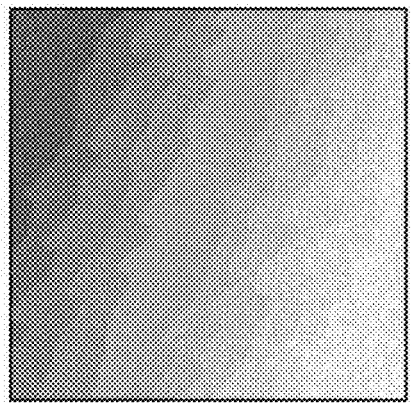
FIGS. 26A, 26B, and 26C are diagrams describing banding noise.
Figure 26A:
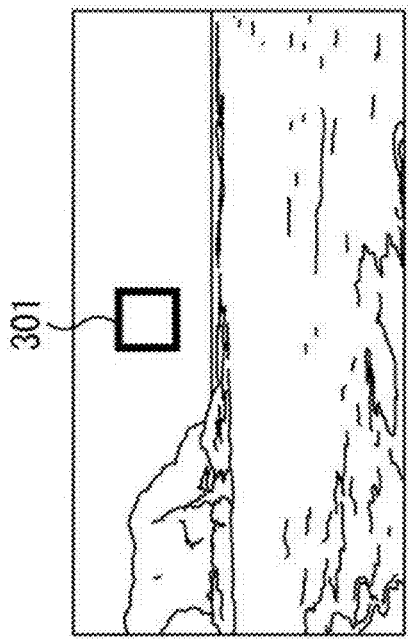
Figure 26B:
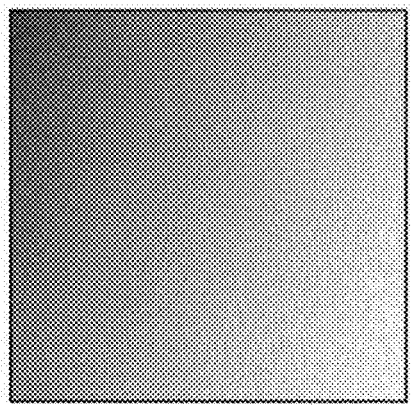

There is a case in which an image has a region with a small change in brightness such as sky or wall (hereinafter also referred to as a flat region). For example, in an image as illustrated in FIG. 26A, a region 301 enclosed by a rectangle is a portion of sky that has an approximately constant brightness value. However, the brightness value is not often completely the same in this region as a whole and commonly subtly changes. For example, by enlarging the region 301 in FIG. 26A, we can see that the region has so-called gradation as illustrated in FIG. 26B.

In the case where an image (region) having such minute changes in brightness is coded, a large TU size such as 32×32 is likely selected because of a gentle change in brightness value. Setting a scaling list (quantization matrix), for example, as in the example illustrated in FIG. 8 for such a region results in coding of a DCT coefficient with large quantization steps, possibly causing loss of many thereof. As a result, for example, banding noise may occur which looks as if the brightness value changes in stages because of failure to represent gradation as illustrated in FIG. 26C, possibly resulting in degraded subjective image quality.

Figure 27:
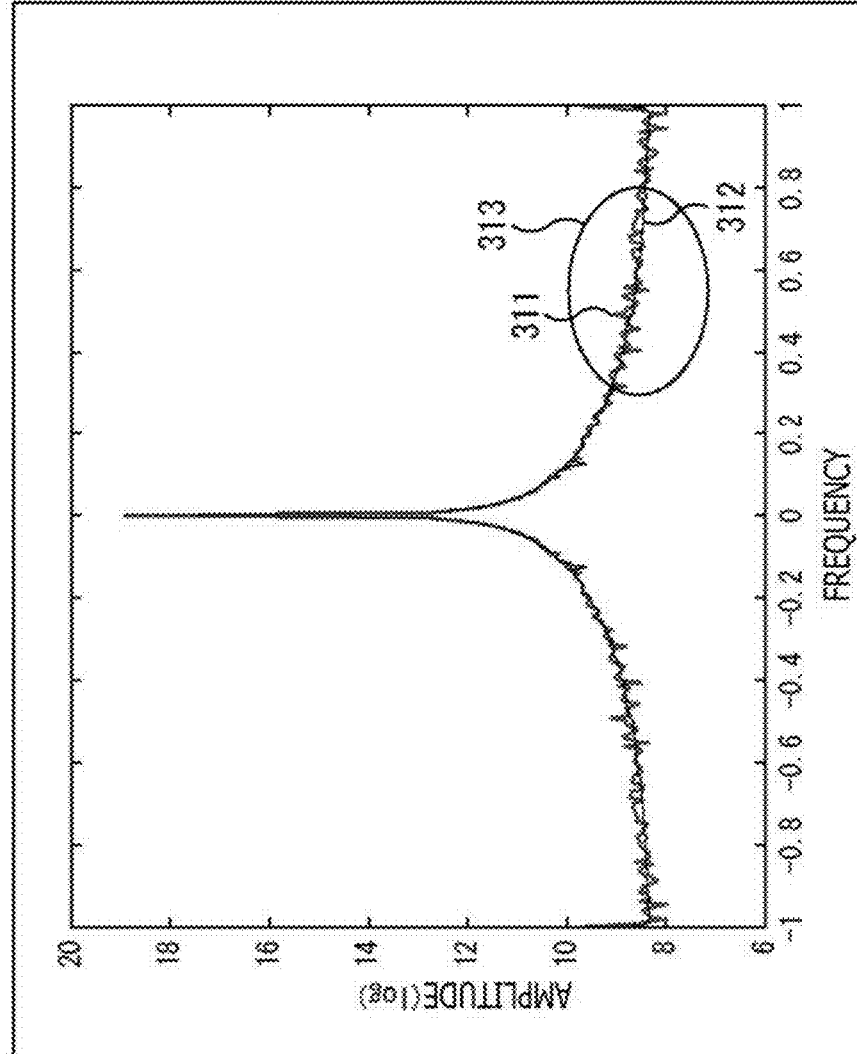
FIG. 27 is a diagram describing an example of a manner in which banding noise occurs.

The graph illustrated in FIG. 27 depicts an example of comparison of the relationship between an image frequency and its amplitude before and after coding for a region where banding noise as described above occurs. In this graph, a curve 311 depicts a frequency-amplitude characteristic of the image before coding, and a curve 312 depicts a frequency-amplitude characteristic of the image after coding. Comparing these in the portion illustrated as an ellipse 313, for example, the difference in amplitude at each frequency that can be observed in the curve 311 has approximately disappeared in the curve 312. This change has been primarily brought about by quantization during coding. Such a quantization error reduces minute variations in brightness value of each pixel in the decoded image, unnaturally rendering the brightness value uniform. Such a minute quantization error is not conspicuous in an ordinary image with wide ranging frequency components. In a flat region with a small change in brightness such as gradation, however, there is a possibility that a quantization error may manifest itself as banding noise.

Figure 28:
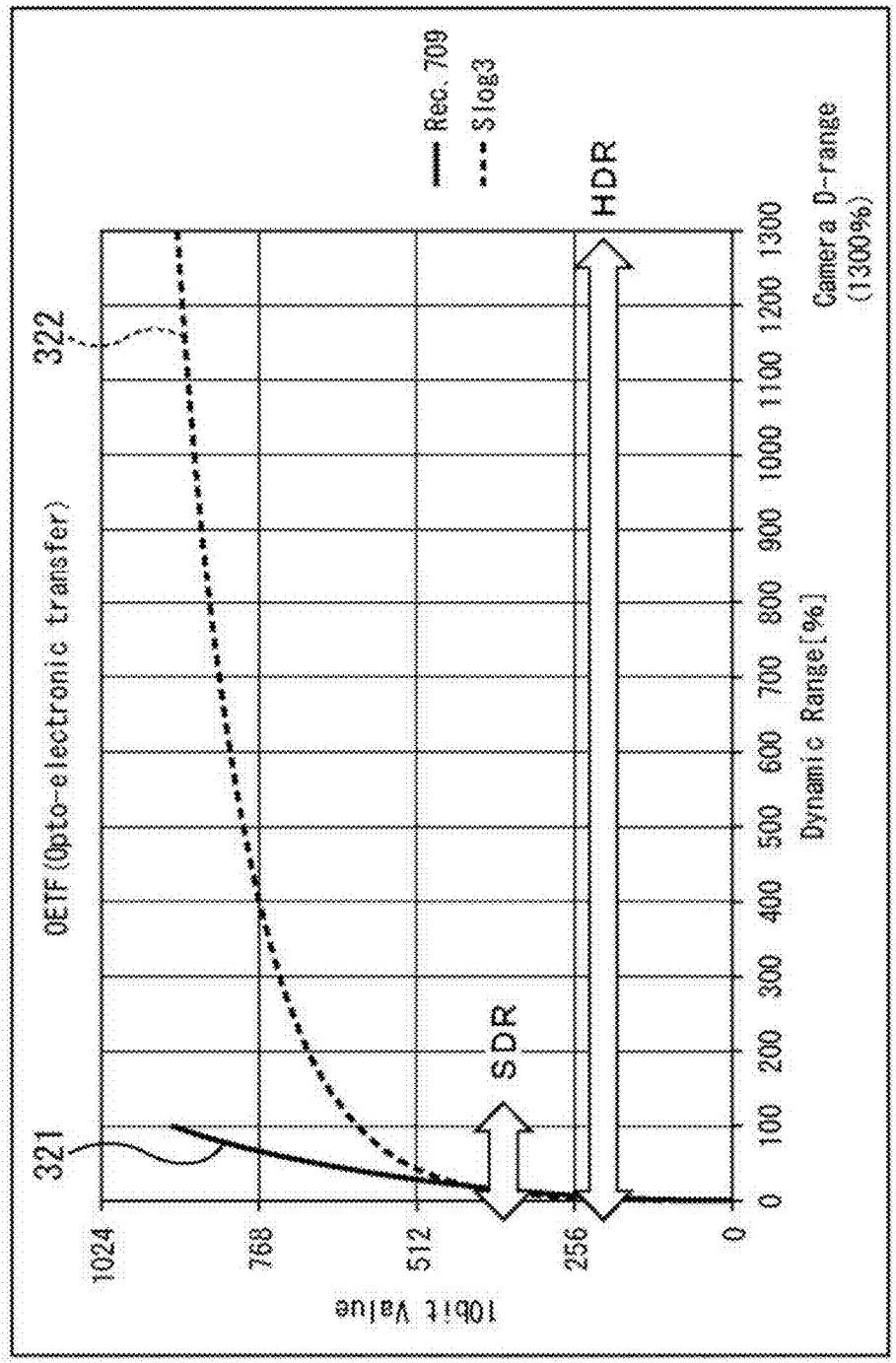
FIG. 28 is a diagram illustrating an example of a manner in which de-gamma correction is performed.

In particular, in the case of an HDR (High Dynamic Range) image with a 12-bit dynamic range (bit depth), the image is de-gamma-corrected with a steep gamma curve, for example, as illustrated in FIG. 28 in an EOTF (Electro Optical Transfer Function), readily resulting in exaggeration of a small quantization error and often rendering banding noise conspicuous. In the case of an SDR (Standard Dynamic Range) image having a 10-bit dynamic range (bit depth) as illustrated in FIG. 28, the image is de-gamma-corrected by a gamma curve 321. Therefore, the quantization error remains approximately constant. In the case of an HDR image, the image is de-gamma-corrected by a gamma curve 322, possibly increasing the quantization error to a maximum of 1300%.

<Protection of Low and Medium Frequency Components>

For this reason, in the case where the current block size is equal to or larger than a given size, a scaling list some of whose values on the lower frequency component side are smaller than in the case of a block smaller than the given size may be set.

For example, as illustrated in FIG. 29, in the case where the current block has a 32×32 pixel size, a scaling list having "very small" values for low- and medium-frequency orthogonal transform coefficients smaller than a scaling list for a block smaller than 32×32 pixels is set (shaded portions in the figure).

By setting a scaling list with very small low- and medium-frequency values, it is possible to reduce quantization steps for quantization in the low- and medium-frequencies, contributing to reduced quantization error. Therefore, it is possible to protect gentle change in brightness value such as gradation in flat regions, thereby minimizing occurrence of banding noise in a decoded image.

In the case of HEVC, for example, the maximum TU size is 32×32 pixels, and 32×32-pixel TUs are often assigned to flat regions. Therefore, by setting such a scaling list for 32×32-pixel TUs, it is possible to reduce quantization error in the low- and medium-frequencies mainly for flat regions. In other words, TUs smaller than 32×32 pixels are often selected for regions that are not flat. As a result, quantization is performed with quantization steps larger than in the case of a 32×32-pixel block, thereby keeping increase in amount of codes to a minimum. It is possible to minimize reduction in coding efficiency while at the same time keeping reduction on the subjective image quality of the decoded image to a minimum.

The method for setting such a scaling list is similar to that in the first embodiment. That is, it is only necessary to store a scaling list for each rate and each block size as in the example illustrated in FIG. 29 in the scaling list storage section 115 of the image coding apparatus 100 illustrated in FIG. 9 and cause the scaling list selection section 116 to select a scaling list on the basis of the target bitrate and the TU size (steps S105 and S106 in FIG. 10).

As described above, a large TU size (32×32 pixels in the case of HEVC) is likely selected for flat regions. Therefore, it is possible to select a scaling list having very small values for low- and medium-frequency orthogonal transform coefficients mainly for flat regions without need for any process such as flat region detection and with more ease by determining values for low- and medium-frequency orthogonal transform coefficients in accordance with the TU size as in the example illustrated in FIG. 29.

It should be noted that the above block size is merely an example and that the block size is not limited to this example. That is, a scaling list having very small values for low- and medium-frequency orthogonal transform coefficients may be used for blocks larger than a given size. Then, the given size may be 32×32 pixels or other size. The block size should preferably be a size that is easy to select for flat regions.

<Protection of Low and Medium Frequency Components>

It should be noted that a scaling list some of whose values on the lower frequency component side are smaller than a DC component value may be set for the current block to be quantized in the image to be coded.

Figure 30A:
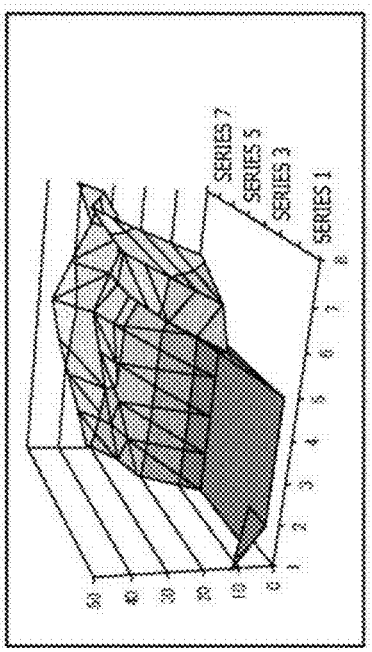
FIGS. 30A and 30B are diagrams illustrating examples of scaling lists.
Figure 30B:
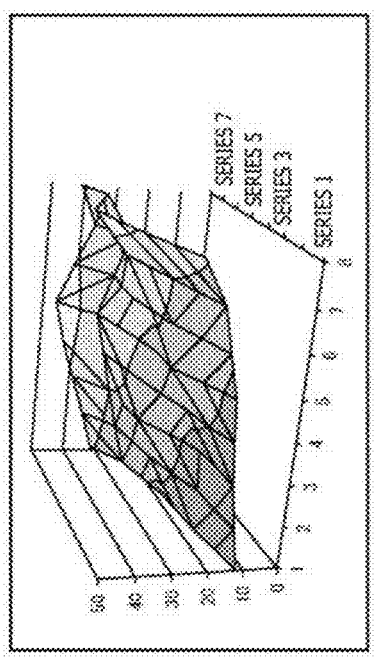

FIGS. 30A and 30B illustrate more specific examples of scaling lists. FIG. 30A is an example of a common scaling list in the past, and FIG. 30B is an example of a scaling list applied to the above flat regions. In each of FIGS. 30A and 30B, the table on top illustrates each value of the scaling list. As with TUs, a DC component value is given at the top left corner, and all other values are AC component values. The closer the values are to the top left, the lower the components are in frequency, and the closer the values are to the bottom right, the higher the components are in frequency. These values are depicted in 3D graphs at the bottom in FIGS. 30A and 30B.

As illustrated in FIG. 30A, each of the values in a common scaling list in the past monotonously increases from low frequency components to high frequency components. In contrast, in the case of a scaling list illustrated in FIG. 30B, "4" which is smaller than "12," the DC component value, is set for low- and medium-frequency orthogonal transform coefficients. Therefore, it is possible to reduce low- and medium-frequency quantization error more in the case where the scaling list illustrated in FIG. 30B is used than in the case where the scaling list illustrated in FIG. 30A is used. That is, by using a scaling list illustrated in FIG. 30B for flat regions, it is possible to protect gentle change in brightness value such as gradation in flat regions, thereby minimizing occurrence of banding noise in a decoded image.

The method for setting such a scaling list is as described above with reference to FIG. 29. It should be noted that low- and medium-frequency values need only be smaller than the DC component value and may be a number other than "4" mentioned above. Also, low- and medium-frequency values need not be homogeneous as illustrated in the example illustrated in FIG. 30B. Also, the range over which the low- and medium-frequency values are smaller than the DC component value may be wider or narrower than in the example illustrated in FIG. 30B.

Also, the scaling list illustrated in FIG. 30B may be set for TUs equal to or larger than a given size. This allows for reduction in low- and medium-frequency quantization error mainly for flat regions in a similar manner to the case illustrated in FIG. 29. That is, it is possible to keep reduction in coding efficiency to a minimum while at the same time minimizing reduction in subjective image quality of the decoded image. It should be noted that this given size is arbitrary. The given size may be 32×32 pixels as in the example illustrated in FIG. 29. Of course, the scaling list illustrated in FIG. 30B may be selected irrespective of the TU size.

<Scaling List Appropriate to the Rate>

It should be noted that in the case where some of the values of a scaling list on the lower-frequency component side such as low- and medium-frequency values are reduced, the values may be set appropriate to the target bitrate. The larger the scaling list values, the larger the quantization steps, and the lesser the amount of codes. Therefore, for example, the lower the target bitrate, the larger the values may be (the higher the target bitrate, the smaller the values may be) as in the shaded portions illustrated in FIG. 31. This makes it possible to achieve the target bitrate with more ease. Of course, values other than these may also be used.

In the case of the example illustrated in FIG. 31, the magnitudes of the values for low- and medium-frequency orthogonal transform coefficients in a scaling list set for a 32×32-pixel TU size are such that the values are "very small (H)" in the case of a high target bitrate, "very small (M)" in the case of a medium target bitrate, and "very small (L)" in the case of a low target bitrate. Also, for example, the values for low- and medium-frequency orthogonal transform coefficients in the scaling list illustrated in FIG. 30B may be set to "4" in the case of a high target bitrate, "6" in the case of a medium target bitrate, and "8" in the case of a low target bitrate.

Also, the lower the target bitrate, the narrower the range over which the values are smaller than the DC component value (the higher the target bitrate, the wider the range). Of course, both the magnitudes of the values and the breadth of the range may be variable in accordance with the target bitrate.

7. Seventh Embodiment

<Selection of Scaling List>

In the case where the dynamic range of the image to be coded is larger than a given range and where the current block size is equal to or larger than a given size, a scaling list may be set some of whose values on the lower frequency component side are smaller than in the case of a block smaller than the given size. Also, in the case where the dynamic range of the image is larger than a given range, a scaling list may be set some of whose values on the lower frequency component side are smaller than the DC component value. For example, the scaling list illustrated in FIG. 29, 30B, or 31 may be used as an HDR scaling list so that the scaling list is applied only in the case where the image to be coded is an HDR image.

<Image Coding Apparatus>

Figure 32:
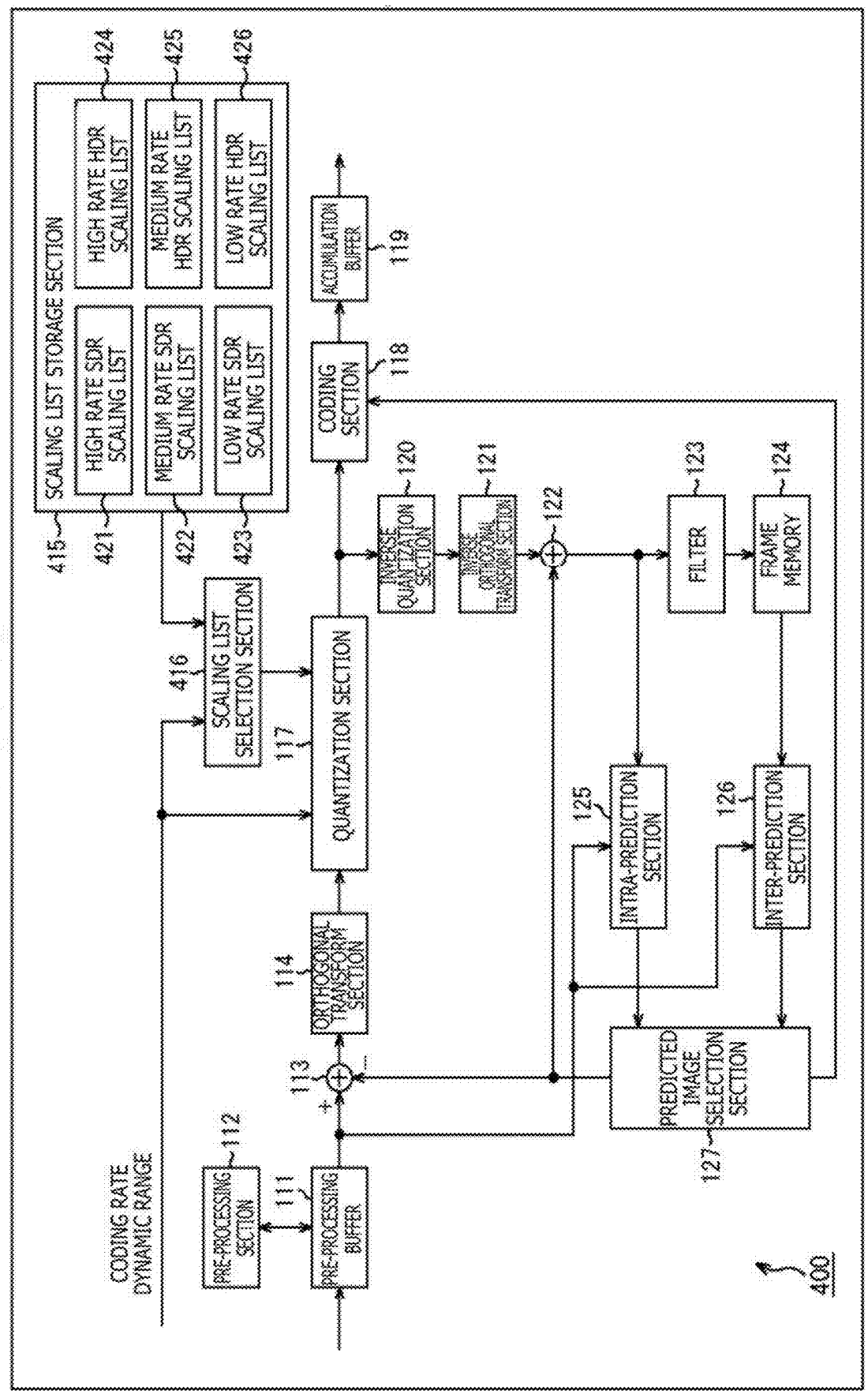
FIG. 32 is a block diagram illustrating a main configuration example of the image coding apparatus.

FIG. 32 illustrates a main configuration example of the image coding apparatus in that case. An image coding apparatus 400 illustrated in FIG. 32 is basically similar to the image coding apparatus 100 (FIG. 9), has a similar configuration to the image coding apparatus 100, and performs similar processes. It should be noted, however, that in the case where an HDR image is coded, the image coding apparatus 400 uses an HDR scaling list for quantization.

As illustrated in FIG. 32, the image coding apparatus 400 has a scaling list storage section 415 in place of the scaling list storage section 115 of the image coding apparatus 100. Also, the image coding apparatus 400 has a scaling list selection section 416 in place of the scaling list selection section 116 of the image coding apparatus 100.

The scaling list storage section stores, as candidates of scaling lists used for quantization, high-rate SDR scaling lists 421, medium-rate SDR scaling lists 422, low-rate SDR scaling lists 423, high-rate HDR scaling lists 424, medium-rate HDR scaling lists 425, and low-rate HDR scaling lists 426.

The high-rate SDR scaling lists 421, the medium-rate SDR scaling lists 422, and the low-rate SDR scaling lists 423 are scaling lists for each target bitrate used for quantization of an SDR image. These scaling lists are, for example, those illustrated in FIG. 8. The high-rate HDR scaling lists 424, the medium-rate HDR scaling lists 425, and the low-rate HDR scaling lists 426 are scaling lists for each target bitrate used for quantization of an HDR image. These scaling lists are, for example, those illustrated in FIG. 29, 30B, or 31.

The scaling list storage section 415 supplies, from among the stored candidates, the candidate (scaling list) requested by the scaling list selection section 416, to the scaling list selection section 416.

The scaling list selection section 416 performs processes related to the setting of scaling lists that will be used for quantization performed by the quantization section 117. The scaling list selection section 416 acquires a coding rate to be achieved (target bitrate) and information regarding the dynamic range of the input image. Also, the scaling list selection section 416 acquires, from the quantization section 117, information indicating the size of the TU to be processed (current block). The scaling list selection section 416 sets a scaling list corresponding to the target bitrate, the dynamic range, and the size of the current block (TU size) by using the candidates of scaling lists stored in the scaling list storage section 415 and supplies the scaling list to the quantization section 117.

For example, in the case where the input image is an HDR image and where the target bitrate is high, the scaling list selection section 416 selects the high-rate HDR scaling lists 424, sets, from thereamong, a scaling list appropriate to the current block size, and supplies the scaling list to the quantization section 117.

<Flow of the Image Coding Process>

A description will be given of an example of a flow of the image coding process performed by the image coding apparatus 400 in that case with reference to the flowchart illustrated in FIG. 33.

In this case, when the image coding process begins, the processes from steps S401 to S404 are performed similarly to those from steps S101 to S104 in FIG. 11, respectively.

In step S405, the scaling list selection section 416 selects, on the basis of the coding rate to be achieved (target bitrate), the dynamic range of the input image, and the current block size (TU size), a scaling list having values appropriate to the dynamic range, the target bitrate, and the TU size.

In step S406, the orthogonal transform coefficient acquired by the process in step S404 is quantized by using the quantization parameter appropriate to the target coding rate and the scaling list acquired by the process in step S405 or by other means.

The processes in steps S407 to S413 are performed similarly to those in steps S107 to S113 in FIG. 11, respectively. When the process in step S413 ends, the image coding process ends.

It should be noted that the processing units of each of these processes are arbitrary and may not be the same. Therefore, the process in each step can be performed, as appropriate, in parallel with the process in other step and so on or in a switched order.

By performing the image coding process as described above, it is possible to set a scaling list capable of protecting low and medium frequency components in flat regions for quantization only for an HDR image in which banding noise is conspicuous. This further keeps reduction in coding efficiency to a minimum.

It should be noted that the dynamic range for switching between scaling lists as described above is arbitrary and may be 10 bits as described above or may have other bit count. Also, for example, the dynamic ranges may be switched in a plurality of stages such as 10 bits and 12 bits.

8. Eighth Embodiment

<Flatness Detection>

Also, flat regions may be detected. For example, in the case where the current picture includes a flat portion with a small change in brightness, a scaling list may be set some of whose values on the lower frequency component side are smaller than in the case where no flat portion is included. Also, in the case where the current picture includes a flat portion with a small change in brightness, a scaling list may be set some of whose values on the lower frequency component side are smaller than the DC component value.

In that case, for example, the pre-processing section 112 of the image coding apparatus 400 detects a flat region in the current picture (picture to be processed) of the input image, and the scaling list selection section 416 selects a scaling list on the basis of the detection result thereof. For example, for a picture including the flat region, the scaling list selection section 416 may select a scaling list as illustrated in FIG. 29, 30B, or 31 such as the high-rate HDR scaling lists 424, the medium-rate HDR scaling lists 425, or the low-rate HDR scaling lists 426.

<Flow of the Image Coding Process>

A description will be given of an example of a flow of the image coding process in that case with reference to the flowchart illustrated in FIG. 34. When the image coding process begins, the processes from steps S431 to S434 are performed similarly to those from steps S401 to S404 in FIG. 33, respectively.

In step S405, the scaling list selection section 416 selects a scaling list on the basis of the dynamic range, the flat region detection result, the coding rate, and the TU size.

Figure 33:
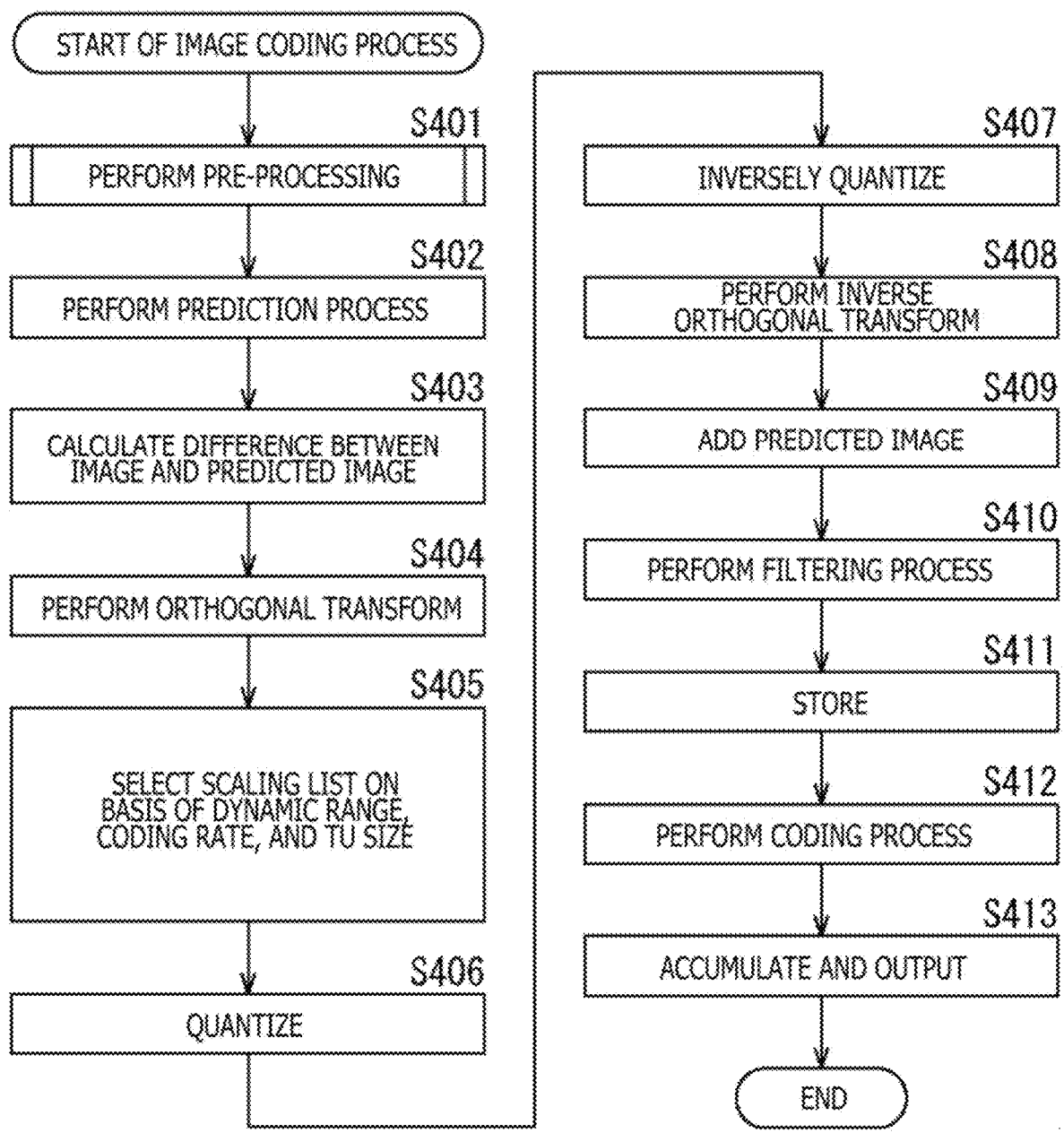
FIG. 33 is a flowchart describing an example of a flow of the image coding process.
Figure 34:
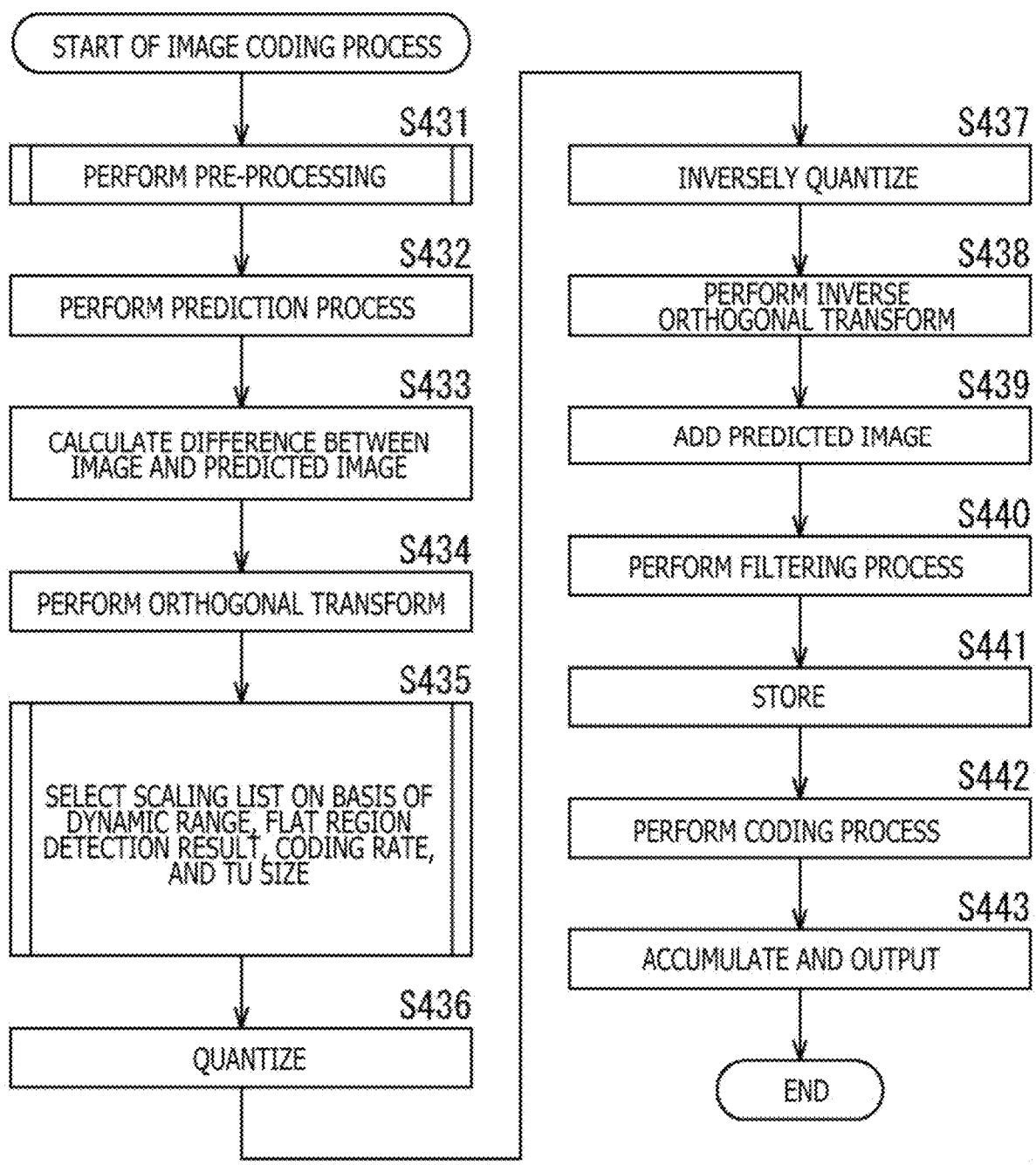
FIG. 34 is a flowchart describing an example of a flow of the image coding process.

The processes in steps S436 to S443 are performed similarly to those in steps S406 to S413 in FIG. 33, respectively. When the process in step S443 ends, the image coding process ends.

It should be noted that the processing units of each of these processes are arbitrary and may not be the same. Therefore, the process in each step can be performed, as appropriate, in parallel with the process in other step and so on or in a switched order.

<Flow of the Scaling List Selection Process>

Figure 35:
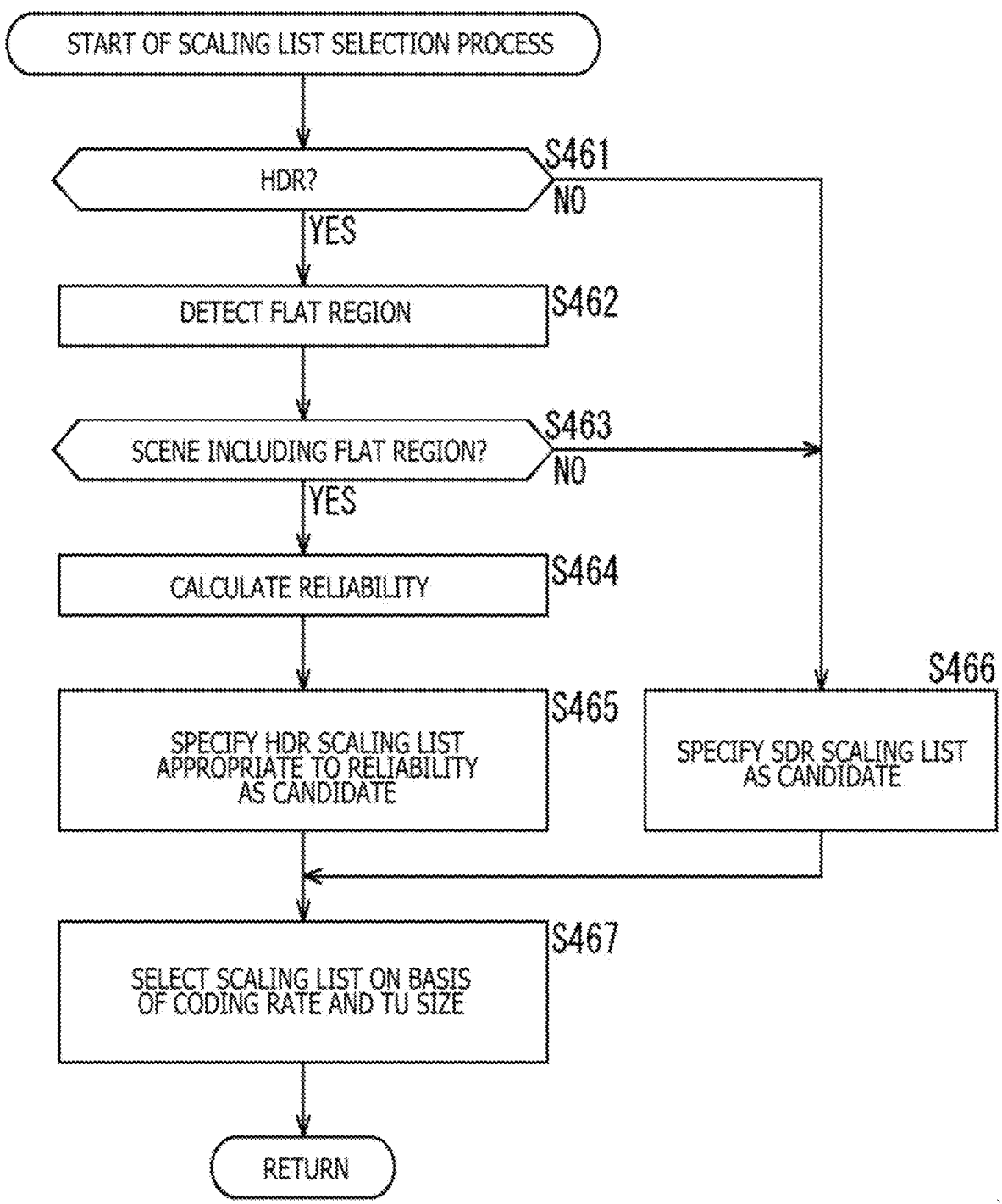
FIG. 35 is a flowchart describing an example of a flow of a scaling list selection process.

A description will be given next of an example of a flow of a scaling list selection process performed in step S435 illustrated in FIG. 34 with reference to the flowchart illustrated in FIG. 35.

When the scaling list selection process begins, the scaling list selection section 416 determines, in step S461, whether or not the image to be coded is an HDR image. In the case where it is determined that the image is an HDR image, the process proceeds to step S462. In step S462, the pre-processing section 112 detects flat regions in the current picture. The detection method is arbitrary. The pre-processing section 112 supplies the detection result to the scaling list selection section 416.

In step S463, the scaling list selection section 416 determines, on the basis of the detection result, whether or not the current picture is a scene including flat regions. In the case where it is determined that flat regions are included, the process proceeds to step S464. In step S464, the scaling list selection section 416 calculates a reliability of the determination result. The calculation method of this reliability is arbitrary. For example, the reliability may be calculated on the basis of the size of the region that has been determined to be a flat region. For example, the larger the region detected as a flat region, the higher the reliability may be. Also, the region detected as a flat region may be evaluated on the basis of not only the size thereof but also the position, shape, flatness level, and so on and the higher the evaluated value, the higher the reliability may be. Otherwise, the reliability may be calculated with reference to flat region detection results in past frames.

In step S465, the scaling list selection section 416 selects, as candidates, HDR scaling lists appropriate to the reliability calculated by the process in step S464. For example, a little reliable scaling list, a moderately reliable scaling list, and a highly reliable scaling list may be stored in advance in the scaling list storage section 415 so that the scaling list selection section 416 selects a scaling list appropriate to the reliability. It should be noted that any number of types of patterns may be made available appropriate to the reliability. Also, calculation may be made from the reliability using a function or other means. When the process in step S465 ends, the process proceeds to step S467.

Also, in step S461, in the case where it is determined that the dynamic range of the input image is SDR, the process proceeds to step S466. Also, in the case where it is determined in step S463 that the current picture does not include any flat region, the process proceeds to step S466. In step S466, the scaling list selection section 416 selects SDR scaling lists as candidates. When the process in step S466 ends, the process proceeds to step S467.

In step S467, the scaling list selection section 416 selects a scaling list appropriate to the target bitrate and the TU size from among the scaling lists selected as candidates by the process in step S465 or S466 and supplies the scaling list to the quantization section 117. When the process in step S467 ends, the scaling list selection process ends, and the process returns to FIG. 34.

It should be noted that the processing units of each of these processes are arbitrary and may not be the same. Therefore, the process in each step can be performed, as appropriate, in parallel with the process in other step and so on or in a switched order.

By performing each process as described above, it is possible to more accurately set, for an image with flat regions, a scaling list that protects low and medium frequency components in flat regions for quantization. In other words, it is possible to ensure that such a scaling list is not set for an image not including any flat region, further keeping reduction in coding efficiency to a minimum.

It should be noted that values of low and medium frequency in a scaling list may be appropriate to values of the reliability. For example, the higher the reliability, the lower these values may be.

9. Ninth Embodiment

<QTBT>

CUs, PUs, and TUs may be CUs, PUs, and TUs in QTBT (Quad tree plus binary tree) described in JVET-00024, "EE2.1: Quadtree plus binary tree structure integration with JEM tools."

In QTBT, in CU block partitioning, one block can be partitioned not only into four (=2×2) sub-blocks but also two (=1×2, 2×1) sub-blocks. That is, CU block partitioning in this case is conducted by recursively repeating portioning of one block into four or two sub-blocks. As a result, a tree structure in a quad-tree shape or a horizontal or vertical binary-tree shape is formed.

Figure 36:
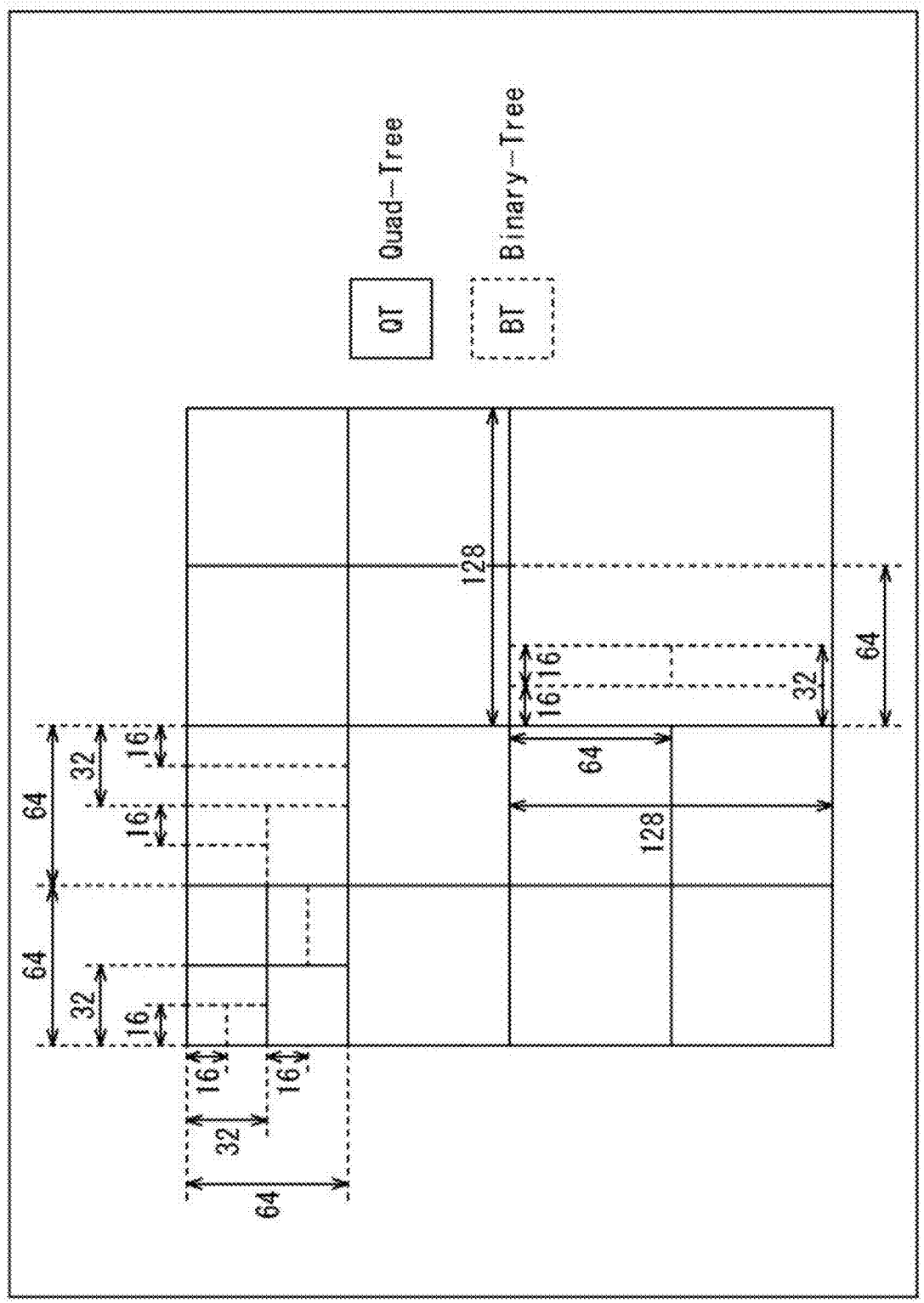
FIG. 36 is a block diagram illustrating a manner in which QTBT is used.

As a result, there is a possibility that the CU shapes may be not only square but also rectangular. For example, in the case of a 128×128 LCU size, there is a possibility that the CU size (horizontal size w×vertical size h) may be not only square such as 128×128, 64×64, 32×32, 16×16, 8×8, and 4×4 but also rectangular such as 128×64, 128×32, 128×16, 128×8, 128×4, 64×128, 32×128, 16×128, 8×128, 4×128, 64×32, 64×16, 64×8, 64×4, 32×64, 16×64, 8×64, 4×64, 32×16, 32×8, 32×4, 16×32, 8×32, 4×32, 16×8, 16×4, 8×16, 4×16, 8×4, and 4×8 as illustrated in FIG. 36. Also, PUs and TUs in this case are the same as CUs.

It should be noted, however, that the maximum quantization size is 32×32 and that, in the case where either or both of the width and height are 64 or more, only low frequency components that fit in T032×32 are transmitted, and other portions are zero.

Figure 37:
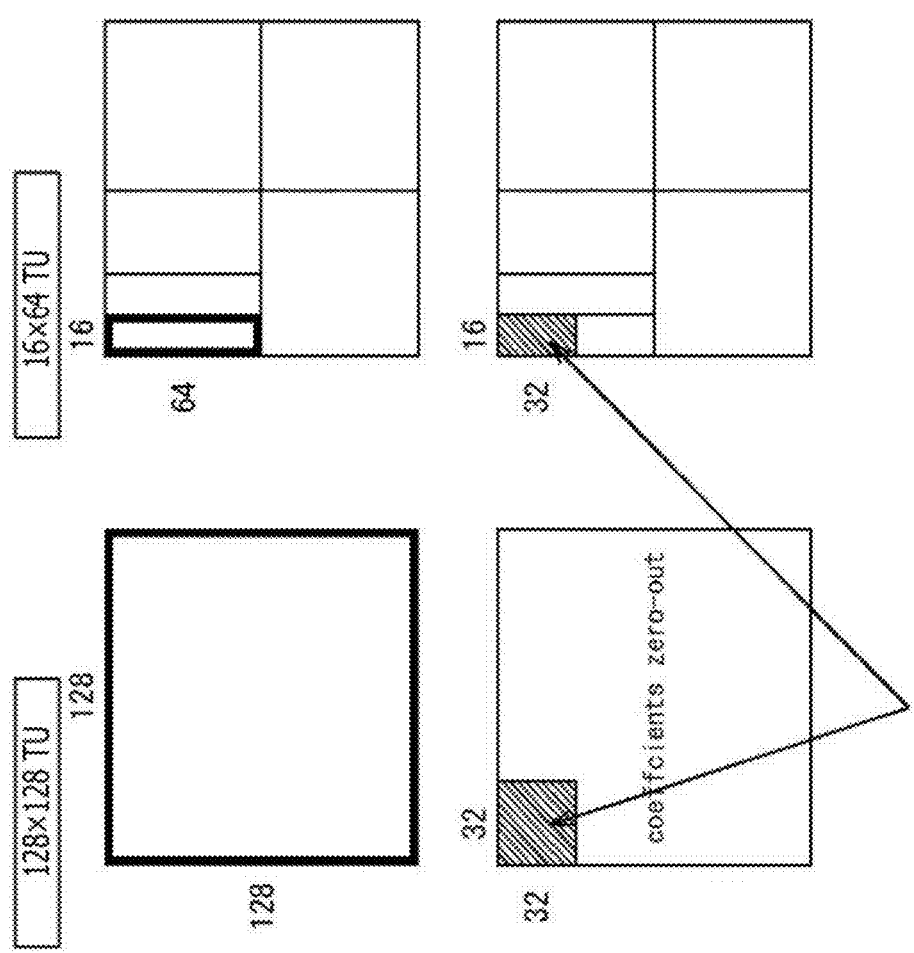
FIG. 37 is a diagram illustrating an example of a manner in which quantization is performed.

For example, in the case of a 128×128 TU illustrated at left in FIG. 37, only the top left 32×32 region is quantized, and all other regions are set to zero. Similarly, in the case of a 16×64 TU illustrated at right in FIG. 37, only the 16×32 region is quantized, and all other regions are set to zero.

Therefore, the shape of a scaling list used for quantization is one of 32×32, 32×16, 32×8, 32×4, 16×32, 8×32, 4×32, 16×16, 16×8, 16×4, 8×16, 4×16, 8×8, 8×4, 4×8, or 4×4. That is, the scaling lists of these sizes are made available in the scaling list storage section 415 as candidates (stored in advance). It should be noted that the scaling list may be changed in size (resized) by thinning out or interpolating numbers. For example, an 8×4 scaling list may be generated by thinning out numbers every other row from an 8×8 scaling list as in the example illustrated in FIG. 38. A scaling list of other size can be similarly generated.

The scaling list in the example illustrated in FIG. 8 is applicable to such a QTBT. In that case, the scaling list values for each TU size may be set as illustrated in FIG. 39.

Then, also in the case of this QTBT, in the case where the current block size is equal to or larger than a given size, a scaling list may be set some of whose values on the lower frequency component side are smaller than in the case of a block smaller than the given size. Also, a scaling list some of whose values on the lower frequency component side are smaller than the DC component value may be set for the current block to be quantized in the image to be coded.

For example, for a flat region, and so on, a scaling list may be selected whose low and medium frequency values are very small as illustrated in FIG. 40B in place of a scaling list whose values monotonously increase from low to high frequencies as illustrated in FIG. 40A. In the case where the current block is non-square, a scaling list as illustrated in FIG. 40C is similarly applicable.

Therefore, for example, in the case where the scaling list in the example illustrated in FIG. 29 is applied to QTBT blocks, scaling list values for each TU size may be set as in the example illustrated in FIG. 41. The same is true for the cases of the examples illustrated in FIGS. 30B and 31.

That is, the first to sixth embodiments are also applicable to QTBT cases, thereby providing a similar advantageous effect to that described above in each of the embodiments. In other words, the scaling list as described above can be set as a scaling list for some of the coefficients on the lower frequency component side of the current block.

10. Tenth Embodiment

<Data Units of Information>

Each of data units in which information regarding image and information regarding image coding and decoding is set described above (or data units of target data) is arbitrary and not limited to the examples described above. For example, these pieces of information may be set for each TU, TB, PU, PB, CU, LCU, sub-block, block, tile, slice, picture, sequence, or component, and data in these data units may be treated as target data. Of course, this data unit is set for each piece of information. That is, all pieces of information need not be set for the same data unit (or be treated as target data). It should be noted that the storage location of these pieces of information is arbitrary and that they may be stored in a header, parameter set, or other location having the above data units. Also, these pieces of data may be stored in a plurality of locations.

<Control Information>

Control information regarding the present technology described in each of the above embodiments may be transmitted from the coding side to the decoding side. For example, control information (e.g., enabled flag) may be transmitted that controls whether or not the application of the present technology described above is enabled (or disabled). Also, for example, control information may be transmitted that specifies an upper or lower limit of the block size for enabling (or disabling) the application of the present technology described above or both thereof.

<Coding and Decoding>

The present technology is applicable to arbitrary image coding and decoding to perform quantization. For example, the coding and decoding schemes of the image coding apparatus 100 and the image decoding apparatus 200 are arbitrary as in the case of the fifth embodiment and need not be compliant with HEVC. Therefore, for example, specifications such as transform (inverse transform), coding (decoding), predicted image generation process, filtering process, and so on are arbitrary and are not limited to the above examples. Also, some or all of the processes thereof may be omitted. It should be noted that the specifications of the quantization (inverse quantization) other than scaling lists are arbitrary as long as scaling lists are used.

<Fields of Application of the Present Technology>

Systems, apparatuses, processing sections, and so on to which the present technology is applied can find use in arbitrary fields such as traffic, medicine, crime prevention, agriculture, stock raising, mining, cosmetic, factories, home electric appliances, meteorology, and nature monitoring.

For example, the present technology is applicable to systems and devices for transmitting images for appreciation. Also, for example, the present technology is applicable to systems and devices for traffic use. Further, for example, the present technology is also applicable to systems and devices for security use. Also, for example, the present technology is applicable to systems and devices for sports use. Further, for example, the present technology is also applicable to systems and devices for agricultural use. Also, for example, the present technology is applicable to systems and devices for stock raising use. Further, the present technology is applicable, for example, to systems and devices for monitoring conditions of nature such as volcanoes, forests, and oceans. Also, the present technology is applicable to meteorological observation systems and meteorological observation apparatuses for observing climate, temperature, humidity, wind velocity, hours of sunlight, and so on. Further, the present technology is applicable to systems, devices, and others for observing habits of wildlife such as birds, fishes, reptiles, amphibians, mammals, insects, and plants.

<Application to a Multi-View Image Coding System>

The above series of processes are applicable to a multi-view image coding system for coding a multi-view image that includes images of a plurality of views. In that case, it is only necessary to apply the present technology to coding of each view.

<Application to a Hierarchical Image Coding System>

The above series of processes are applicable to a hierarchical image coding (scalable coding) system for coding a hierarchical image having a plurality of layers (a layered image) so as to offer a scalability function for a given parameter. In that case, it is only necessary to apply the present technology to coding of each hierarchy (layer).

<Computer>

The series of processes described above may be performed by hardware or software. In the case where the series of processes described above are performed by software, the program included in the software is installed to a computer. Here, the computer includes a computer incorporated in dedicated hardware, a general-purpose personal computer capable of performing various functions as a result of installation of various programs, and so on.

FIG. 42 is a block diagram illustrating a hardware configuration example of a computer that performs the series of processes described above using a program.

In a computer 800 illustrated in FIG. 42, a CPU (Central Processing Unit) 801, a ROM (Read Only Memory) 802, and a RAM (Random Access Memory) 803 are connected to each other by a bus 804.

An I/O (Input/Output) interface 810 is also connected to the bus 804. An input section 811, an output section 812, a storage section 813, a communication section 814, and a drive 815 are connected to the I/O interface 810.

The input section 811 includes, for example, a keyboard, a mouse, a microphone, a touch panel, input terminals, and so on. The output section 812 includes, for example, a display, a speaker, output terminals, and so on. The storage section 813 includes, for example, a hard disk, a RAM disk, a non-volatile memory, and so on. The communication section 814 includes, for example, a network interface and so on. The drive 815 drives a removable medium 821 such as magnetic disk, optical disc, magneto-optical disk, or semiconductor memory.

In the computer configured as described above, the CPU 801 performs the above series of processes, for example, by loading the program stored in the storage section 813 into the RAM 803 via the I/O interface 810 and bus 804 for execution. The RAM 803 also stores, as appropriate, data required for the CPU 801 to perform various processes.

The program executed by the computer (CPU 801) can be, for example, used recorded on the removable medium 821 as a package medium or other media. In that case, the program can be installed to the storage section 813 via the I/O interface 810 by mounting the removable medium 821 into the drive 815.

Also, the program can be provided via a wired or wireless transmission medium such as local area network, the internet, or digital satellite broadcasting. In that case, the program can be received by the communication section 814 and installed to the storage section 813.

In addition to the above, the program can be installed in advance to the ROM 802 or the storage section 813.

<Application of the Present Technology>

The image coding apparatus 100 according to the above embodiments can be applied to a variety of pieces of electronic equipment such as transmitters and receivers for wired broadcasting including satellite broadcasting and cable TV, for delivery on the internet, and for delivery to terminals using cellular communication, recording apparatuses for recording images on media including optical disc, magnetic disk, flash memory, and so on, and reproduction apparatuses for reproducing images from these storage media.

First Application Example: TV Receiver

Figure 43:
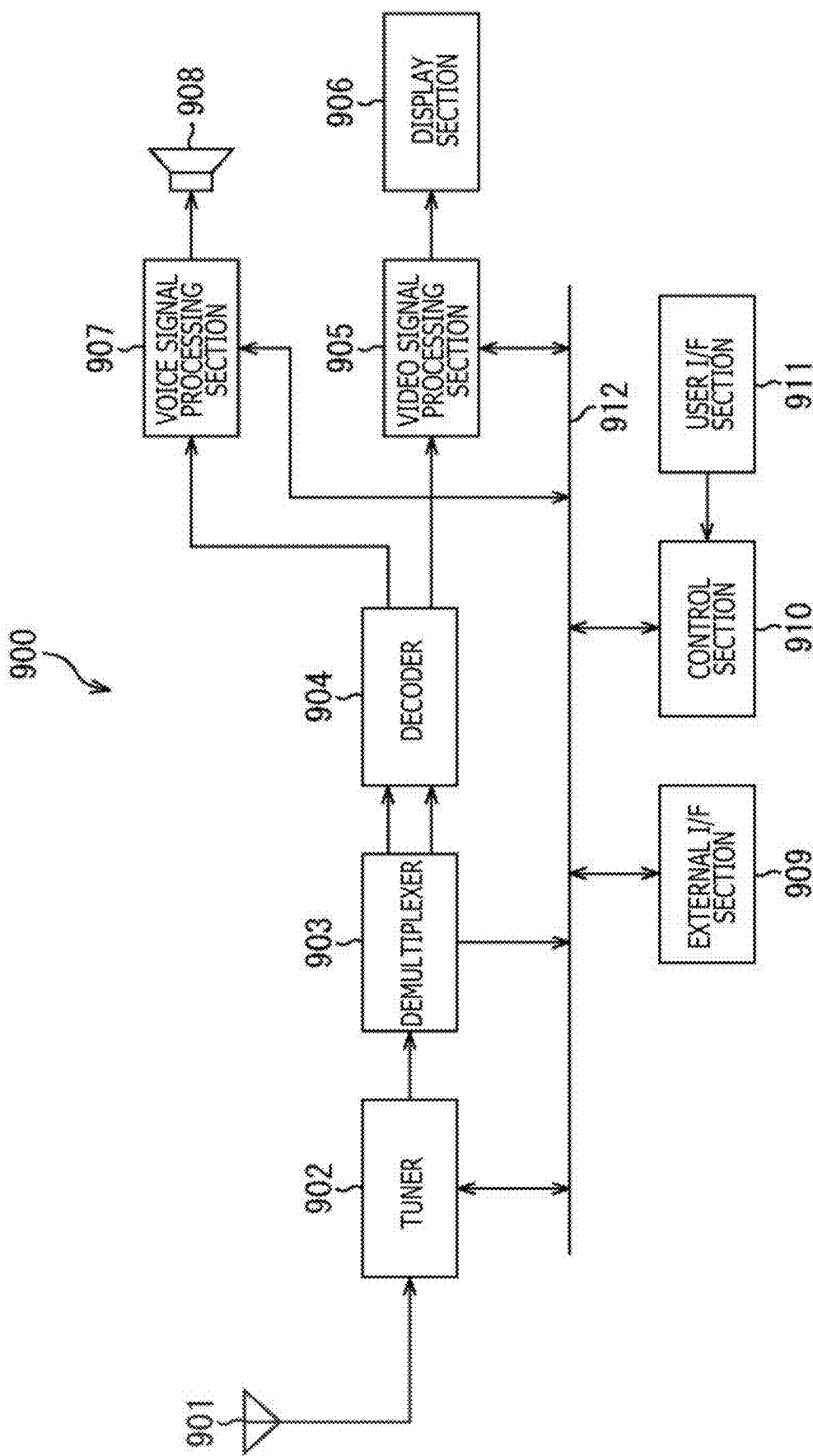
FIG. 43 is a block diagram illustrating an example of a schematic configuration of a television apparatus.

FIG. 43 illustrates an example of a schematic configuration of a television apparatus to which the above embodiments are applied. A television apparatus 900 includes an antenna 901, a tuner 902, a demultiplexer 903, a decoder 904, a video signal processing section 905, a display section 906, an audio signal processing section 907, a speaker 908, an external interface (I/F) section 909, a control section 910, a user interface (I/F) section 911, and a bus 912.

The tuner 902 extracts a signal of a desired channel from a broadcast signal received via the antenna 901 and demodulates the extracted signal. Then, the tuner 902 outputs a coded bit stream, acquired by the demodulation, to the demultiplexer 903. That is, the tuner 902 has a role as a transmission section for receiving a coded stream with coded images in the television apparatus 900.

The demultiplexer 903 separates video and audio streams of the program to be viewed from the coded bit stream and outputs each of the separated streams to the decoder 904. Also, the demultiplexer 903 extracts auxiliary data such as EPG (Electronic Program Guide) from the coded bit stream and supplies the extracted data to the control section 910. It should be noted that in the case where the coded bit stream is scrambled, the demultiplexer 903 may descramble the coded bit stream.

The decoder 904 decodes the video and audio streams input from the demultiplexer 903. Then, the decoder 904 outputs video data generated by the decoding process to the video signal processing section 905. Also, the decoder 904 outputs audio data generated by the decoding process to the audio signal processing section 907.

The video signal processing section 905 reproduces the video data input from the decoder 904 and causes the display section 906 to display the video. Also, the video signal processing section 905 may cause the display section 906 to display an application screen supplied via a network. Also, the video signal processing section 905 may perform an additional process such as noise removal on the video data in accordance with settings. Further, the video signal processing section 905 may, for example, generate a GUI (Graphical User Interface) image such as menu, buttons, or cursor and superimpose the generated image on the output image.

The display section 906 is driven by a drive signal supplied from the video signal processing section 905 to display video or an image on a video screen of a display device (e.g., liquid crystal display, plasma display, or OLED (Organic ElectroLuminescence Display)).

The audio signal processing section 907 performs reproduction processes such as D/A conversion and amplification on the audio data input from the decoder 904 and causes the speaker 908 to output audio. Also, the audio signal processing section 907 may perform an additional process such as noise removal on the audio data.

The external interface section 909 is an interface for connecting the television apparatus 900 and external equipment or a network. For example, a video stream or an audio stream received via the external interface section 909 may be decoded by the decoder 904. That is, the external interface section 909 also has a role as a transmission section for receiving a coded stream with coded images in the television apparatus 900.

The control section 910 has a processor such as CPU and memories such as RAM and ROM. The memories store programs executed by the CPU, program data, EPG data, and data acquired via networks. A program stored in the memory is, for example, loaded into the CPU for execution when the television apparatus 900 is activated. The CPU controls, for example, the operation of the television apparatus 900 by executing the program in accordance with an operation signal input from the user interface section 911.

The user interface section 911 is connected to the control section 910. The user interface section 911 has, for example, buttons and switches for users to operate the television apparatus 900, a remote control signal reception section, and so on. The user interface section 911 generates an operation signal by detecting user operation via these elements and outputs the generated operation signal to the control section 910.

The bus 912 connects the tuner 902, the demultiplexer 903, the decoder 904, the video signal processing section 905, the audio signal processing section 907, the external interface section 909, and the control section 910 to each other.

In the television apparatus 900 configured in this manner, the decoder 904 may have the function of the image decoding apparatus 200 described above. That is, the decoder 904 may decode coded data by the method described in each of the above embodiments. As a result, the television apparatus 900 provides a similar advantageous effect regarding received coded bit stream to that described above in each of the embodiments.

Also, in the television apparatus 900 configured in this manner, the video signal processing section 905 may be, for example, able to code image data supplied from the decoder 904 and output acquired coded data outside of the television apparatus 900 via the external interface section 909. Then, the video signal processing section 905 may have the function of the image coding apparatus 100 or the image coding apparatus 400. That is, the video signal processing section 905 may code image data supplied from the decoder 904 by the method described in each of the above embodiments. This provides the television apparatus 900 a similar advantageous effect regarding coded data to be output to that described above in each of the embodiments.

Second Application Example: Mobile Phone

Figure 44:
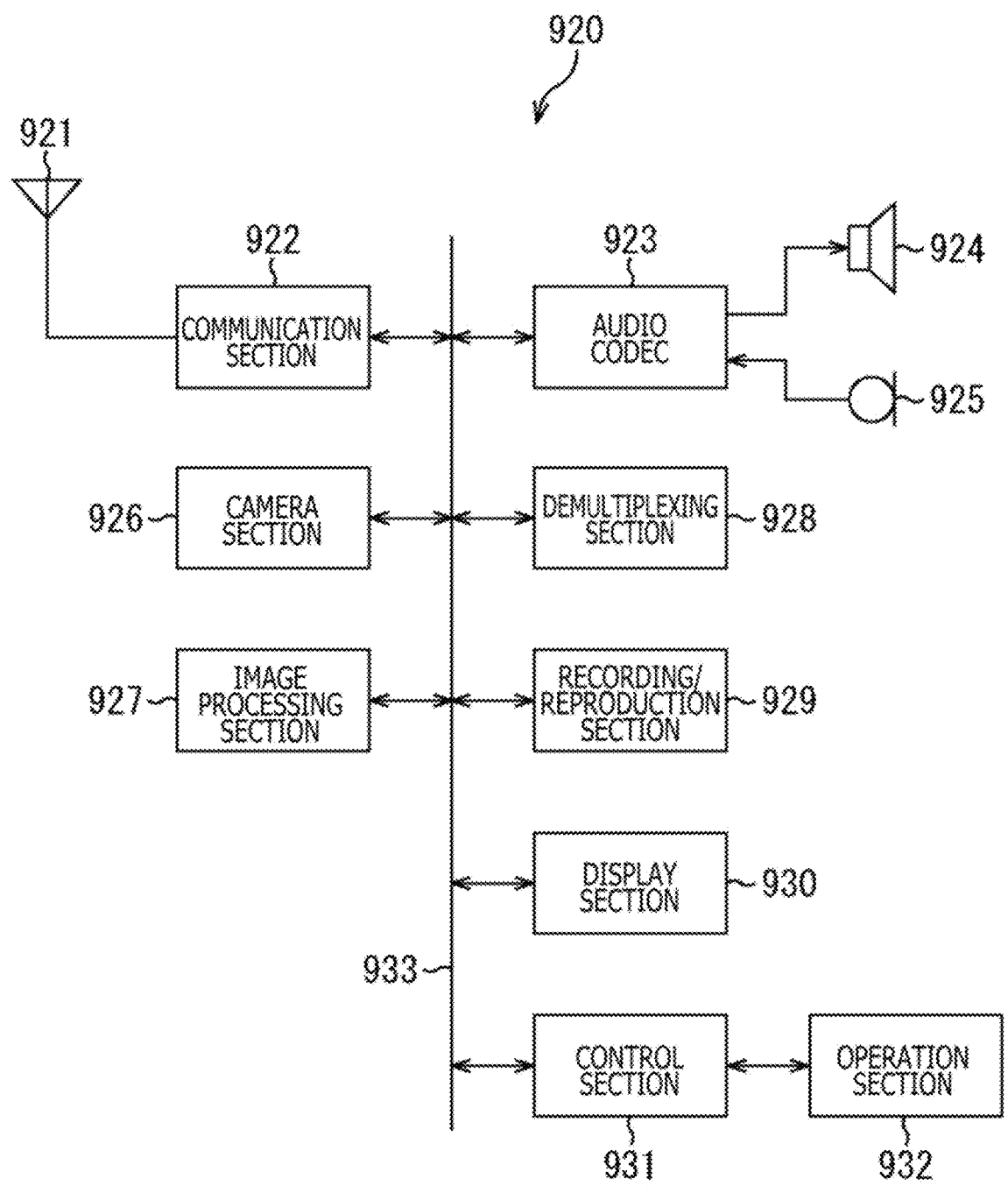
FIG. 44 is a block diagram illustrating an example of a schematic configuration of a mobile phone.

FIG. 44 illustrates an example of a schematic configuration of a mobile phone to which the above embodiment is applied. A mobile phone 920 includes an antenna 921, a communication section 922, an audio codec 923, a speaker 924, a microphone 925, a camera section 926, an image processing section 927, a demultiplexing section 928, a recording/reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 connects the communication section 922, the audio codec 923, the camera section 926, the image processing section 927, the demultiplexing section 928, the recording/reproduction section 929, the display section 930, and the control section 931 to each other.

The mobile phone 920 performs operations such as sending and receiving audio signals, sending and receiving emails or image data, shooting images, and recording data in a variety of modes including audio call mode, data communication mode, shooting mode, and TV telephone mode.

In audio call mode, an analog audio signal generated by the microphone 925 is supplied to the audio codec 923. The audio codec 923 converts the analog audio signal into audio data and compresses the converted audio data through A/D conversion. Then, the audio codec 923 outputs the compressed audio data to the communication section 922. The communication section 922 generates transmission signal by coding and modulating the audio data. Then, the communication section 922 sends the generated transmission signal to a base station (not illustrated) via the antenna 921. Also, the communication section 922 acquires a reception signal by amplifying a wireless signal received via the antenna 921 and converting the frequency of the signal. Then, the communication section 922 generates audio data by demodulating and decoding the reception signal and outputs the generated audio data to the audio codec 923. The audio codec 923 generates an analog audio signal by decompressing and performing D/A conversion on the audio data. Then, the audio codec 923 supplies the generated audio signal to the speaker 924 to output audio.

Also, in data communication mode, for example, the control section 931 generates text data included in an email in accordance with user operation via the operation section 932. Also, the control section 931 causes the display section 930 to display text. Also, the control section 931 generates email data in response to a user transmission request via the operation section 932 and outputs the generated email data to the communication section 922. The communication section 922 generates transmission signal by coding and modulating the email data. Then, the communication section 922 sends the generated transmission signal to a base station (not illustrated) via the antenna 921. Also, the communication section 922 acquires a reception signal by amplifying a wireless signal received via the antenna 921 and converting the frequency of the signal. Then, the communication section 922 recovers the email data by demodulating and decoding the reception signal and outputs the email data to the control section 931. The control section 931 causes the display section 930 to display details of the email and supplies the email data to the recording/reproduction section 929 so that the data is written to the storage medium thereof.

The recording/reproduction section 929 has a readable/writable arbitrary storage medium. For example, the storage medium may be a built-in storage medium such as RAM or flash memory or an externally inserted storage medium such as hard disk, magnetic disk, magneto-optical disk, optical disc, USB (Universal Serial Bus) memory, or memory card.

Also, in shooting mode, for example, the camera section 926 generates image data by imaging a subject and outputs the generated image data to the image processing section 927. The image processing section 927 codes the image data input from the camera section 926 and supplies a coded stream to the recording/reproduction section 929 so that the coded stream is written to the storage medium thereof.

Further, in image display mode, the recording/reproduction section 929 reads the coded stream recorded on the storage medium and outputs the coded stream to the image processing section 927. The image processing section 927 decodes the coded stream input from the recording/reproduction section 929 and supplies the image data to the display section 930 so that the image is displayed.

Also, in TV telephone mode, for example, the demultiplexing section 928 multiplexes the video stream coded by the image processing section 927 and the audio stream input from the audio codec 923 and outputs the multiplexed stream to the communication section 922. The communication section 922 generates a transmission signal by coding and modulating the stream. Then, the communication section 922 sends the generated transmission signal to a base station (not illustrated) via the antenna 921. Also, the communication section 922 acquires a reception signal by amplifying a wireless signal received via the antenna 921 and converting the frequency of the signal. These transmission and reception signals include coded bit streams. Then, the communication section 922 recovers the stream by demodulating and decoding the reception signal and outputs the recovered stream to the demultiplexing section 928. The demultiplexing section 928 separates video and audio streams from the input stream and outputs the video stream to the image processing section 927 and the audio stream to the audio codec 923. The image processing section 927 generates video data by recovering the video stream. The video data is supplied to the display section 930 so that a series of images are displayed by the display section 930. The audio codec 923 generates an analog audio signal by decompressing and performing D/A conversion on the audio stream. Then, the audio codec 923 supplies the generated audio signal to the speaker 924 to output audio.

In the mobile phone 920 configured in this manner, for example, the image processing section 927 may have the functions of at least one or more of the image coding apparatus 100, the image decoding apparatus 200, and the image coding apparatus 400 described above. That is, the image processing section 927 may code and decode image data by the methods described in each of the above embodiments. As a result, the mobile phone 920 provides a similar advantageous effect to that in each of the above embodiments.

Third Application Example:
Recording/Reproduction Apparatus

Figure 45:
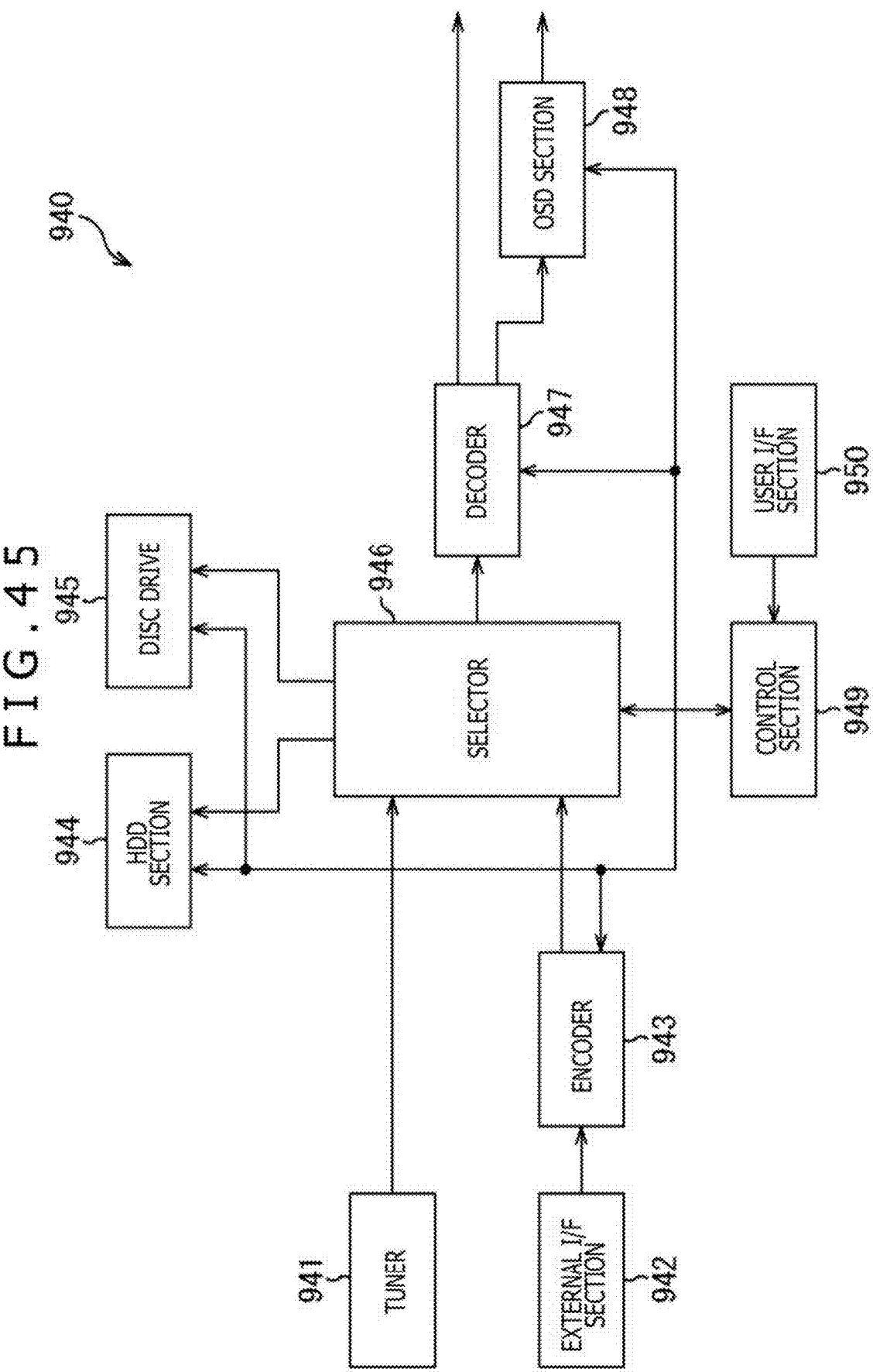
FIG. 45 is a block diagram illustrating an example of a schematic configuration of a recording/reproduction apparatus.

FIG. 45 illustrates an example of a schematic configuration of a recording/reproduction apparatus to which the above embodiments are applied. A recording/reproduction apparatus 940, for example, codes audio data and video data of a received broadcast program and records the coded data to a recording medium. Also, the recording/reproduction apparatus 940 may, for example, code audio data and video data acquired from other apparatus and record the coded data to a recording medium. Also, the recording/reproduction apparatus 940 may, for example, reproduce data recorded on a recording medium on a monitor and a speaker in response to a user instruction. At this time, the recording/reproduction apparatus 940 decodes the audio data and the video data.

The recording/reproduction apparatus 940 includes a tuner 941, an external interface (I/F) section 942, an encoder 943, a HDD (Hard Disk Drive) section 944, a disk drive 945, a selector 946, a decoder 947, an OSD (On-Screen Display) 948, a control section 949, and a user interface (I/F) section 950.

The tuner 941 extracts a signal of a desired channel from a broadcast signal received via an antenna (not illustrated) and demodulates the extracted signal. Then, the tuner 941 outputs a coded bit stream, acquired by the demodulation, to the selector 946. That is, the tuner 941 has a role as a transmission section in the recording/reproduction apparatus 940.

The external interface section 942 is an interface for connecting the recording/reproduction apparatus 940 and external equipment or a network. The external interface section 942 may be, for example, the IEEE (Institute of Electrical and Electronic Engineers) 1394 interface, a network interface, a USB interface, or a flash memory interface. For example, video data and audio data received via the external interface section 942 is input to the encoder 943. That is, the external interface section 942 has a role as a transmission section in the recording/reproduction apparatus 940.

The encoder 943 codes video data and audio data input from the external interface section 942 in the case where the video data and audio data is not coded. Then, the encoder 943 outputs the coded bit stream to the selector 946.

The HDD section 944 records coded bit streams having compressed video, audio, and other content data, a variety of programs, and other data to a hard disk. Also, the HDD section 944 reads these pieces of data from the hard disk during reproduction of video and audio.

The disk drive 945 records data to and reads data from an inserted recording medium. The recording medium inserted into the disk drive 945 may be, for example, a DVD (Digital Versatile Disc) disc (e.g., DVD-Video, DVD-RAM (DVD-Random Access Memory), DVD-R (DVD-Recordable), DVD-RW (DVD-Rewritable), DVD+R (DVD+Recordable), DVD+RW (DVD+Rewritable)), a Blu-ray (registered trademark) disc, or other medium.

The selector 946 selects, during recording of video and audio, the coded bit stream input from the tuner 941 or the encoder 943 and outputs the selected coded bit stream to the HDD 944 or the disk drive 945. Also, the selector 946 outputs, during reproduction of video and audio, the coded bit stream input from the HDD 944 or the disk drive 945 to the decoder 947.

The decoder 947 generates video data and audio data by decoding the coded bit stream. Then, the decoder 947 outputs the generated video data to the OSD section 948. Also, the decoder 947 outputs the generated audio data to an external speaker.

The OSD section 948 reproduces video data input from the decoder 947 and displays the video. Also, the OSD section 948 may, for example, superimpose a GUI image such as menu, buttons, or cursor on the video to be displayed.

The control section 949 has a processor such as CPU and memories such as RAM and ROM. The memories store programs executed by the CPU, program data, and so on. A program stored in the memory is, for example, loaded into the CPU for execution when the recording/reproduction apparatus 940 is activated. The CPU controls, for example, the operation of the recording/reproduction apparatus 940 by executing the program in accordance with an operation signal input from the user interface section 950.

The user interface section 950 is connected to the control section 949. The user interface section 950 has, for example, buttons and switches for users to operate the recording/reproduction apparatus 940, a remote control signal reception section, and so on. The user interface section 950 generates an operation signal by detecting user operation via these elements and outputs the generated operation signal to the control section 949.

In the recording/reproduction apparatus 940 configured in this manner, for example, the encoder 943 may have the function of the image coding apparatus 100 or the image coding apparatus 400 described above. That is, the encoder 943 may code image data by the method described in each of the above embodiments. As a result, the recording/reproduction apparatus 940 provides a similar advantageous effect to that in each of the above embodiments.

Also, in the recording/reproduction apparatus 940 configured in this manner, for example, the decoder 947 may have the function of the image decoding apparatus 200 described above. That is, the decoder 947 may decode coded data by the method described in each of the above embodiments. As a result, the recording/reproduction apparatus 940 provides a similar advantageous effect that described above in each of the embodiments.

Fourth Application Example: Imaging Apparatus

Figure 46:
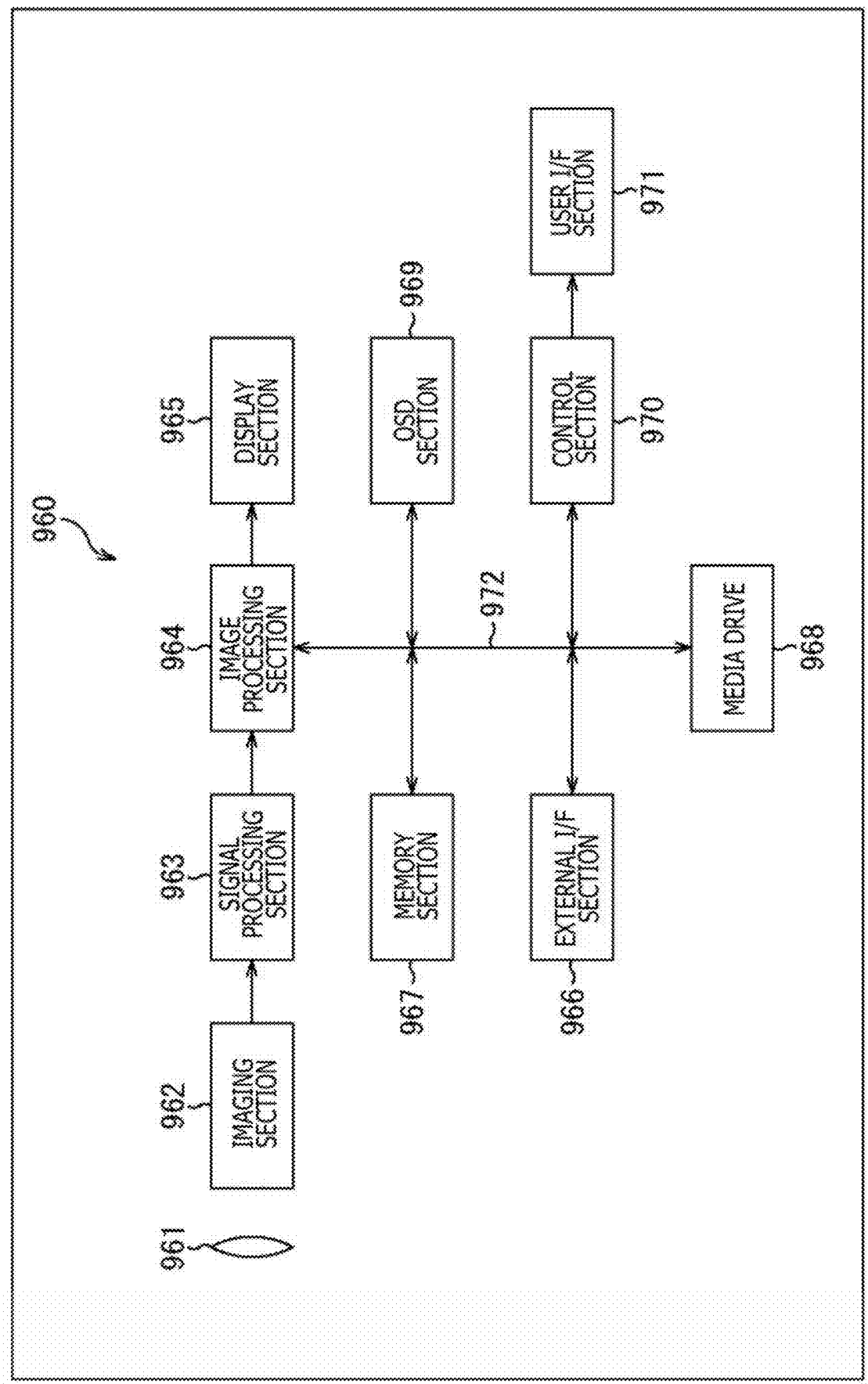
FIG. 46 is a block diagram illustrating an example of a schematic configuration of an imaging apparatus.

FIG. 46 illustrates an example of a schematic configuration of an imaging apparatus to which the above embodiments are applied. An imaging apparatus 960 generates an image by shooting a subject, codes the image data, and records the image data to a recording medium.

The imaging apparatus 960 includes an optical block 961, an imaging section 962, a signal processing section 963, an image processing section 964, a display section 965, an external interface (I/F) section 966, a memory section 967, a media drive 968, an OSD section 969, a control section 970, a user interface (I/F) section 971, and a bus 972.

The optical block 961 is connected to the imaging section 962. The imaging section 962 is connected to the signal processing section 963. The display section 965 is connected to the image processing section 964. The user interface section 971 is connected to the control section 970. The bus 972 connects the image processing section 964, the external interface section 966, the memory section 967, the media drive 968, the OSD section 969, and the control section 970 to each other.

The optical block 961 has a focus lens, an aperture mechanism, and so on. The optical block 961 forms an optical image of a subject on an imaging surface of the imaging section 962. The imaging section 962 has an image sensor such as CCD (Charge Coupled Device) or CMOS (Complementary Metal Oxide Semiconductor) and converts the optical image formed on the imaging surface into an image signal as an electric signal through photoelectric conversion. Then, the imaging section 962 outputs the image signal to the signal processing section 963.

The signal processing section 963 performs a variety of camera signal processing tasks such as knee correction, gamma correction, and color correction on the image signal input from the imaging section 962. The signal processing section 963 outputs the image data that has been subjected to camera signal processing to the image processing section 964.

The image processing section 964 generates coded data by coding the image data input from the signal processing section 963. Then, the image processing section 964 outputs the generated coded data to the external interface section 966 or the media drive 968. Also, the image processing section 964 generates image data by decoding coded data input from the external interface section 966 or the media drive 968. Then, the image processing section 964 outputs the generated image data to the display section 965. Also, the image processing section 964 may output the image data, input from the signal processing section 963, to the display section 965 and cause the display section 965 to display the image. Also, the image processing section 964 may superimpose display data, acquired from the OSD section 969, on the image output to the display section 965.

The OSD section 969 generates a GUI image such as menu, buttons, or cursor and outputs the generated image to the image processing section 964.

The external interface section 966 is configured, for example, as a USB input/output terminal. The external interface section 966 connects the imaging apparatus 960 to a printer during printing of an image. Also, a drive is connected to the external interface section 966 as necessary. For example, a removable medium such as magnetic disk or optical disc may be inserted into the drive so that the program read from the removable medium can be installed to the imaging apparatus 960. Further, the external interface section 966 may be configured as a network interface connected to a network such as LAN or the internet. That is, the external interface section 966 has a role as a transmission section in the imaging apparatus 960.

The recording medium inserted into the media drive 968 may be, for example, a readable/writable arbitrary removable medium such as magnetic disk, magneto-optical disk, optical disc, or semiconductor memory. Also, for example, a non-portable storage section such as built-in hard disk drive or SSD (Solid State Drive) may be configured by permanently inserting a recording medium in the media drive 968.

The control section 970 has a processor such as CPU and memories such as RAM and ROM. The memories store programs executed by the CPU, program data, EPG data, and data acquired via networks. A program stored in the memory is, for example, loaded into the CPU for execution when the imaging apparatus 960 is activated. The CPU controls, for example, the operation of the imaging apparatus 960 by executing the program in accordance with an operation signal input from the user interface section 971.

The user interface section 971 is connected to the control section 970. The user interface section 971 has, for example, buttons and switches for users to operate the imaging apparatus 960. The user interface section 971 generates an operation signal by detecting user operation via these elements and outputs the generated operation signal to the control section 970.

In the imaging apparatus 960 configured in this manner, for example, the image processing section 964 may have the functions of at least one or more of the image coding apparatus 100, the image decoding apparatus 200, and the image coding apparatus 400 described above. That is, the image processing section 964 may code and decode image data by the methods described in each of the above embodiments. As a result, the imaging apparatus 960 provides a similar advantageous effect to that in each of the above embodiments.

Fifth Application Example: Video Set

Figure 47:
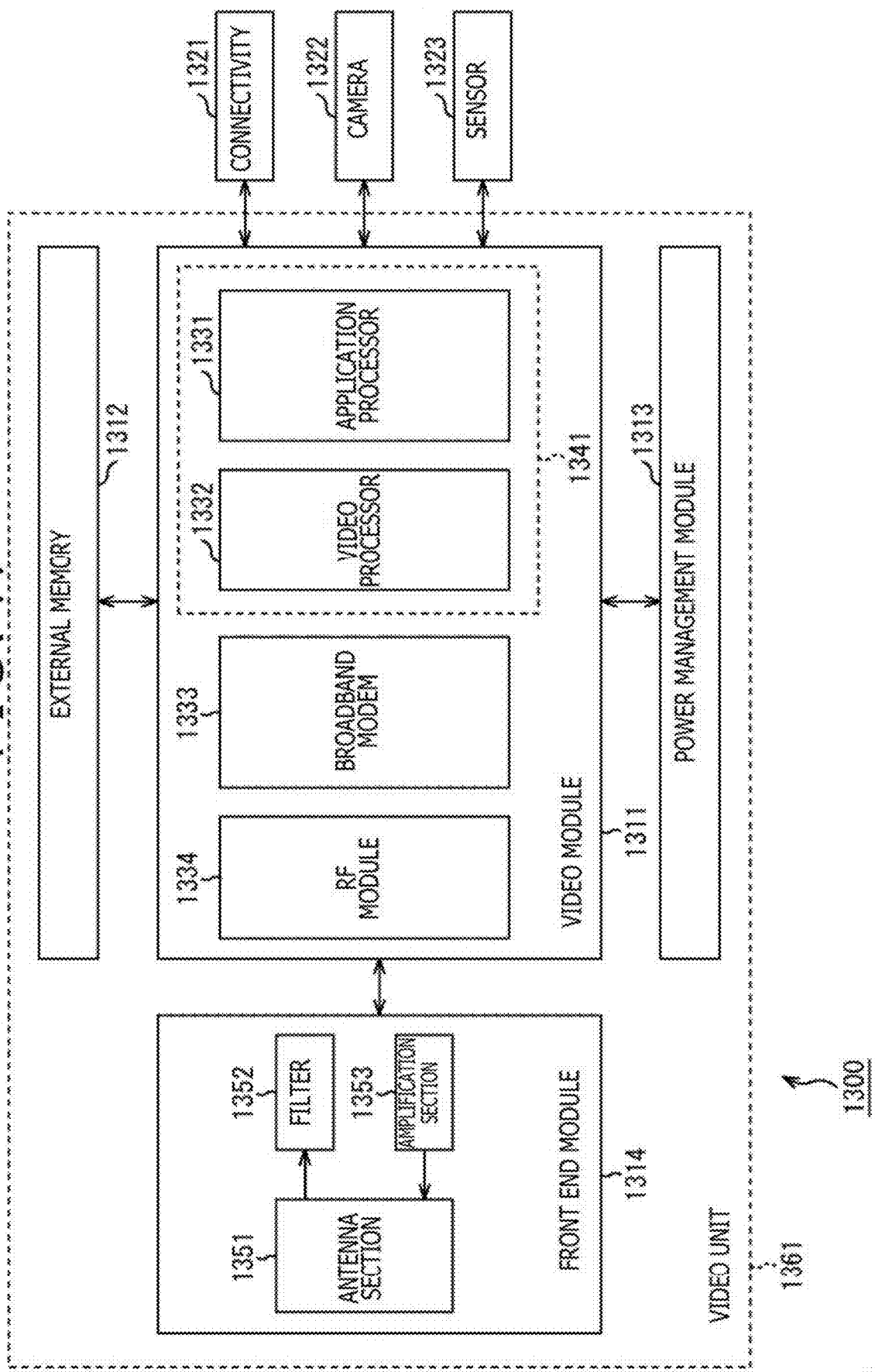
FIG. 47 is a block diagram illustrating an example of a schematic configuration of a video set.

Also, the present technology can be carried out as all kinds of configurations mounted to an arbitrary apparatus or an apparatus included in a system such as processor as a system LSI (Large Scale Integration), module using a plurality of processors, unit using a plurality of modules, and set further having other functions added to a set (i.e., partial configuration of an apparatus). FIG. 47 illustrates an example of a schematic configuration of a video set to which the present technology is applied.

Recent years have seen increasingly multifunctional electronic equipment, and in the case where a partial configuration thereof is carried out by sales or provision in their development and manufacture, it has become more common that electronic equipment is carried out not only as a configuration having a single function but also as a set having a plurality of functions by combining a plurality of configurations having related functions.

A video set 1300 illustrated in FIG. 47 has such a multifunctional configuration and is a combination of a device having a function related to image coding and decoding (either one or both thereof) and another device having other functions related to that function.

As illustrated in FIG. 47, the video set 1300 has a group of modules such as a video module 1311, an external memory 1312, a power management module 1313, and a front end module 1314 and devices having related functions such as a connectivity 1321, a camera 1322, and a sensor 1323.

A module integrates several mutually related functions partwise functions into a single part offering consolidated functions. Although its specific physical configuration is arbitrary, a module would possibly have a plurality of processors, each having a function, electronic circuit elements such as resistors and capacitors, and other devices arranged on a printed circuit board and combined into one piece. Another possibility would be to combine a module with other module, processor, and so on to offer a new module.

In the case of the example illustrated in FIG. 47, the video module 1311 is a combination of configurations having functions related to image processing and includes an application processor, a video processor, a broadband modem 1333, and an RF module 1334.

A processor is integration of configurations having given functions on a semiconductor chip through SoC (System On a Chip) and is, for example, referred to as a system LSI (Large Scale Integration) or other term. These configurations having given functions may be logic circuitry (hardware configurations) or a CPU, a ROM, a RAM, and so on and a program using them (software configurations), or a combination thereof. For example, the processor may have logic circuitry, a CPU, a ROM, a RAM, and so on, and some of the functions may be realized by the logic circuitry (hardware configurations), and other functions may be realized by the program executed by the CPU (software configurations).

An application processor 1331 illustrated in FIG. 47 is a processor for executing an application related to image processing. The application executed by the application processor 1331 can not only perform calculations but also control configurations inside and outside a video module 1311 such as a video processor 1332 as needed for implementing the given functions.

The video processor 1332 is a processor having functions related to image coding and decoding (either one or both thereof).

A broadband modem 1333 converts data (digital signal), sent through wired or wireless wide band communication (or both thereof) that takes place via a wide band line such as the internet or public telephone network, into an analog signal by digital modulation and converts an analog signal, received through the wide band communication, into data (digital signal) through demodulation. The broadband modem 1333 processes, for example, arbitrary information such as image data processed by the video processor 1332, streams resulting from coding of image data, application programs, and setting data.

An RF module 1334 is a module for converting in frequency, modulating and demodulating, amplifying, filtering, or performing other processes on an RF (Radio Frequency) signal sent and received via an antenna. For example, the RF module 1334 generates an RF signal by converting in frequency the baseband signal generated by the broadband modem 1333. Also, for example, the RF module 1334 generates a baseband signal by converting in frequency the RF signal received via the front end module 1314.

It should be noted that the application processor 1331 and the video processor 1332 may be combined into one piece as depicted by a dotted line 1341 in FIG. 47.

An external memory 1312 is a module provided outside the video module 1311 and having a storage device used by the video module 1311. The storage device of this external memory 1312 may be realized by any physical configuration. However, because the storage device is generally often used for storing large volume data such as frame-by-frame image data, it is preferable that the storage device be realized by a comparatively inexpensive and large-volume semiconductor memory such as DRAM (Dynamic Random Access Memory).

A power management module 1313 manages and controls supply of power to the video module 1311 (each configuration in the video module 1311).

The front end module 1314 is a module for providing a front end function (transmitting/receiving end circuit on the antenna side) to the RF module 1334. As illustrated in FIG. 47, the front end module 1314 has, for example, an antenna section 1351, a filter 1352, and an amplification section 1353.

The antenna section 1351 has an antenna for sending and receiving wireless signals and its surrounding configuration. The antenna section 1351 sends a signal, supplied from the amplification section 1353, as a wireless signal and supplies a received wireless signal to the filter 1352 as an electric signal (RF signal). The filter 1352 performs a filtering process and other process on the RF signal received via the antenna section 1351 and supplies the processed RF signal to the RF module 1334. The amplification section 1353 amplifies the RF signal, supplied from the RF module 1334, and supplies the amplified signal to the antenna section 1351.

A connectivity 1321 is a module having functions related to connection with external equipment. The physical configuration of the connectivity 1321 is arbitrary. For example, the connectivity 1321 has a configuration with a communication function other than the communication standard supported by the broadband modem 1333, external input/output terminals, and so on.

For example, the connectivity 1321 may include a module having a communication function compliant with a wireless communication standard such as Bluetooth (registered trademark), IEEE 802.11 (e.g., Wi-Fi (Wireless Fidelity, registered trademark)), NFC (Near Field Communication), or IrDA (InfraRed Data Association), an antenna for sending and receiving signals compliant with that standard, and so on. Also, for example, the connectivity 1321 may include a module having a communication function compliant with a wired communication standard such as USB (Universal Serial Bus) or HDMI (registered trademark) (High-Definition Multimedia Interface), a terminal compliant with that standard, and so on. Further, for example, the connectivity 1321 may include other data (signal) transmission function or other function such as analog input/output terminal.

It should be noted that the connectivity 1321 may include a device of a destination to which to transmit data (signal). For example, the connectivity 1321 may have a drive (includes not only a removable media drive but also a hard disk, an SSD (Solid State Drive), a NAS (Network Attached Storage), and so on) for reading data from and writing data to a recording medium such as magnetic disk, optical disc, magneto-optical disk, or semiconductor memory. Also, the connectivity 1321 may have image and audio output devices (e.g., monitor and speaker).

The camera 1322 is a module having a function to acquire image data of a subject by imaging the subject. The image data acquired by imaging by the camera 1322 is, for example, supplied to the video processor 1332 for coding.

The sensor 1323 is a module having, for example, an arbitrary sensor function such as audio sensor, ultrasonic sensor, optical sensor, illuminance sensor, infrared sensor, image sensor, rotational sensor, angular sensor, angular velocity sensor, velocity sensor, acceleration sensor, inclination sensor, magnetic identification sensor, impact sensor, or temperature sensor. Data detected by the sensor 1323 is supplied, for example, to the application processor 1331 for use by applications and so on.

The configurations described above as modules may be realized as processors, and conversely, the configurations described as processors may be realized as modules.

In the video set 1300 configured as described above, the present technology is applicable to the video processor 1332 as will be described later. Therefore, the video set 1300 can be carried out as a set to which the present technology is applied.

<Configuration Example of the Video Processor>

Figure 48:
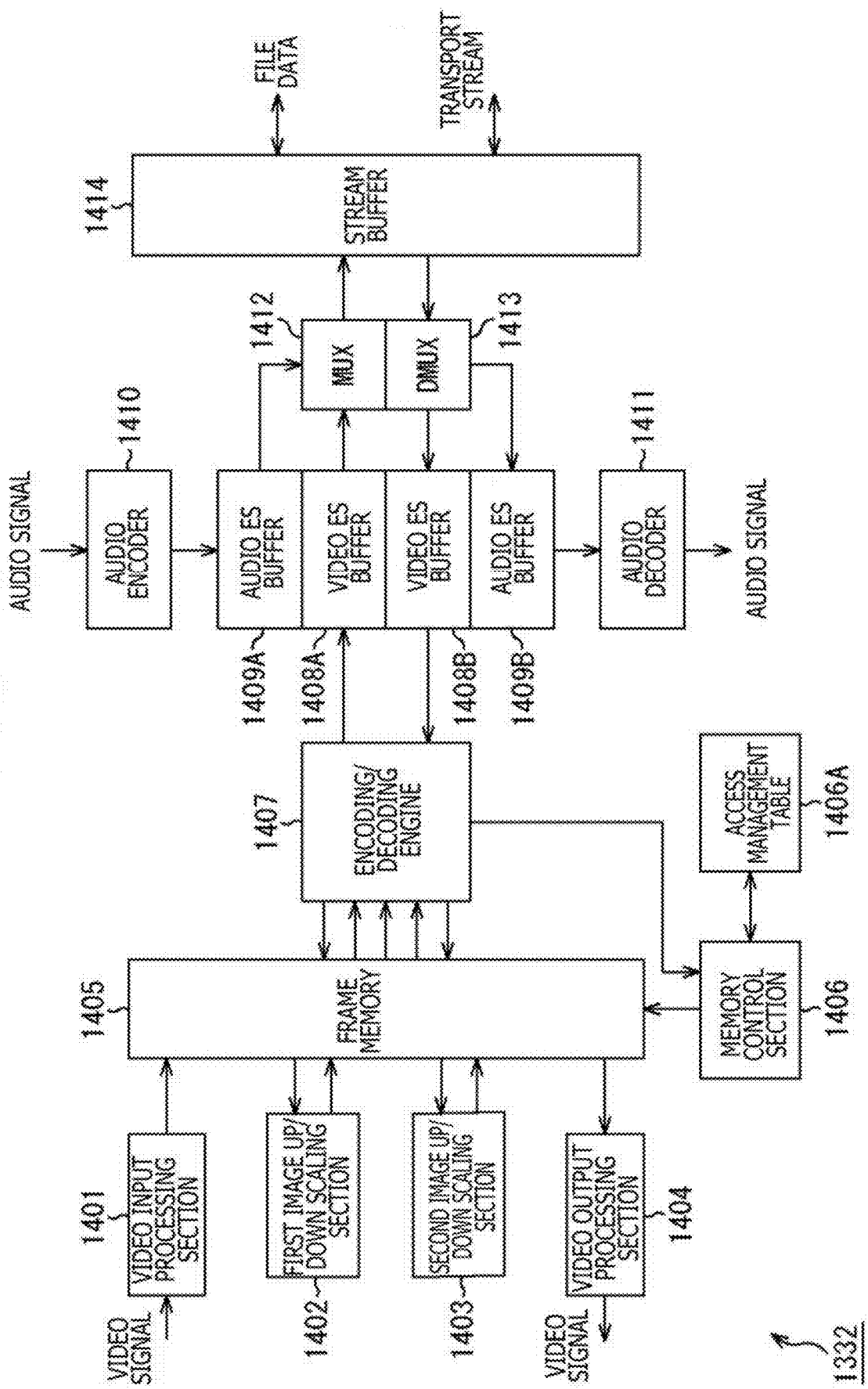
FIG. 48 is a block diagram illustrating an example of a schematic configuration of a video processor.

FIG. 48 illustrates an example of a schematic configuration of the video processor 1332 (FIG. 47) to which the present technology is applied.

In the case of the example illustrated in FIG. 48, the video processor 1332 has a function to code a video signal and an audio signal in response to input thereof by a given scheme and a function to decode coded video data and audio data and reproduce and output a video signal and an audio signal.

As illustrated in FIG. 48, the video processor 1332 has a video input processing section 1401, a first image up/down-scaling section 1402, a second image up/down-scaling section 1403, a video output processing section 1404, a frame memory 1405, and a memory control section 1406. The video processor 1332 also has an encoding/decoding engine 1407, video ES (Elementary Stream) buffers 1408A and 1408B, and audio ES buffers 1409A and 1409B. Further, the video processor 1332 has an audio encoder 1410, an audio decoder 1411, a multiplexing section (MUX (Multiplexer)) 1412, a demultiplexing section (DMUX (Demultiplexer)) 1413, and a stream buffer 1414.

The video input processing section 1401 acquires a video signal input, for example, from the connectivity 1321 (FIG. 47) or other section and converts the signal into digital image data. The first image up/down-scaling section 1402 performs processes such as converting the format of image data, scaling up or down an image, and so on. The second image up/down-scaling section 1403 performs up- and down-scaling processes on image data appropriate to the format of the destination to which the image data is output via the video output processing section 1404 and performs processes such as converting the format of image data, scaling up or down an image, and so on as does the first image up/down-scaling section 1402. The video output processing section 1404 performs processes such as converting the format of image data and converting image data into an analog signal and outputs the image data, for example, to the connectivity 1321 as a reproduced video signal.

The frame memory 1405 is an image data memory shared among the video input processing section 1401, the first image up/down-scaling section 1402, the second image up/down-scaling section 1403, the video output processing section 1404, and the encoding/decoding engine 1407. The frame memory 1405 is realized, for example, by a semiconductor memory such as DRAM.

The memory control section 1406 controls write and read access to the frame memory 1405 in accordance with an access schedule to the frame memory 1405 written in an access management table 1406A in response to a synchronizing signal from the encoding/decoding engine 1407. The access management table 1406A is updated by the memory control section 1406 in response to a process performed by the encoding/decoding engine 1407, the first image up/down-scaling section 1402, the second image up/down-scaling section 1403, or other section.

The encoding/decoding engine 1407 performs an encoding process on image data and a decoding process on a video stream, data including coded image data. For example, the encoding/decoding engine 1407 codes image data read from the frame memory 1405 and sequentially writes coded data to the video ES buffer 1408A as video streams. Also, for example, the encoding/decoding engine 1407 sequentially reads video streams from the video ES buffer 1408B, decodes the video streams, and sequentially writes the video streams to the frame memory 1405 as image data. The encoding/decoding engine 1407 uses the frame memory 1405 as a work region during these coding and decoding. Also, the encoding/decoding engine 1407 outputs a synchronizing signal to the memory control section 1406, for example, when macro block-by-macro block processing begins.

The video ES buffer 1408A buffers a video stream generated by the encoding/decoding engine 1407 and supplies the video stream to the multiplexing section (MUX) 1412. The video ES buffer 1408B buffers a video stream supplied from the demultiplexing section (DMUX) 1413 and supplies the video stream to the encoding/decoding engine 1407.

The audio ES buffer 1409A buffers an audio stream generated by the audio encoder 1410 and supplies the audio stream to the multiplexing section (MUX) 1412. The audio ES buffer 1409B buffers an audio stream supplied from the demultiplexing section (DMUX) 1413 and supplies the audio stream to the audio decoder 1411.

The audio encoder 1410 converts, for example, an audio signal input from the connectivity 1321 or other section into digital data and codes the digital data by a given scheme such as MPEG audio scheme or AC3 (AudioCode number 3) scheme. The audio encoder 1410 sequentially writes audio streams, data including coded audio signal, to the audio ES buffer 1409A. The audio decoder 1411 decodes audio streams supplied from the audio ES buffer 1409B, performs, for example, conversion into an analog signal or other process, and supplies the analog signal to the connectivity 1321 or other section as a reproduced audio signal.

The multiplexing section (MUX) 1412 multiplexes video streams and audio streams. This multiplexing method (i.e., format of the bit stream generated by multiplexing) is arbitrary. Also, during multiplexing, the multiplexing section (MUX) 1412 can add given header information and so on to the bit stream. That is, the multiplexing section (MUX) 1412 can convert the format of the stream by multiplexing. For example, the multiplexing section (MUX) 1412 converts the stream into a transport stream, a transfer format bit stream, by multiplexing a video stream and an audio stream. Also, for example, the multiplexing section (MUX) 1412 converts the streams into recording file format data (file data) by multiplexing a video stream and an audio stream.

The demultiplexing section (DMUX) 1413 demultiplexes the bit stream including multiplexed video stream and audio stream by the method corresponding to the multiplexing by the multiplexing section (MUX) 1412. That is, the demultiplexing section (DMUX) 1413 extracts the video stream and the audio streams (separates the video stream and the audio stream) from the bit stream read from the stream buffer 1414. That is, the demultiplexing section (DMUX) 1413 can convert the stream format by demultiplexing (perform inverse conversion of the conversion by the multiplexing section (MUX) 1412). For example, the demultiplexing section (DMUX) 1413 can, for example, acquire a transport stream, supplied from the connectivity 1321, the broadband modem 1333, or other section via the stream buffer 1414 and convert the transport stream into a video stream and an audio stream by demultiplexing. Also, for example, the demultiplexing section (DMUX) 1413 can, for example, file data read from a variety of recording media by the connectivity 1321 via the stream buffer 1414 and convert the file data into a video stream and an audio stream by demultiplexing.

The stream buffer 1414 buffers a bit stream. For example, the stream buffer 1414 buffers a transport stream supplied from the multiplexing section (MUX) 1412 and supplies the transport stream, for example, to the connectivity 1321, the broadband modem 1333, or other section at a given timing or on the basis of an external request or other request.

Also, for example, the stream buffer 1414 buffers file data supplied from the multiplexing section (MUX) 1412 and supplies the file data, for example, to the connectivity 1321 or other section at a given timing or on the basis of an external request or other request for recording on a variety of recording media.

Further, the stream buffer 1414 buffers, for example, a transport stream acquired via the connectivity 1321, the broadband modem 1333, or other section and supplies the transport stream to the demultiplexing section (DMUX) 1413 at a given timing or on the basis of an external request or other request.

Also, the stream buffer 1414 buffers file data read from a variety of recording media by the connectivity 1321 and supplies the file data to the demultiplexing section (DMUX) 1413 at a given timing or on the basis of an external request or other request.

A description will be given next of an example of operation of the video processor 1332 configured in this manner. For example, a video signal input to the video processor 1332 from the connectivity 1321 or other section is converted into digital image data in a given scheme such as 4:2:2Y/Cb/Cr scheme in the video input processing section 1401 and sequentially written to the frame memory 1405. This digital image data is read into the first image up/down-scaling section 1402 or the second image up/down-scaling section 1403, subjected to format conversion to a given scheme such as 4:2:0Y/Cb/Cr and an up- or down-scaling process, and then written again to the frame memory 1405. This image data is coded by the encoding/decoding engine 1407 and written to the video ES buffer 1408A as a video stream.

Also, an audio signal input to the video processor 1332 from the connectivity 1321 or other section is coded by the audio encoder 1410 and written to the audio ES buffer 1409A as audio streams.

The video stream in the video ES buffer 1408A and the audio stream in the audio ES buffer 1409A are read into the multiplexing section (MUX) 1412 and multiplexed, converting these streams into a transport stream, file data, or other data. The transport stream generated by the multiplexing section (MUX) 1412 is buffered by the stream buffer 1414 first and then output to an external network, for example, via the connectivity 1321, the broadband modem 1333, or other section. Also, the file data generated by the multiplexing section (MUX) 1412 is buffered by the stream buffer 1414 first and then output to the connectivity 1321 or other section for recording on a variety of recording media.

Also, a transport stream input to the video processor 1332 from an external network via the connectivity 1321, the broadband modem 1333, or other section is buffered by the stream buffer 1414 first and then demultiplexed by the demultiplexing section (DMUX) 1413. Also, for example, file data read from a variety of recording media by the connectivity 1321 or other section and input to the video processor 1332 is buffered by the stream buffer 1414 first and then demultiplexed by the demultiplexing section (DMUX) 1413. That is, a transport stream or file data input to the video processor 1332 is separated into a video stream and an audio stream by the demultiplexing section (DMUX) 1413.

The audio stream is supplied to the audio decoder 1411 via the audio ES buffer 1409B where an audio signal is reproduced by decoding the audio stream. Also, the video stream is written to the video ES buffer 1408B first and then sequentially read, decoded, and written to the frame memory 1405 by the encoding/decoding engine 1407. The decoded image data is subjected to an up- or down-scaling process by the second image up/down-scaling section 1403 and written to the frame memory 1405. Then, the decoded image data is read into the video output processing section 1404 where a video signal is reproduced and output by converting the format of the data into a given scheme such as the 4:2:2Y/Cb/Cr scheme and further converting the data into an analog signal.

In the case where the present technology is applied to the video processor 1332 configured in this manner, it is only necessary to apply the present technology according to each of the above embodiments to the encoding/decoding engine 1407. That is, for example, the encoding/decoding engine 1407 may have the functions of at least one or more of the image coding apparatus 100, the image decoding apparatus 200, and the image coding apparatus 400 described above. As a result, the video processor 1332 provides a similar advantageous effect to that in each of the above embodiments.

It should be noted that, in the encoding/decoding engine 1407, the present technology (i.e., functions of the image coding apparatus 100 and the image coding apparatus 400) may be realized by hardware such as logic circuitry, software such as embedded programs, or both thereof.

<Other Configuration Example of the Video Processor>

Figure 49:
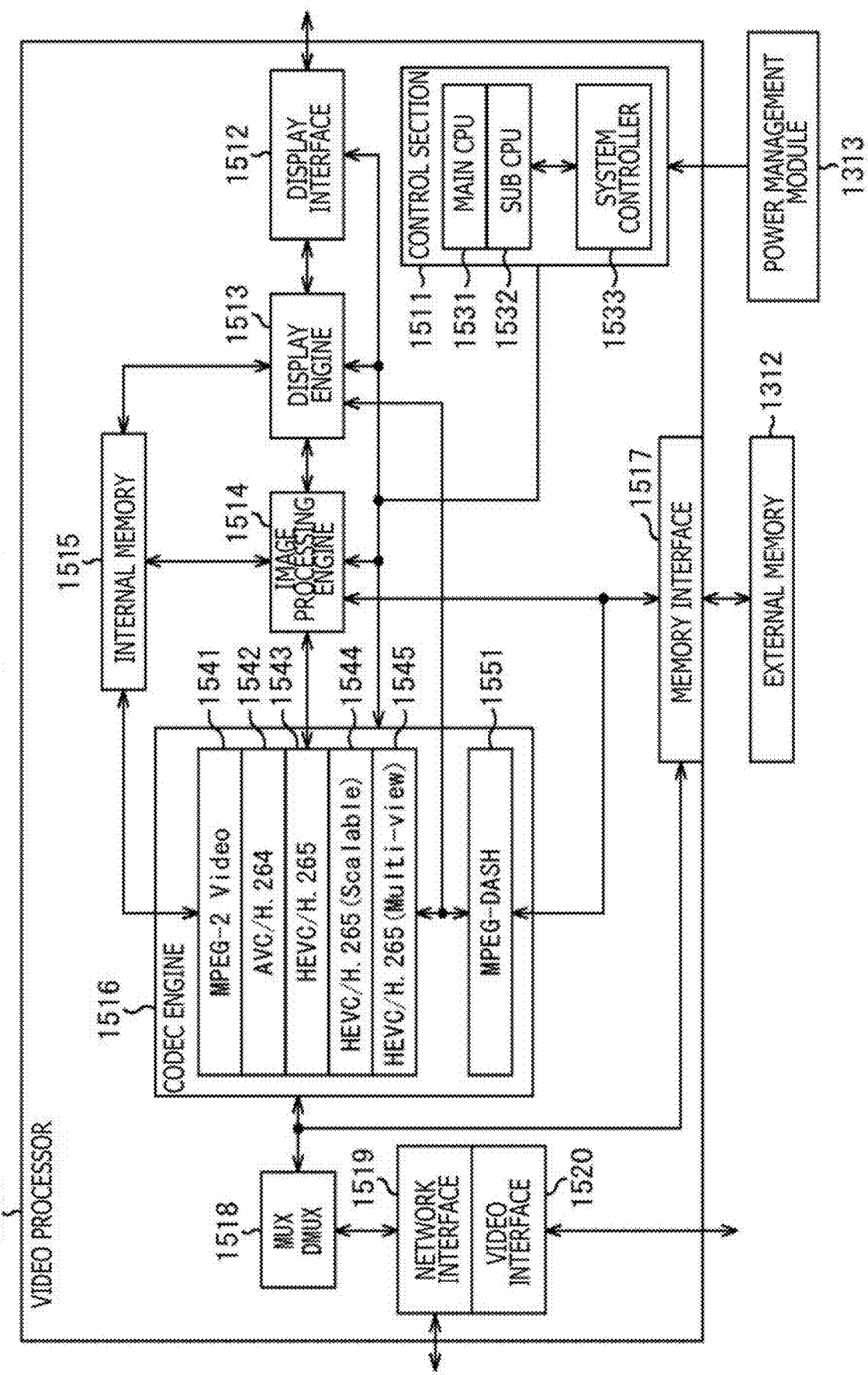
FIG. 49 is a block diagram illustrating another example of a schematic configuration of a video processor.

FIG. 49 illustrates another example of a schematic configuration of the video processor 1332 to which the present technology is applied. In the case of the example illustrated in FIG. 49, the video processor 1332 has a function to code and decode video data by a given scheme.

More specifically, as illustrated in FIG. 49, the video processor 1332 has a control section 1511, a display interface 1512, a display engine 1513, an image processing engine 1514, an internal memory 1515. The video processor 1332 also has a codec engine 1516, a memory interface 1517, a multiplexing/demultiplexing section (MUX DMUX) 1518, a network interface 1519, and a video interface 1520.

The control section 1511 controls the operation of each of the processing sections of the video processor 1332 such as the display interface 1512, the display engine 1513, the image processing engine 1514, and the codec engine 1516.

As illustrated in FIG. 49, the control section 1511 has, for example, a main CPU 1531, a sub-CPU 1532, and a system controller 1533. The main CPU 1531 executes a program for controlling the operation of each of the processing sections of the video processor 1332 and so on. The main CPU 1531 generates a control signal in accordance with the program and so on and supplies the control signal to each of the processing sections (i.e., controls the operation of each of the processing sections). The sub-CPU 1532 plays an assisting role for the main CPU 1531. For example, the sub-CPU 1532 executes child processes, sub-routines, and so on of the program and so on executed by the main CPU 1531. The system controller 1533 controls the operation of the main CPU 1531 and the sub-CPU 1532 by specifying programs to be executed by the main CPU 1531 and the sub-CPU 1532 or performing other tasks.

The display interface 1512 outputs image data, for example, to the connectivity 1321 and so on under control of the control section 1511. For example, the display interface 1512 converts image data, digital data, into an analog signal and outputs the analog signal as a reproduced video signal to a monitor apparatus of the connectivity 1321 or other section or outputs digital image data to the monitor apparatus or other apparatus in an 'as-is' manner without converting it.

The display engine 1513 performs various conversion processes on the image data under control of the control section 1511 such as format conversion, size conversion, and color gamut conversion to ensure that the image data meets hardware specifications of the monitor apparatus or other apparatus for displaying the image.

The image processing engine 1514 performs given image processing on the image data under control of the control section 1511 such as filtering process for improving the image quality.

The internal memory 1515 is a memory provided inside the video processor 1332 and is shared among the display engine 1513, the image processing engine 1514, and the codec engine 1516. The internal memory 1515 is used for data exchange that takes place between the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as necessary (e.g., in response to a request). This internal memory 1515 may be realized by any storage device. However, because the internal memory is generally often used for storing small volume data such as block-by-block image data, parameters, and so on, it is preferable that the internal memory be realized by a semiconductor memory such as SRAM (Static Random Access Memory) that has a comparatively small volume (as compared, for example, to the external memory 1312) but offers a quick response.

The codec engine 1516 performs processes related to coding and decoding of image data. The coding and decoding scheme supported by the codec engine 1516 are arbitrary, and the codec engine 1516 may support only one or a plurality of schemes. For example, the codec engine 1516 may have codec functions of a plurality of coding and decoding schemes so that image data is coded or coded data is decoded by one selected thereamong.

In the example illustrated in FIG. 49, the codec engine 1516 has, for example, MPEG-2 Video 1541, AVC/H.2641542, HEVC/H.2651543, HEVC/H.265 (Scalable) 1544, HEVC/H.265 (Multi-view) 1545, and MPEG-DASH 1551 as functional blocks for processing related to codec.

MPEG-2 Video 1541 is a functional block for coding and decoding image data by the MPEG-2 scheme. AVC/H.2641542 is a functional block for coding and decoding image data by the AVC scheme. HEVC/H.2651543 is a functional block for coding and decoding image data by the HEVC scheme. HEVC/H.265 (Scalable) 1544 is a functional block for scalably coding and decoding image data by the HEVC scheme. HEVC/H.265 (Multi-view) 1545 is a functional block for multi-view-coding and -decoding image data by the HEVC scheme.

MPEG-DASH 1551 is a functional block for sending and receiving image data by the MPEG-DASH (MPEG-Dynamic Adaptive Streaming over HTTP) scheme. MPEG-DASH is a technology for streaming video using HTTP (HyperText Transfer Protocol) and selects, on a segment-by-segment basis, appropriate coded data from among a plurality of pieces of coded data made available in advance and having different resolutions and so on and transporting selected coded data as one of its features. MPEG-DASH 1551 handles generation of streams compliant with the standard, controls the transport of the streams, and other tasks and employs, for image data coding and decoding, the above MPEG-2 Video 1541 to HEVC/H.265 (Multi-view) 1545.

The memory interface 1517 is an interface for the external memory 1312. Data supplied from the image processing engine 1514 and the codec engine 1516 is supplied to the external memory 1312 via the memory interface 1517. Also, data read from the external memory 1312 is supplied to the video processor 1332 (the image processing engine 1514 or the codec engine 1516) via the memory interface 1517.

The multiplexing/demultiplexing section (MUX DMUX) 1518 performs multiplexing and demultiplexing of various pieces of data related to images such as coded data bit streams, image data, and video signals. This multiplexing and demultiplexing method is arbitrary. For example, during multiplexing, the multiplexing/demultiplexing section (MUX DMUX) 1518 can not only combine a plurality of pieces of data into one but also add given header information or other information to that data. Also, during demultiplexing, the multiplexing/demultiplexing section (MUX DMUX) 1518 can not only divide a single piece of data into a plurality of pieces of data but also add given header information or other information to each divided piece of data. That is, the multiplexing/demultiplexing section (MUX DMUX) 1518 can change the data format through multiplexing and demultiplexing. For example, the multiplexing/demultiplexing section (MUX DMUX) 1518 can convert a bit stream into a transport stream, a bit stream in transport format, or data in recording file format (file data). Of course, conversion opposite thereto can be performed by demultiplexing.

The network interface 1519 is an interface, for example, for the broadband modem 1333, the connectivity 1321, and so on. The video interface 1520 is an interface, for example, for the connectivity 1321, the camera 1322, and so on.

A description will be given next of an example of operation of the video processor 1332. For example, when a transport stream is received from an external network via the connectivity 1321, the broadband modem 1333, or other section, the transport stream is supplied, via the network interface 1519, to the multiplexing/demultiplexing section (MUX DMUX) 1518 where the transport stream is demultiplexed and decoded by the codec engine 1516. Image data acquired as a result of decoding by the codec engine 1516 is subjected to given image processing by the image processing engine 1514 and given conversion by the display engine 1513 and is supplied, for example, to the connectivity 1321 or other section via the display interface 1512 so that the image thereof is displayed on the monitor. Also, for example, image data acquired as a result of decoding by the codec engine 1516 is coded again by the codec engine 1516 and multiplexed and converted into file data by the multiplexing/demultiplexing section (MUX DMUX) 1518, and output to the connectivity 1321 or other section via the video interface 1520 for recording on a variety of recording media.

Further, for example, file data of coded data including coded image data read by the connectivity 1321 or other section from a recording medium that is not depicted is supplied to the multiplexing/demultiplexing section (MUX DMUX) 1518 via the video interface 1520 and decoded by the codec engine 1516. Image data acquired as a result of decoding by the codec engine 1516 is subjected to given image processing by the image processing engine 1514 and given conversion by the display engine 1513 and is supplied, for example, to the connectivity 1321 or other section via the display interface 1512 so that the image thereof is displayed on the monitor. Also, for example, image data acquired as a result of decoding by the codec engine 1516 is coded again by the codec engine 1516 and multiplexed and converted into a transport stream by the multiplexing/demultiplexing section (MUX DMUX) 1518, and output to the connectivity 1321, the broadband modem 1333, or other section via the network interface 1519, and transmitted to other apparatus that is not depicted.

It should be noted that exchange of image and other data between the different processing sections of the video processor 1332 is conducted by using the internal memory 1515 and the external memory 1312. Also, the power management module 1313 controls supply of power to the control section 1511.

In the case where the present technology is applied to the video processor 1332 configured in this manner, it is only necessary to apply the present technology according to each of the above embodiments to the codec engine 1516. That is, it is only necessary to ensure, for example, that the codec engine 1516 has the function of the image coding apparatus 100 or the image coding apparatus 400 described above. As a result, the video processor 1332 provides a similar advantageous effect to that in each of the above embodiments.

It should be noted that, in the codec engine 1516, the present technology (i.e., function of the image coding apparatus 100 or the image coding apparatus 400) may be realized by hardware such as logic circuitry, software such as embedded programs, or both thereof.

Two configurations of the video processor 1332 have been described above. However, the configuration of the video processor 1332 is arbitrary, and the video processor 1332 may have a configuration other than the two described above. Also, although the video processor 1332 may be configured as a single semiconductor chip, the video processor 1332 may also be configured as a plurality of semiconductor chips. For example, the video processor 1332 may be a 3D stacked LSI in which a plurality of semiconductors are stacked. Also, the video processor 1332 may be realized by a plurality of LSIs.

<Example of Application to Apparatus>

The video set 1300 can be incorporated into a variety of apparatuses for processing image data. For example, the video set 1300 can be incorporated into the television apparatus 900 (FIG. 43), the mobile phone 920 (FIG. 44), the recording/reproduction apparatus 940 (FIG. 45), the imaging apparatus 960 (FIG. 46), or other apparatus. As a result of incorporation of the video set 1300, the apparatus provides a similar advantageous effect to that in each of the above embodiments.

It should be noted that even a partial configuration of the video set 1300 described above can be carried out as a configuration to which the present technology is applied as long as the video processor 1332 is included. For example, only the video processor 1332 can be carried out as a video processor to which the present technology is applied. Also, for example, the processor depicted by the dotted line 1341, the video module 1311, or other module can be carried out as a processor or a module to which the present technology is applied. Further, for example, the video module 1311, the external memory 1312, the power management module 1313, and the front end module 1314 can be combined and carried out as a video unit 1361 to which the present technology is applied. No matter which configuration is used, it is possible to provide a similar advantageous effect to that in each of the above embodiments.

That is, any configuration can be incorporated into a variety of processing apparatuses for processing image data as with the video set 1300 as long as the video processor 1332 is included. For example, the video processor 1332, the processor depicted by the dotted line 1341, the video module 1311, or the video unit 1361 can be incorporated into the television apparatus 900 (FIG. 43), the mobile phone 920 (FIG. 44), the recording/reproduction apparatus 940 (FIG. 45), the imaging apparatus 960 (FIG. 46), or other apparatus. Then, as a result of incorporation of one of the configurations to which the present technology is applied, the apparatus provides a similar advantageous effect to that in each of the above embodiments as in the case of the video set 1300.

Sixth Application Example: Network System

Figure 50:
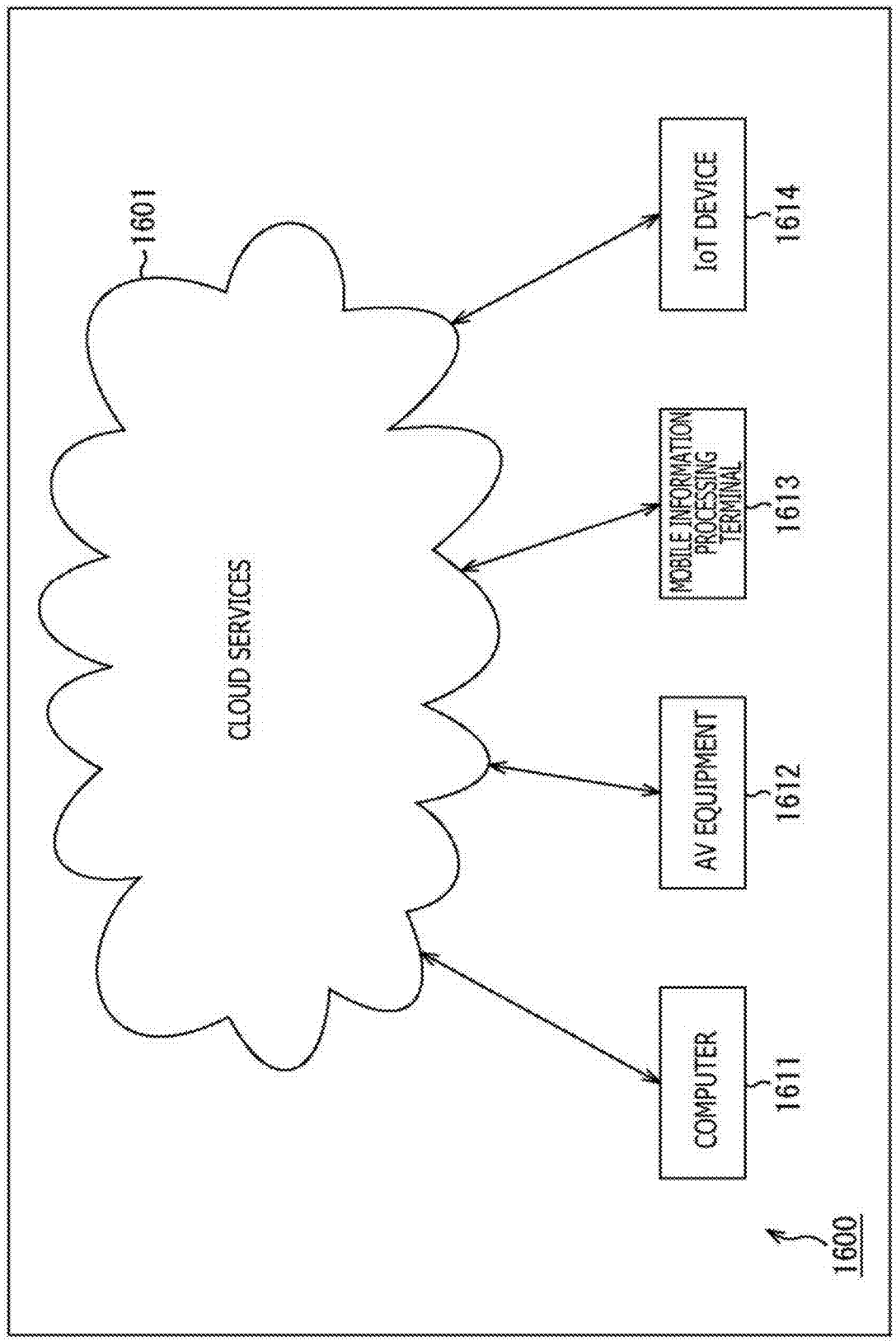
FIG. 50 is a block diagram illustrating an example of a schematic configuration of a network system.

Also, the present technology is applicable to a network system that includes a plurality of apparatuses. FIG. 50 illustrates an example of a schematic configuration of a network system to which the present technology is applied.

A network system 1600 illustrated in FIG. 50 is a system in which pieces of equipment exchange information related to images (movies) via a network. A cloud service 1601 of this network system 1600 is a system for providing services related to images (movies) to terminals connected to the cloud service 1601 in a manner capable of communication such as a computer 1611, AV (Audio Visual) equipment 1612, a mobile information processing terminal 1613, and an IoT (Internet of Things) device 1614. For example, the cloud service 1601 provides an image (movie) content supply service such as so-called movie delivery (on demand and live delivery) to a terminal. Also, for example, the cloud service 1601 provides a backup service for receiving image (movie) content from a terminal and storing it. Also, for example, the cloud service 1601 provides a service for intermediating exchange of image (movie) content between terminals.

The physical configuration of the cloud service 1601 is arbitrary. For example, the cloud service 1601 may have a variety of servers such as a server for storing and managing movies, a server for delivering movies to terminals, a server for acquiring movies from terminals, a server for managing users (terminals) and billing, and an arbitrary network such as the internet or LAN.

The computer 1611 includes, for example, an information processing apparatus such as personal computer, server, or workstation. The AV equipment 1612 includes, for example, an image processing apparatus such as TV receiver, hard disk recorder, game equipment, or camera. The mobile information processing terminal 1613 includes, for example, a mobile information processing apparatus such as laptop personal computer, tablet terminal, mobile phone, or smartphone. The IoT device 1614 includes, for example, an arbitrary object for performing image-related processing such as machine, home electronic appliance, furniture, other object, IC tag, or card-type device. These terminals all have a communication function and can exchange information (i.e., communicate) with the cloud service 1601 by connecting to the cloud service 1601 (establishing a session). Also, each terminal can communicate with other terminals. Communication between the terminals may take place via the cloud service 1601 or without the cloud service 1601.

When image (movie) data is exchanged between the terminals or between the terminal and the cloud service 1601 by applying the present technology to the network system 1600 as described above, the image data may be coded as described in each of the embodiments. That is, each of the terminals (the computer 1611 to the IoT device 1614) and the cloud service 1601 may have the functions of at least one or more of the image coding apparatus 100, the image decoding apparatus 200, and the image coding apparatus 400 described above. As a result, the terminals (the computer 1611 to the IoT device 1614) that exchange image data and the cloud service 1601 provide a similar advantageous effect to that in each of the above embodiments.

<Others>

It should be noted that various pieces of information regarding coded data (bit stream) may be multiplexed with coded data and transmitted or recorded or may be transmitted or recorded as separate pieces of data associated with coded data without being multiplexed with coded data. Here, the term "associated" refers to the fact that when one piece of data is processed, other piece of data can be used (linked). That is, pieces of data associated with each other may be integrated into a single piece of data or treated as separate pieces of data. For example, information associated with coded data (image) may be transported over a different transport channel from that for the coded data (image). Also, for example, information associated with coded data (image) may be recorded on a different recording medium (or in a different recording area of the same recording medium) from that for the coded data (image). It should be noted that some of the data and not all of them may be "associated." For example, an image and information corresponding to the image may be associated in arbitrary units such as a plurality of frames, a frame, or part of a frame.

Also, as described above, the terms "synthesize," "multiplex," "add," "combine," "include," "store," "stick," "plug," "insert" and so on refer to bringing a plurality of things together, that is, putting coded data and metadata in one data, for example, and mean a method for "associating" described above.

Also, embodiments of the present technology are not limited to those described above and can be modified in various ways without departing from the gist of the present technology.

For example, in the present specification, a system refers to a set of a plurality of elements (e.g., apparatuses, modules (parts)), and it does not matter whether or not all the elements are in the same housing. Therefore, a plurality of apparatuses accommodated in different housings and connected via a network and an apparatus whose plurality of modules are accommodated in a single housing are both systems.

Also, for example, a configuration described as an apparatus (or a processing section) may be divided and configured as a plurality of apparatuses (or processing sections). Conversely, configurations described above as a plurality of apparatuses (or processing sections) may be brought together and configured as a single apparatus (or a processing section). Also, a configuration other than the above may be naturally added to the configuration of each of the apparatuses (processing sections). Further, as long as the configuration or operation of the system as a whole is the same, part of the configuration of an apparatus (or processing section) may be included in the configuration of other apparatus (or other processing section).

Also, for example, the present technology can have a cloud computing configuration in which one function is processed by a plurality of apparatuses in a shared and collaborative manner via a network.

Also, for example, the above program can be executed by an arbitrary apparatus. In that case, the apparatus need only have necessary functions (e.g., functional blocks) so that necessary information can be acquired.

Also, for example, each of the steps described in the above flowcharts can be performed not only by a single apparatus but also by a plurality of apparatuses in a shared manner. Further, in the case where a step includes a plurality of processes, the plurality of processes included in that one step can be performed not only by a single apparatus but also by a plurality of apparatuses in a shared manner.

It should be noted that, in a program executed by a computer, processes of steps describing the program may be performed chronologically according to the sequence described in the present specification, or in parallel, or at a necessary timing as when the program is called. Further, the processes of the steps describing the program may be performed in parallel or in combination with processes of other program.

It should be noted that the plurality of present technologies described in the present specification can be carried out independently from each other and alone unless inconsistency arises. Of course, the arbitrary plurality of present technologies can be used concurrently. For example, the present technology described in one of the embodiments can be used in combination with the present technology descried in other embodiment. Also, the arbitrary present technology described above can be carried out concurrently with other technology that is not described above.

It should be noted that the present technologies can also have the following configurations:

(1) An image processing apparatus including:

a scaling list setting section configured to set, for a current block to be quantized in an image to be coded, a scaling list having values appropriate to a size of the current block;

a quantization section configured to perform quantization using the scaling list set by the scaling list setting section; and a coding section configured to generate coded data by coding a quantization coefficient acquired by the quantization section.

(2) The image processing apparatus of feature (1), in which the larger the current block size, the larger the values of the scaling list set by the scaling list setting section.

(3) The image processing apparatus of feature (1) or (2), in which the scaling list setting section sets, for the current block having a 16×16 size, a scaling list some of whose values on a higher frequency component side are larger than in the scaling list corresponding to a case of an 8×8 size or smaller.

(4) The image processing apparatus of any one of features (1) to (3), in which the scaling list setting section sets, for the current block having a 32×32 size, a scaling list all of whose values are larger than in the scaling list corresponding to a case of an 8×8 size or smaller.

(5) The image processing apparatus of any one of features (1) to (4), in which
the scaling list setting section sets, for the current block, a scaling list having values appropriate to the current block size and a target bitrate for coding.

(6) The image processing apparatus of any one of features (1) to (5), in which
in a case where the target bitrate is low, the scaling list setting section sets, for the current block, a scaling list having values appropriate to the current block size.

(7) The image processing apparatus of any one of features (1) to (6), in which
the scaling list setting section determines, on a basis of a specification of the target bitrate supplied from outside the image processing apparatus, whether or not the target bitrate is low and sets, for the current block, a scaling list having values appropriate to the current block size in the case where the target bitrate is low.

(8) The image processing apparatus of any one of features (1) to (7), further including:
a flatness detection section configured to detect a flat portion included in the image to be coded; and
a block setting section configured to set a large size block in the flat portion detected by the flatness detection section, in which
the scaling list setting section is configured to set, for the large size block set by the block setting section, a scaling list having values appropriate to the block size.

(9) The image processing apparatus of any one of features (1) to (8), in which
the flatness detection section detects the flat portion on the basis of a variance, a TV norm, or a dynamic range of pixel values in a block.

(10) The image processing apparatus of any one of features (1) to (9), in which
in the case where the target bitrate is low, the flatness detection section detects the flat portion.

(11) The image processing apparatus of any one of features (1) to (10), in which
the flatness detection section detects the flat portion in a region outside a region of interest of the image.

(12) The image processing apparatus of any one of features (1) to (11), in which
the block setting section inhibits the setting of a large size block in the region of interest.

(13) The image processing apparatus of any one of features (1) to (12), in which
the scaling list setting section selects a scaling list having values appropriate to the current block size from among a plurality of scaling lists made available in advance.

(14) The image processing apparatus of any one of features (1) to (13), in which
the coding section codes identification information indicating the scaling list selected by the scaling list setting section and stores the identification information in the coded data.

(15) The image processing apparatus of any one of features (1) to (14), in which
the coding section codes the plurality of scaling lists and stores the scaling lists in the coded data.

(16) The image processing apparatus of any one of features (1) to (15), in which
the scaling list setting section generates a scaling list having values appropriate to the current block size using a single scaling list made available in advance.

(17) The image processing apparatus of any one of features (1) to (16), further including:

an orthogonal transform section configured to orthogonally transform the image to be coded, in which
the quantization section is configured to quantize an orthogonal transform coefficient acquired by the orthogonal transform section using the scaling list set by the scaling list setting section.

(18) The image processing apparatus of any one of features (1) to (17), further including:
a prediction section configured to generate a predicted image of the image to be coded; and
a calculation section configured to generate residual data by subtracting the predicted image generated by the prediction section from the image to be coded, in which
the orthogonal transform section is configured to orthogonally transform the residual data acquired by the calculation section.

(19) The image processing apparatus of any one of features (1) to (18), in which
the quantization section and the coding section perform their respective processes by methods compliant with ITU-T H.265|ISO/IEC 23008-2 High Efficiency Video Coding.

(20) An image processing method including:
setting, for a current block to be quantized in an image to be coded, a scaling list having values appropriate to a size of the current block; performing quantization using the set scaling list; and
generating coded data by coding an acquired quantization coefficient.

(31) The image processing apparatus of any one of features (1) to (20), in which
in the case where the current block size is equal to or larger than a given size, the scaling list setting section sets a scaling list some of whose values on the lower frequency component side are smaller than in the case of a block smaller than the given size.

(32) The image processing apparatus of feature (31), in which
the given size is 32×32.

(33) The image processing apparatus of feature (31) or (32), in which
in a case where a dynamic range of the image is larger than a given range and where the current block size is equal to or larger than the given size, the scaling list setting section sets a scaling list some of whose values on the lower frequency component side are smaller than in a case of a block smaller than the given size.

(34) The image processing apparatus of feature (33), in which
the given range is 10 bits.

(35) The image processing apparatus of any one of features (31) to (34), in which
in a case where the current block size is equal to or larger than a given size, the scaling list setting section sets a scaling list some of whose values on the lower frequency component side are smaller than in a case of a block smaller than the given size and are appropriate to a target bitrate.

(36) The image processing apparatus of any one of features (31) to (35), in which
in a case where a current picture includes a flat portion with only a small change in brightness, the scaling list setting section sets a scaling list some of whose values on the lower frequency component side are smaller than in a case where the flat portion is not included.

(37) The image processing apparatus of any one of features (31) to (36), in which the scaling list setting section sets a scaling list for some of coefficients on the lower frequency component side of the current block.

(41) An image processing apparatus including:
a scaling list setting section configured to set, for a current block to be quantized in an image to be coded, a scaling list some of whose values on the lower frequency component side are smaller than a DC component value;
a quantization section configured to perform quantization using the scaling list set by the scaling list setting section; and
a coding section configured to generate coded data by coding a quantization coefficient acquired by the quantization section.

(42) The image processing apparatus of feature (41), in which
in the case where the current block size is equal to or larger than a given size, the scaling list setting section sets a scaling list some of whose values on the lower frequency component side are smaller than the DC component value.

(43) The image processing apparatus of feature (42), in which
the given size is 32×32.

(44) The image processing apparatus of any one of features (41) to (43), in which
in the case where the dynamic range of the image to be coded is larger than a given range, the scaling list setting section sets a scaling list some of whose values on the lower frequency component side are smaller than the DC component value.

(45) The image processing apparatus of feature (44), in which
the given range is 10 bits.

(46) The image processing apparatus of any one of features (41) to (45), in which
the scaling list setting section sets a scaling list some of whose values on the lower frequency component side are smaller than the DC component value and are appropriate to a target bitrate.

(47) The image processing apparatus of feature (46), in which
the lower the target bitrate, the larger the some of the values on the lower frequency component side in the scaling list.

(48) The image processing apparatus of feature (46) or (47), in which
the lower the target bitrate, the narrower the range over which the values in the scaling list are smaller than the DC component value.

(49) The image processing apparatus of any one of features (41) to (48), in which
in the case where a current picture includes a flat portion with a small change in brightness, the scaling list setting section sets a scaling list some of whose values on the lower frequency component side are smaller than the DC component value.

(50) The image processing apparatus of feature (49), in which
some of the values on the lower frequency component side in the scaling list are appropriate to reliability of information to the effect that the current picture includes the flat portion.

(51) The image processing apparatus of feature (50), in which
the higher the reliability, the smaller the values on the lower frequency component side in the scaling list.

(52) The image processing apparatus of feature (51), in which
the scaling list setting section selects a scaling list from among a plurality of scaling lists made available in advance.

(53) The image processing apparatus of feature (52), in which
the coding section codes identification information indicating the scaling list selected by the scaling list setting section and stores the information in the coded data.

(54) The image processing apparatus of feature (53), in which
the coding section codes the plurality of scaling lists and stores the lists in the coded data.

(55) The image processing apparatus of any one of features (51) to (54), in which
the scaling list setting section sets a scaling list for some of the coefficients on the lower frequency component side of the current block.

(56) The image processing apparatus of feature (55), in which
the quantization section quantizes some of the coefficients on the lower frequency component side of the current block using the set scaling list and sets the values of coefficients other than some of the coefficients to zero.

(57) The image processing apparatus of any one of features (51) to (56), further including:
an orthogonal transform section configured to orthogonally transform the image to be coded, in which
the quantization section is configured to quantize an orthogonal transform coefficient acquired by the orthogonal transform section using the scaling list set by the scaling list setting section.

(58) The image processing apparatus of feature (57), further including:
a prediction section configured to generate a predicted image of the image to be coded; and
a calculation section configured to generate residual data by subtracting the predicted image generated by the prediction section from the image to be coded, in which
the orthogonal transform section is configured to orthogonally transform the residual data acquired by the calculation section.

(59) The image processing apparatus of any one of features (51) to (58), in which
the quantization section and the coding section perform their respective processes by methods compliant with ITU-T H.265|ISO/IEC 23008-2 High Efficiency Video Coding.

(60) An image processing method including:
setting, for a current block to be quantized in an image to be coded, a scaling list some of whose values on a lower frequency component side are smaller than a DC component value;
a quantization section configured to perform quantization using the set scaling list; and
a coding section configured to generate coded data by coding an acquired quantization coefficient.

REFERENCE SIGNS LIST

100 Image coding apparatus
111 Pre-processing buffer
112 Pre-processing section
113 Calculation section
114 Orthogonal transform section
115 Scaling list storage section
116 Scaling list selection section
117 Quantization section 118 Coding section
119 Accumulation buffer
120 Inverse quantization section
121 Inverse orthogonal transform section
122 Calculation section
123 Filter
124 Frame memory
125 Intra-prediction section
126 Inter-prediction section
127 Predicted image selection section
151 Screen rearrangement section
152 Metadata setting section
153 Block setting section
161 Flatness detection section
171 Flatness detection section
181 Flatness detection section
200 Image decoding apparatus
211 Accumulation buffer
212 Decoding section
213 Inverse quantization section
214 Inverse orthogonal transform section
215 Calculation section
216 Filter
217 Post-processing buffer
218 Post-processing section
219 Intra-prediction section
220 Frame memory
221 Inter-prediction section
222 Predicted image selection section
400 Image coding apparatus
415 Scaling list storage section
416 Scaling list selection section

The invention claimed is:

1. An image processing apparatus, comprising:
a processor configured to:
set, for a current block to be quantized in an image to be coded, a scaling list having a plurality of values based on both a size of the current block and a target bitrate, wherein
the plurality of values of the scaling list remain the same across different block sizes for a first target bitrate,
the plurality of values of the scaling list differs across the different block sizes for a second target bitrate lower than the first target bitrate,
in a case where the size of the current block is equal to or larger than a specific size, the processor is further configured to set the scaling list in which values on a lower frequency component side are smaller than in a case of a block smaller than the specific size, and
in a case where a dynamic range of the image is larger than a specific range and where the size of the current block is equal to or larger than the specific size, the processor is further configured to set the scaling list in which the values on the lower frequency component side are smaller than in the case of the block smaller than the specific size;
execute quantization based on the scaling list; and
execute a coding process on a quantization coefficient acquired based on the quantization, to generate coded data.

2. The image processing apparatus of claim 1, wherein in case the size of the current block becomes larger, the processor is further configured to set larger values for the plurality of values.

3. The image processing apparatus of claim 2, wherein the processor is further configured to set, for the current block having a 16×16 size, the scaling list in which values on a higher frequency component side are larger than in the scaling list corresponding to a case of an 8×8 size or smaller.

4. The image processing apparatus of claim 2, wherein the processor is further configured to set, for the current block having a 32×32 size, the scaling list in which values are larger than in the scaling list corresponding to a case of an 8×8 size or smaller.

5. The image processing apparatus of claim 1, wherein in a case where the target bitrate is low, the processor is further configured to set, for the current block having the size of one of 16×16 or 32×32, the scaling list having the plurality of values that corresponds to the size of the current block.

6. The image processing apparatus of claim 5, wherein the processor is further configured to:
determine, based on a specification of the target bitrate supplied from outside the image processing apparatus, that the target bitrate is low; and
set, for the current block, the scaling list having the plurality of values that corresponds to the size of the current block based on the determination that the target bitrate is low.

7. The image processing apparatus of claim 1, wherein the processor is further configured to:
detect a flat portion in the image to be coded;
set a large size block in the detected flat portion; and
set, for the large size block, the scaling list having the plurality of values that corresponds to the large size block.

8. The image processing apparatus of claim 7, wherein in a case where the target bitrate is low, the processor is further configured to detect the flat portion.

9. The image processing apparatus of claim 7, wherein the processor is further configured to:
detect the flat portion in a region outside a region of interest of the image; and
inhibit the setting of the large size block in the region of interest.

10. The image processing apparatus of claim 1, wherein the processor is further configured to:
select the scaling list from a plurality of scaling lists; and
code identification information indicating the selected scaling list and store the identification information in the coded data.

11. The image processing apparatus of claim 10, wherein the processor is further configured to code the plurality of scaling lists and store the plurality of scaling lists in the coded data.

12. The image processing apparatus of claim 1, wherein the specific size is 32×32.

13. The image processing apparatus of claim 1, wherein the specific range is 10 bits.

14. The image processing apparatus of claim 1, wherein in a case where the size of the current block is equal to or larger than the specific size, the processor is further configured to set the scaling list in which the values on the lower frequency component side are smaller than in the case of the block smaller than the specific size and that correspond to the target bitrate.

15. The image processing apparatus of claim 1, wherein in a case where a current picture includes a flat portion with a small change in brightness, the processor is further configured to set the scaling list in which the values on the lower frequency component side are smaller than in a case where the flat portion is not included.

16. The image processing apparatus of claim 1, wherein the processor is further configured to set the scaling list for coefficients on the lower frequency component side of the current block.

17. An image processing method, comprising:
setting, for a current block to be quantized in an image to be coded, a scaling list having a plurality of values based on both a size of the current block and a target bitrate, wherein
the plurality of values of the scaling list remain the same across different block sizes for a first target bitrate, and
the plurality of values of the scaling list differs across the different block sizes for a second target bitrate lower than the first target bitrate;
in a case where the size of the current block is equal to or larger than a specific size, setting the scaling list in which values on a lower frequency component side are smaller than in a case of a block smaller than the specific size;
in a case where a dynamic range of the image is larger than a specific range and where the size of the current block is equal to or larger than the specific size, setting the scaling list in which the values on the lower frequency component side are smaller than in the case of the block smaller than the specific size;
executing quantization based on the set scaling list; and
generating coded data by coding a quantization coefficient acquired based on the quantization.

\* \* \* \* \*